US012364185B2

(12) United States Patent
McMahan et al.

(10) Patent No.: US 12,364,185 B2
(45) Date of Patent: Jul. 22, 2025

(54) SYSTEMS, METHODS, AND APPARATUS FOR THE OPERATION OF ELECTRONIC COMPONENTS AND THE DISPLAY OF INFORMATION RELATED TO AGRICULTURAL IMPLEMENTS

(71) Applicant: Kinze Manufacturing, Inc., Williamsburg, IA (US)

(72) Inventors: Ryan McMahan, Williamsburg, IA (US); Jason Schoon, Williamsburg, IA (US); Matthew Moeller, Williamsburg, IA (US); Matthew Achen, Williamsburg, IA (US); Bryton Hayes, Williamsburg, IA (US)

(73) Assignee: Kinze Manufacturing, Inc., Williamsburg, IA (US)

( * ) Notice: Subject to any disclaimer, the term of this patent is extended or adjusted under 35 U.S.C. 154(b) by 63 days.

(21) Appl. No.: 18/167,288

(22) Filed: Feb. 10, 2023

(65) Prior Publication Data
US 2023/0255137 A1    Aug. 17, 2023

Related U.S. Application Data

(60) Provisional application No. 63/267,865, filed on Feb. 11, 2022.

(51) Int. Cl.
*A01D 41/127* (2006.01)
*A01C 7/10* (2006.01)
*A01C 7/20* (2006.01)

(52) U.S. Cl.
CPC ............... *A01C 7/105* (2013.01); *A01C 7/20* (2013.01)

(58) Field of Classification Search
USPC .... 800/320.1, 279, 301, 278, 298, 267, 275, 800/26, 266, 260, 295, 300.1, 303, 3, 4,
(Continued)

(56) References Cited

U.S. PATENT DOCUMENTS 8,816,262 B2   8/2014   Holland
9,282,688 B2   3/2016   Casper et al.
(Continued)

FOREIGN PATENT DOCUMENTS

| CN | 105319172 B | 2/2018 |
| GR | 1009533 B | 5/2019 |
| GR | 1009606 B | 9/2019 |

OTHER PUBLICATIONS

International Search Report and Written Opinion in PCT/US2023/062345, mailed Jun. 28, 2023, 10 pages.
(Continued)

*Primary Examiner* — Daniel Previl
(74) *Attorney, Agent, or Firm* — McKee, Voorhees & Sease, PLC

(57) ABSTRACT

A display unit is operationally connected to an agricultural implement to provide inputs and operational controls, as well as status and set up, of the implement. The display unit can be a touchscreen or other device that can receive inputs to set up, control, store information, and recall information associated with the operation of the implement. The display unit can provide a number of different types of inputs to allow for the control of the various components of the implement. Information shown, tracked, managed, communicated, or otherwise used by the system can be selected and set up by a user to customize the experience and to provide additional information useful for agricultural operations. The display unit can show and/or output alerts, messages, camera data, and/or other information based on aspects and/or functionality of the implement. The display unit can communicate with other display units associated with other agricultural implements.

20 Claims, 45 Drawing Sheets

(58) Field of Classification Search
USPC .......... 800/8, 21, 276, FOR. 000, FOR. 100,
800/FOR. 101, FOR. 104, 277; 435/412,
435/468, 6.12, 320.1, 419, 418, 6.11, 424,
435/6.1, 7.92, 1.1, 2, 3, 4, 41, 440, 173.1,
435/174, 235.1, 325, 262, 283.1, 317.1,
435/800, 801, 802, 803, 805, 804, 806,
435/807, 808, 809, 810, 811, 812, 813,
435/814, 242, 243, 410, FOR. 236,
435/FOR. 214, FOR. 210, FOR. 201,
435/FOR. 191, FOR. 184, FOR. 177,
435/FOR. 158, FOR. 147, FOR. 126,
435/FOR. 123, FOR. 100, FOR. 000, 975,
435/974, 973, 972, 971, 970, 969, 968,
435/967, 966, 965, 964, 963, 962, 961,
435/960, 821, 820, 819, 818, 817;
536/23.6, 23.1, 24.5, 1.11, FOR. 000;
463/9, 10, 20, 40, 42, 1, 47.1, 48, 47.2,
463/49, 58, FOR. 000; 705/37, 14.12, 50,
705/80, 400, 1.1, 500, 901, FOR. 000;
111/170, 177, 200, 100, 118, 8, 130, 14,
111/18, 64, 900, 903, 184, 59, 63, 926;
340/684, 850, 853.1, 870.01, 901, 906,
340/907, 932.2, 933, 945, 984, 988,
340/407.1, 425.1, 286.01, 384.1,
340/FOR. 000, FOR. 415, FOR. 311, 619,
340/613, 609, 666, 679, 680, 686.1,
340/691.6, 693.2, 825.23, 944, 425.5,
340/146.2, 500, 1.1, 815.4, 999,
340/FOR. 465; 177/139, 136; 222/77;
701/50; 224/519; 296/168, 1.01, 225,
296/900, FOR. 000, FOR. 109; 504/117,
504/100, 101, 103, 113, 116.1, 114,
504/FOR. 000; 700/265, 282, 283, 285,
700/1, 90, 900, FOR. 000, FOR. 101,
700/FOR. 102, FOR. 103, FOR. 104;
180/14.5, 164, 116, 165, 166, 2.1, 167,
180/170, 180, 182, 197, 198, 199, 204,
180/6.2, 7.1, 11, 14.1, 15, 16, 19.1, 20,
180/21, 36, 232, 41, 233, 252, 268, 271,
180/53.1, 54.1, 337, 76, 314, 315, 400,
180/84, 89.1, 311, 313, 900, 901, 902,
180/903, 904, 905, 906, 907, 908,
180/FOR. 000
See application file for complete search history.

(56) References Cited

U.S. PATENT DOCUMENTS

| | | | |
|---|---|---|---|
| 9,285,501 B2 | 3/2016 | Christy et al. | |
| 9,554,098 B2 | 1/2017 | Casper et al. | |
| 9,585,307 B2 | 3/2017 | Holland | |
| 9,903,979 B2 | 2/2018 | Dybro et al. | |
| 10,028,426 B2* | 7/2018 | Schildroth | A01B 79/005 |
| 10,188,037 B2 | 1/2019 | Bruns et al. | |
| 10,393,712 B2 | 8/2019 | Li | |
| 10,670,763 B2 | 6/2020 | Rhodes et al. | |
| 10,788,419 B2* | 9/2020 | Thompson | G01N 21/80 |
| 11,266,056 B2 | 3/2022 | Nair et al. | |
| 2002/0043194 A1* | 4/2002 | Kinzenbaw | A01C 15/006 111/54 |
| 2004/0206281 A1* | 10/2004 | Wilson | A01C 15/006 111/14 |
| 2010/0313297 A1* | 12/2010 | Sosa | C07K 14/415 800/278 |
| 2011/0160994 A1* | 6/2011 | Schmidt | A01B 79/005 707/740 |
| 2014/0000919 A1 | 1/2014 | Bachman et al. | |
| 2015/0305226 A1 | 10/2015 | Zemenchik | |
| 2016/0029547 A1 | 2/2016 | Casper et al. | |
| 2017/0042081 A1* | 2/2017 | Zumbach | G01N 1/08 |
| 2018/0014452 A1* | 1/2018 | Starr | A01M 7/0089 |
| 2018/0032776 A1* | 2/2018 | Ekins | G06K 7/1413 |
| 2018/0110181 A1 | 4/2018 | Gebbeken et al. | |
| 2018/0124992 A1 | 5/2018 | Koch et al. | |
| 2019/0278262 A1* | 9/2019 | Taylor | G05D 1/0016 |
| 2020/0253107 A1* | 8/2020 | Madison | A01C 7/18 |
| 2021/0144911 A1 | 5/2021 | Plattner | |
| 2021/0243945 A1* | 8/2021 | Schmidt | A01C 21/005 |
| 2021/0394777 A1* | 12/2021 | Brocke | B60W 50/14 |
| 2022/0055963 A1* | 2/2022 | Shirley, Jr. | C05C 3/00 |
| 2022/0346304 A1 | 11/2022 | Allgaier | |
| 2023/0247935 A1 | 8/2023 | Gupta et al. | |

OTHER PUBLICATIONS

International Preliminary Report on Patentability in PCT/US2023/062345, mailed Aug. 22, 2024, 8 pages.

\* cited by examiner

SYSTEMS, METHODS, AND APPARATUS FOR THE OPERATION OF ELECTRONIC COMPONENTS AND THE DISPLAY OF INFORMATION RELATED TO AGRICULTURAL IMPLEMENTS

CROSS REFERENCE TO RELATED APPLICATIONS

This application claims priority under 35 U.S.C. § 119 to provisional patent application U.S. Ser. No. 63/267,865, filed Feb. 11, 2022. The provisional patent application is herein incorporated by reference in its entirety, including without limitation, the specification, claims, and abstract, as well as any figures, tables, appendices, or drawings thereof.

TECHNICAL FIELD

Aspects of the disclosure are directed generally towards a control and/or display unit including an interactive graphical user interface showing operations related to one or more agricultural implements and providing data and other feedback related to the same. The disclosure includes methods, systems, and apparatus for acquiring, storing, receiving, communicating, and configuring information related to an agricultural implement and performing instructions, operations, and other outputs based upon the same.

BACKGROUND

Agricultural implements perform a variety of agricultural operations. For example, an agricultural row crop planter is a machine built for precisely distributing seed into the ground. The row crop planter generally includes a horizontal toolbar fixed to a hitch assembly for towing behind a tractor or other implement. Row units are mounted to the toolbar. In different configurations, seed may be stored at individual hoppers on each row unit, or it may be maintained in a central hopper and delivered to the row units on an as needed basis. The row units generally include ground-working tools for opening and closing a seed furrow, and a seed metering system for distributing seed to the seed furrow.

Because the planter is generally pulled by a tractor or other tow vehicle with an operator remote from the planter, it may be desirable for an operator to view data associated with the operation of the planter in order for the operator to know information related to the planting of one or more types of seed. This information can ensure that desirable agronomical parameters associated with the planting of the particular type of seed are being met and/or maintained by settings of the planter. This would allow the operator to update, on-the-fly, any such setting of the planter to within such an acceptable parameter.

Still further, it may be desirable to view other data, sensor information, or other settings related to the planter and/or planting of the seed in order to track and store the information for a later use. This may include the review of the data during or after the growing season, such as at harvest, to aid in providing updated agronomical information to be used in future years and to aid in increasing the yield of planted seed.

Therefore, there is a need in the art for a control and/or display unit in communication with an agricultural implement, such as a planter, including the individual components thereof, in which the unit is able to display information related to one or more agricultural operations, provide an interface for a user to enter inputs to update one or more settings of the implement, to record and store data associated with one or more operations, to customize selections for display and/or operation, to operate, such as by calibrating or otherwise optimize components associated with the planter, to calculate and determine certain information related to planting, to communicate and coordinate with a control and/or display associated with another implement, to present a user with outputs, warnings, and/or alerts, to show images and/or video captured by a camera and/or cameras, and/or to provide for communication to one or more additional devices for communicating any of the information related to the agricultural implement and/or farming operation.

SUMMARY

The following objects, features, advantages, aspects, and/or embodiments, are not exhaustive and do not limit the overall disclosure. No single embodiment need provide each and every object, feature, or advantage. Any of the objects, features, advantages, aspects, and/or embodiments disclosed herein can be integrated with one another, either in full or in part.

It is a primary object, feature, and/or advantage of the invention to improve on or overcome the deficiencies in the art.

It is a further object, feature, and/or advantage of the disclosure to provide systems, methods, and/or apparatus for providing monitoring, storing, inputting, and outputting in a display unit in communication with an agricultural implement.

It is still yet a further object, feature, and/or advantage to provide controls for various features, systems, and/or components of an agricultural implement. This can include, but is not limited to, calibration, optimization, testing, cleanout, communication, camera manipulation, measurement, monitoring, and the like, for any of the components and/or systems or assemblies of an implement.

It is yet another object, feature, and/or advantage to provide a customizable display for any and/or all of the operations and/or components of an agricultural implement. The displays can show real time information, historical information, shared information, and/or tracked information for different categories. The display can also output camera data such as images and/or video captured by a camera.

It is still another object, feature, and/or advantage to provide a display and system for an agricultural implement that provides feedback, such as in the form of warnings, shutoffs, and other troubleshooting in an automatic, customizable, or combined manner.

It is still another object, feature, and/or advantage to provide a display and system associated with a planting implement that has the ability to calculate and determine, based on the number of acres remaining to plant and the amount of seed remaining in a planting implement, whether the planting implement has enough seed to finish planting. If it is determined the planting implement does not have enough seed, a warning and/or alert can be output to the display indicating as much. In the event a planting implement does not have enough seed to finish planting, a user has the option, via the display, to call for precisely enough seed to be able to finish planting.

It is still another object, feature, and/or advantage to provide a display and system associated with a planting implement that has the ability to communicate with other planting implements, either directly or via displays associated with each planting implement, to coordinate and/or strategize how to finish planting an agricultural field. This may include optimization in which one planting implement plants a specific portion of the field and another planting implement or implements plant a different portion of the field.

It is still yet another object, feature, and/or advantage to provide a display and system associated with a planting implement that has the ability to ignore disparate data beyond a specified range.

It is still another object, feature, and/or advantage to provide camera(s) and system for an agricultural implement, wherein the camera data including images and/or video captured by the camera(s) is shown on a display associated with the agricultural implement. The camera data's appearance and location on the display is customizable.

The system, methods, and/or apparatus disclosed herein can be used in a wide variety of applications. For example, while the system is used with respect to an agricultural implement, this can be meant to include any number of implements, including, but not limited to planting implements, spraying implements, tillage implements, and/or other ground engaging implements.

It is preferred the apparatus be safe, cost effective, durable, and environmentally friendly. For example, some of the advantages of the disclosure include capabilities that lead to more efficient planting, and which avoid wasteful planting practices. Thus, by increasing efficiency and avoiding wasteful planting practices, the disclosure is more cost effective and environmentally friendly for a user.

At least one embodiment disclosed herein comprises a distinct aesthetic appearance. Ornamental aspects included in such an embodiment can help capture a consumer's attention and/or identify a source of origin of a product being sold. Said ornamental aspects will not impede functionality of the invention.

Methods can be practiced which facilitate use, manufacture, assembly, maintenance, and repair of an agricultural implement incorporating any of the objects and/or features disclosed, which accomplish some or all of the previously stated objectives.

The aspects and/or features disclosed can be incorporated into systems which accomplish some or all of the previously stated objectives. These can be standalone systems, existing systems/displays, remote systems/displays, or any combination or variation thereof.

According to some aspects of the present disclosure, a display unit for use with an agricultural implement comprises a user interface adapted to allow a user to enter inputs and to display outputs, and an intelligent control adapted to communicate with the implement, wherein the display unit is adapted to determine an amount of seed remaining in the implement and a number of acres remaining to plant, wherein the display unit is adapted to calculate whether the implement has enough seed remaining to finish planting the number of acres remaining to plant.

According to at least some aspects of some embodiments disclosed, if the implement does not have enough seed remaining to finish planting the number of acres remaining to plant, the display unit outputs an alert via the user interface.

According to at least some aspects of the embodiments disclosed, if the implement does not have enough seed remaining to finish planting the number of acres remaining to plant, the display unit is further adapted to allow a user to enter input to the display unit to call for the precise amount of seed required to finish planting the number of acres remaining to plant.

According to at least some aspects of the embodiments disclosed, the display unit is adapted to calculate an amount of seed required to finish planting the number of acres left for the implement to plant and to present that amount to a user via the display unit.

According to at least some aspects of the embodiments disclosed, the display unit is portable and wireless.

According to at least some aspects of the embodiments disclosed, the display unit is colorized and comprises a touchscreen.

According to at least some aspects of the embodiments disclosed, an agricultural system for use with an agricultural implement comprises a display operationally connected to the agricultural implement and further adapted to allow a user to enter inputs to the system via the display and to present outputs to a user via the display, wherein the display is further adapted to determine an amount of seed currently present in the implement and a number of acres remaining for the implement to plant.

According to at least some aspects of the embodiments disclosed, the display is adapted to calculate an amount of seed required to finish planting the number of acres remaining for the implement to plant and to present that amount to a user via the display.

According to at least some aspects of the embodiments disclosed, if the amount of seed currently present in the implement is not enough to plant the number of acres remaining for the implement to plant, the display is adapted to present an alert and/or warning that the implement does not currently have enough seed to plant the number of acres remaining for the implement to plant.

According to at least some aspects of the embodiments disclosed, if the amount of seed currently present in the implement is not enough to plant the number of acres remaining for the implement to plant, the display is adapted to allow a user to enter input to the display to call for the precise amount of seed required to finish planting the number of acres remaining for the implement to plant.

According to at least some aspects of the embodiments disclosed, the display is adapted to allow a user to enter a total number of acres to be planted, and the display is further adapted to count and/or monitor a number of acres already planted and to calculate the number of acres remaining for the implement to plant based on the total number of acres to be planted and the number of acres already planted.

According to at least some aspects of the embodiments disclosed, a method for planting an agricultural field comprises determining an amount of seed currently present in an agricultural implement, determining a remaining number of acres to be planted, and calculating an amount of seed required to finish planting the remaining number of acres to be planted.

According to at least some aspects of the embodiments disclosed, the system further comprises determining a total number of acres to be planted and measuring a number of acres already planted.

According to at least some aspects of the embodiments disclosed, if the amount of seed currently present in the implement is not enough to plant the remaining number of acres to be planted, further comprising showing an alert and/or warning that the implement does not currently have enough seed to plant the remaining number of acres to be planted.

According to at least some aspects of the embodiments disclosed, if the amount of seed currently present in the implement is not enough to plant the remaining number of acres to be planted, further comprising allowing a user to enter input to a display unit to call for the precise amount of seed required to finish planting the remaining number of acres to be planted.

According to at least some aspects of the embodiments disclosed, an agricultural system for use with a plurality of agricultural implements comprises a plurality of displays, wherein each display is operationally connected to one of the plurality of agricultural implements, wherein each display is in communication with the other displays, wherein each display is adapted to develop a strategy with one another regarding how to finish planting the number of acres remaining to plant.

According to at least some aspects of the embodiments disclosed, each display is adapted to monitor and determine an amount of seed remaining in the agricultural implement in which each display is operationally connected and to monitor and determine a number of acres remaining for the one or more agricultural implements to plant.

According to at least some aspects of the embodiments disclosed, the strategy is based on the amount of seed remaining in each agricultural implement, the number of acres remaining to plant, a location of each implement, a model, size, and/or nature of each implement, terrain of the field to be planted, weather and/or environmental conditions, or any combination thereof.

According to at least some aspects of the embodiments disclosed, the system is adapted to optimize path planning of the one or more agricultural implements to ensure that planting is completed in an efficient manner.

According to at least some aspects of the embodiments disclosed, the strategy may include some of the one or more implements continue planting while others of the one or more implements cease planting.

According to at least some aspects of the embodiments disclosed, the displays can communicate with one another regarding a total number of acres already planted and a number of acres already planted by each implement.

According to at least some aspects of the embodiments disclosed, an agricultural system for use with an agricultural field comprises an agricultural implement, and a display in communication with an agricultural implement, wherein the system is adapted to allow a user to provide input to the display to specify a particular area, and wherein the system is further adapted to ignore data outside of the specified area.

According to at least some aspects of the embodiments disclosed, the system can define the specified area via geofencing.

According to at least some aspects of the embodiments disclosed, ignored data is not shown on the display.

According to at least some aspects of the embodiments disclosed, a user can input a mileage via the display wherein the specified area extends from the perimeter of the agricultural field based on that particular mileage.

According to at least some aspects of the embodiments disclosed, an agricultural system for use with an agricultural implement comprises one or more cameras attached at, on, or near the agricultural implement, and a display adapted to show camera data captured by the one or more cameras.

According to at least some aspects of the embodiments disclosed, the system is adapted to automatically set up and automatically calibrate the one or more cameras.

According to at least some aspects of the embodiments disclosed, the display is adapted to allow a user to name each camera via the display.

According to at least some aspects of the embodiments disclosed, each of the one or more cameras can be set up, initialized, and/or calibrated based on user input entered via the display.

According to at least some aspects of the embodiments disclosed, the display is adapted to show the camera data captured by each of the one or more cameras at the same time or show the camera data captured by a selection of the one or more cameras based on user input entered via the display.

According to at least some aspects of the embodiments disclosed, the display is adapted so that a user can manipulate in what location of the display the camera data captured by the one or more cameras appears.

According to at least some aspects of the embodiments disclosed, the display is adapted so that a user can move the camera data captured by one of the one or more cameras so that the camera data appears in a particular quadrant of the display.

According to at least some aspects of the embodiments disclosed, the display is adapted to show camera data from one of the one or more cameras in a full screen mode such that the camera data fills substantially the entirety of the display.

According to at least some aspects of the embodiments disclosed, the display is adapted to show camera data captured by one of the one or more cameras as a picture-in-picture wherein the camera data is shown in a portion of the display and other data is shown in other portions of a display.

According to at least some aspects of the embodiments disclosed, the other data may include any content related to the agricultural implement and/or components thereof, any content related to planting and/or productivity, and/or any other agricultural content.

These and/or other objects, features, advantages, aspects, and/or embodiments will become apparent to those skilled in the art after reviewing the following brief and detailed descriptions of the drawings. Furthermore, the present disclosure encompasses aspects and/or embodiments not expressly disclosed but which can be understood from a reading of the present disclosure, including at least: (a) combinations of disclosed aspects and/or embodiments and/or (b) reasonable modifications not shown or described.

BRIEF DESCRIPTION OF THE DRAWINGS

Several embodiments in which the invention can be practiced are illustrated and described in detail, wherein like reference characters represent like components throughout the several views. The drawings are presented for exemplary purposes and may not be to scale unless otherwise indicated.

Figure 1:
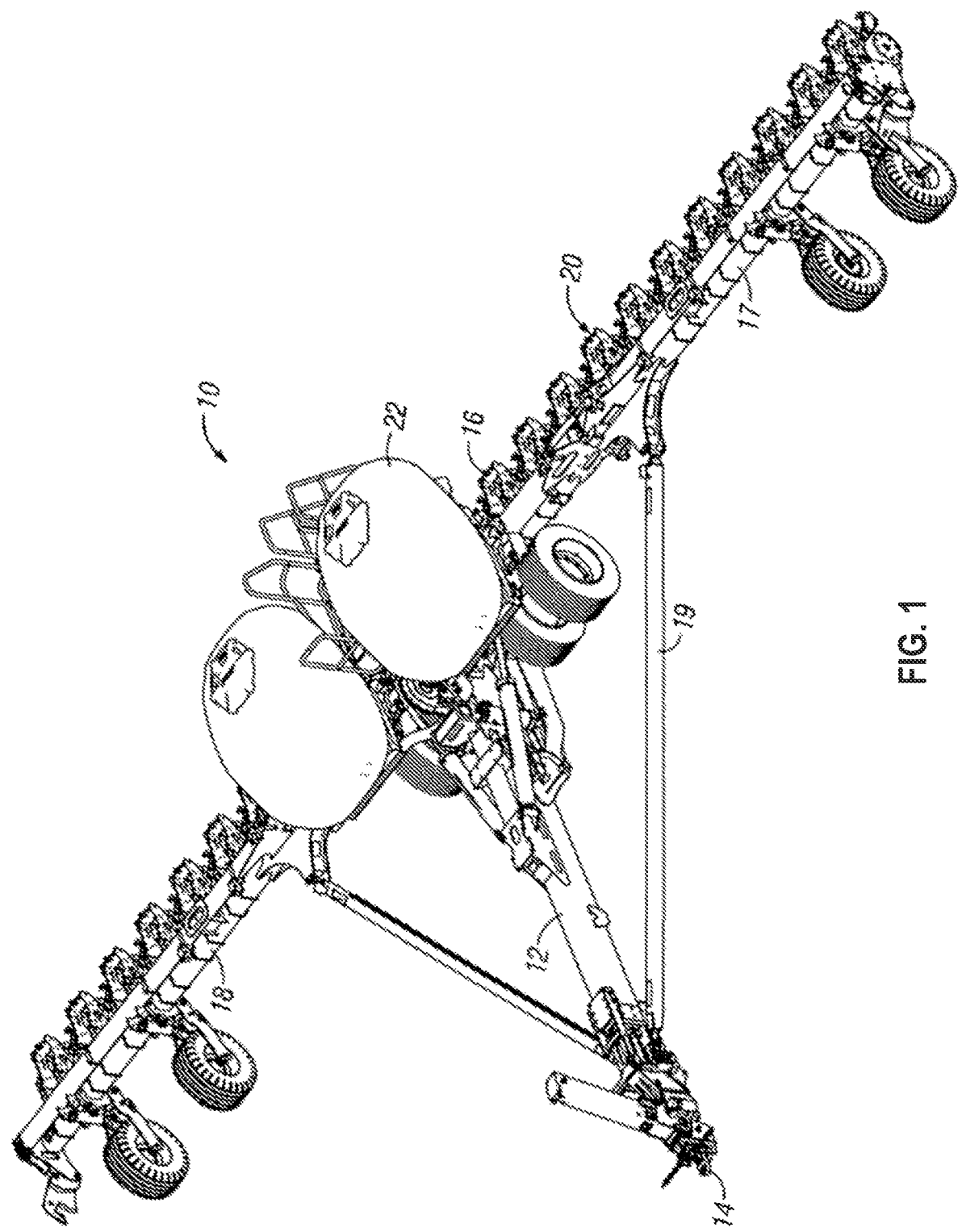
FIG. 1 shows a perspective view of an exemplary agricultural planting implement.

An artisan of ordinary skill need not view, within isolated figure(s), the near infinite number of distinct permutations of features described in the following detailed description to facilitate an understanding of the invention.

DETAILED DESCRIPTION

The present disclosure is not to be limited to that described herein. Mechanical, electrical, chemical, procedural, and/or other changes can be made without departing from the spirit and scope of the invention. No features shown or described are essential to permit basic operation of the invention unless otherwise indicated.

Unless defined otherwise, all technical and scientific terms used above have the same meaning as commonly understood by one of ordinary skill in the art to which embodiments of the invention pertain.

The terms "a," "an," and "the" include both singular and plural referents.

The term "or" is synonymous with "and/or" and means any one member or combination of members of a particular list.

The terms "invention" or "present invention" are not intended to refer to any single embodiment of the particular invention but encompass all possible embodiments as described and/or envisioned based upon that disclosed in the present specification and the figures.

The term "about" as used herein refers to slight variations in numerical quantities with respect to any quantifiable variable. Inadvertent error can occur, for example, through use of typical measuring techniques or equipment or from differences in the manufacture, source, or purity of components.

The term "substantially" refers to a great or significant extent. "Substantially" can thus refer to a plurality, majority, and/or a supermajority of said quantifiable variable, given proper context.

The term "generally" encompasses both "about" and "substantially."

The term "configured" describes structure capable of performing a task or adopting a particular configuration. The term "configured" can be used interchangeably with other similar phrases, such as constructed, arranged, adapted, manufactured, and the like.

Terms characterizing sequential order, a position, and/or an orientation are not limiting and are only referenced according to the views presented.

The "scope" of the invention is defined by the appended claims, along with the full scope of equivalents to which such claims are entitled. The scope of the invention is further qualified as including any possible modification to any of the aspects and/or embodiments disclosed herein which would result in other embodiments, combinations, subcombinations, or the like that would be obvious to those skilled in the art.

The term "camera data" refers to any picture, image, video, audio, information, and/or recording captured by a camera.

The term "particulate material" shall be construed to have a broad meaning, and includes, but is not limited to grain, seed, fertilizer, insecticide, dust, pollen, rock, gravel, dirt, stock, or some combination thereof. Particulate material can be mixed with air to form airborne matter.

As will be understood, aspects and/or embodiments disclosed herein relate generally to the control, display, tracking, measuring, monitoring, communicating, calibrating, configuration, customization, and/or setup of one or more components, such as electrical components, associated with agricultural implements. For example, the systems, methods, and/or apparatus disclosed may be used with agricultural planting implements. It should be appreciated that the disclosure, including any or all of the components disclosed herein, may be used with respect to a planter, but this should not be limiting to the disclosure.

Figure 2:
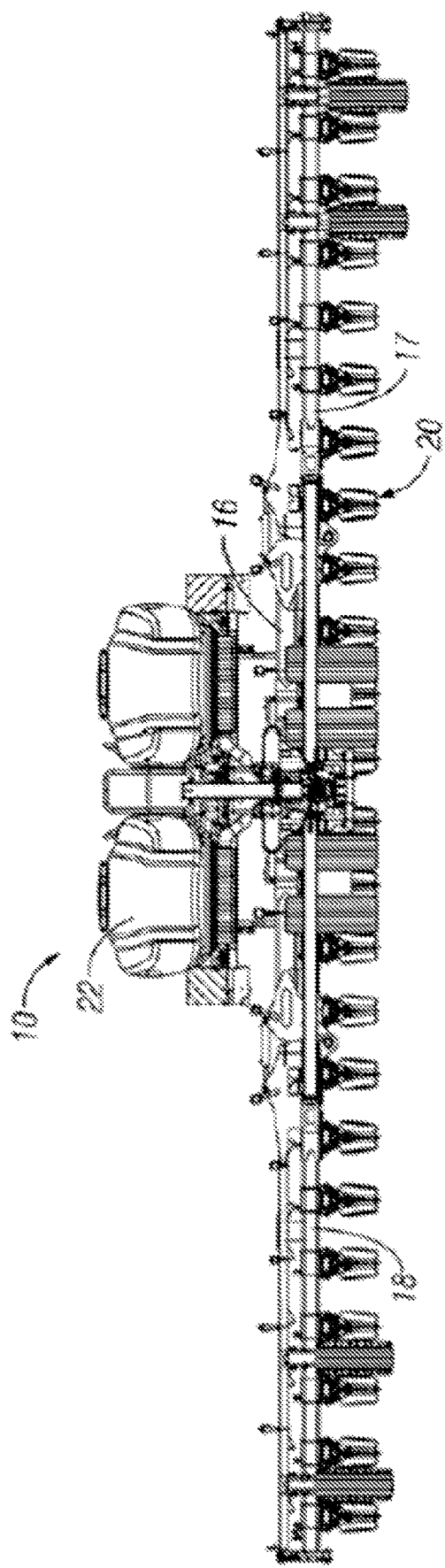
FIG. 2 is a front elevation view of the agricultural planting implement.
Figure 3:
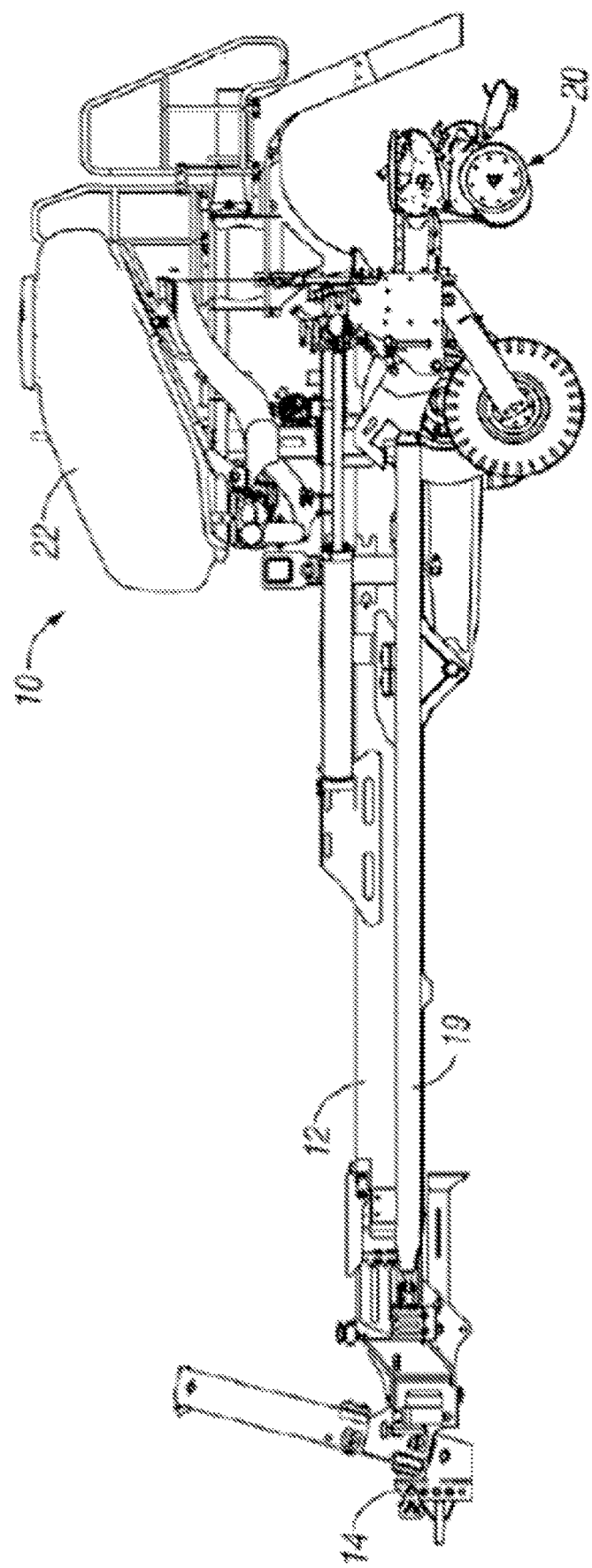
FIG. 3 is a side elevation view of the agricultural planting implement.

FIGS. 1-3 disclose an exemplary agricultural implement 10. The agricultural implement 10 as shown in the figures is a planting implement 10. The aspects, features, apparatuses, methods, and/or systems disclosed herein can be used in conjunction with an agricultural planter such as the exemplary planter depicted in FIGS. 1-3. Although the implement shown in FIGS. 1-3 is a planting implement, the aspects, features, apparatuses, methods, and/or systems as shown and/or described herein can be used with agricultural implements other than planting implements, such as but not limited to, sprayers, fertilizers spreaders, tillage equipment, plows, discs, and the like. Additionally, the aspects, features, apparatuses, methods, and/or systems disclosed herein may be used on self-propelled agricultural equipment (i.e., an unmanned or otherwise autonomous vehicle/implement), such as that disclosed in U.S. Pat. No. 10,104,824, which is hereby incorporated by reference in its entirety. The implement 10 may be generally any implement for engaging with the ground or otherwise distributing a material, such as a particulate or liquid material to the ground. As will be understood, the implement includes ways to distribute material, such as a particulate material to various ground engaging apparatus to distribute said particulate material accurately, efficiently, with increased control, and in some embodiments, at high speed to distribute said particulate material to or in said ground. Furthermore, as will be understood, while the planting implement 10 as shown in the figures is provided, additional types of implements including additional planting implements with various features as is known can utilize the disclosure and/or aspects thereof to be able to distribute and apply the particulate material such as seed or other dry particulate, or a liquid material such as liquid fertilizer, to the ground.

The planting implement 10 as shown in FIGS. 1-3 includes a tongue 12 with a hitch 14 at a first end and a toolbar 16 extending generally transversely to the tongue 12 at a second end. The toolbar 16 extends to connect to a plurality of row units 20, which include ground engagement apparatus. The row units 20 may also include additional aspects such as metering elements, singulation elements, ground opening and/or closing elements, metering system, sensors, motors, and the like. However, it is to be appreciated that generally other types of row units, ground engaging elements, and/or metering elements can utilize any of the aspects of the invention disclosed herein. For example, the row units 20 could include fertilizer or other particulate and/or liquid material application apparatus, and the entrainment system disclosed be used to distribute the particulate and/or liquid material to the row units 20.

Extending outwardly from the toolbar 16 and being generally an extension thereof are wing elements 17 and 18. The wing elements 17, 18 provide additional width of the toolbar 16 such that additional row units 20 can be attached along thereto. This allows for a greater number of row units 20 to be attached to the toolbar 16 to be used for distributing a particulate material and/or liquid material. Additional elements shown in the figures include draft links 19, which generally connect the wings 17, 18 to the tongue 12. One or more actuators can be connected to the system to provide for the wings 17, 18 to be folded in a generally forward manner wherein they will be somewhat parallel to the tongue 12 to move the planting implement 10 from a field use configuration to a row use configuration. However, additional planting units may include that the toolbar 16 is lifted and rotated, is folded rearwardly, is folded vertically, does not fold at all, or includes some sort of combination thereof.

Agricultural planting implements, such as the exemplary one shown in FIGS. 1-3, are used to distribute, meter, and place particulate materials, such as seed, in operable and/or desired locations in a field. This is based, in part, on agronomical data, which is used to determine the optimal spacing, depth, and location of seed to give the seed the best chance to mature into a crop with the best possible yield. The exemplary agricultural implement 10 of FIGS. 1-3 includes central hoppers 22, wherein the central hoppers 22 may store particulate materials, such as seed, and/or liquid materials, such as liquid fertilizer, to be applied to an agricultural field. The exemplary agricultural implement 10 of FIGS. 1-3 may also apply liquid material, such as liquid fertilizer, to an agricultural field.

To further aid in increasing the performance and growing of crop from a planted seed, implements can include systems and other apparatus that are used to apply, place, or otherwise dispense a fertilizer, such as a liquid or dry fertilizer material. For agricultural planting implements, a fertilizer applicator/distribution system, such as the system disclosed in U.S. Patent Application No. 63/261,973, filed Oct. 1, 2021, which is hereby incorporated in its entirety, can be included with the row units of the planter, or with the implement as a whole. This will provide the application of the fertilizer contemporaneously, or near-contemporaneously, with the planting of the seed. However, it should be appreciated that, if the implement is an applicator only, such as a sprayer, the system can continually provide needed liquid fertilizer on an as-needed basis. The system can include one or more hoppers/tanks, either at the bulk hopper site, at the individual row units, or split out to cover regions or sections of row units, wherein the application sites will be fed an amount of the liquid fertilizer.

Aspects, features, apparatuses, methods, and/or systems as shown and described herein, can be included as part of an agricultural implement such as that depicted in FIGS. 1-3 or as part of a liquid fertilizer application/distribution system such as disclosed in U.S. Patent Application No. 63/261,973. Aspects, features, apparatuses, methods, and/or systems as shown and described herein, can be applied to planting, fertilizing, spraying, and the like.

As will be appreciated, the agricultural implement 10 need not include all of the features disclosed herein and may also include additional or alternative features as those shown and/or described. The foregoing has been included as an exemplary implement, and it should be appreciated that generally any implement from any manufacturer and any add-ons or aftermarket components may be included in any implement that encompasses any of the aspects of the disclosure.

Figure 4:
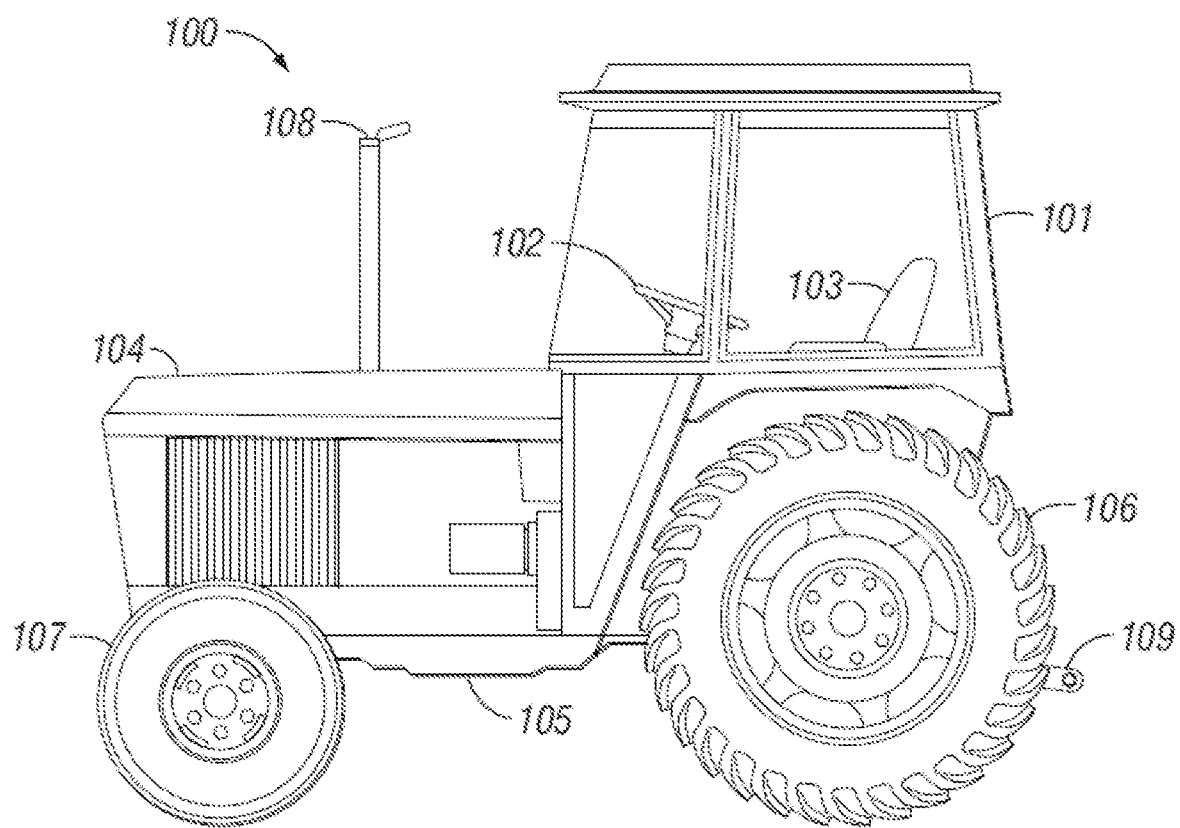
FIG. 4 is a perspective view of an exemplary agricultural vehicle.

FIG. 4 discloses an exemplary agricultural vehicle 100 (e.g., a tractor) used for the purposes of towing machinery used in agriculture (e.g., agricultural implements). Accordingly, the vehicle may be referred to as a prime mover, tow vehicle, or the like. According to some aspects, the agricultural vehicle 100 may be used to tow an agricultural implement such as the agricultural implement 10 depicted in FIGS. 1-3. The agricultural vehicle 100 may include a cab 101 with a steering wheel 102 and a seat 103 for an operator. The agricultural vehicle 100 may also include a vehicle frame 104 which houses an engine located near the front axle of the agricultural vehicle 100 and in front of the cab 101. The cab 101 and vehicle frame 104 may be supported, structurally, by the agricultural vehicle's chassis 105, which attaches to rear drivable wheels 106 and front steerable wheels 107, said front steerable wheels 107 operationally connected to the steering wheel 102. An exhaust pipe 108 allows carbon monoxide to exit the agricultural vehicle 100 during operation of the engine. A vehicle hitch 109 allows for connection between agricultural machinery, such as agricultural implements, and the agricultural vehicle 100.

In some aspects, the agricultural vehicle 100 shown in FIG. 4 could be used to tow the agricultural implement 10 shown in FIGS. 1-3. As mentioned, aspects, features, apparatuses, methods, and/or systems as shown and described herein, could be included on an agricultural vehicle and/or agricultural implement.

It is also envisioned that the agricultural vehicle 100 could be an autonomous or unmanned vehicle, such as that disclosed in U.S. Pat. No. 10,104,824, which is hereby incorporated by reference in its entirety.

Figure 5:
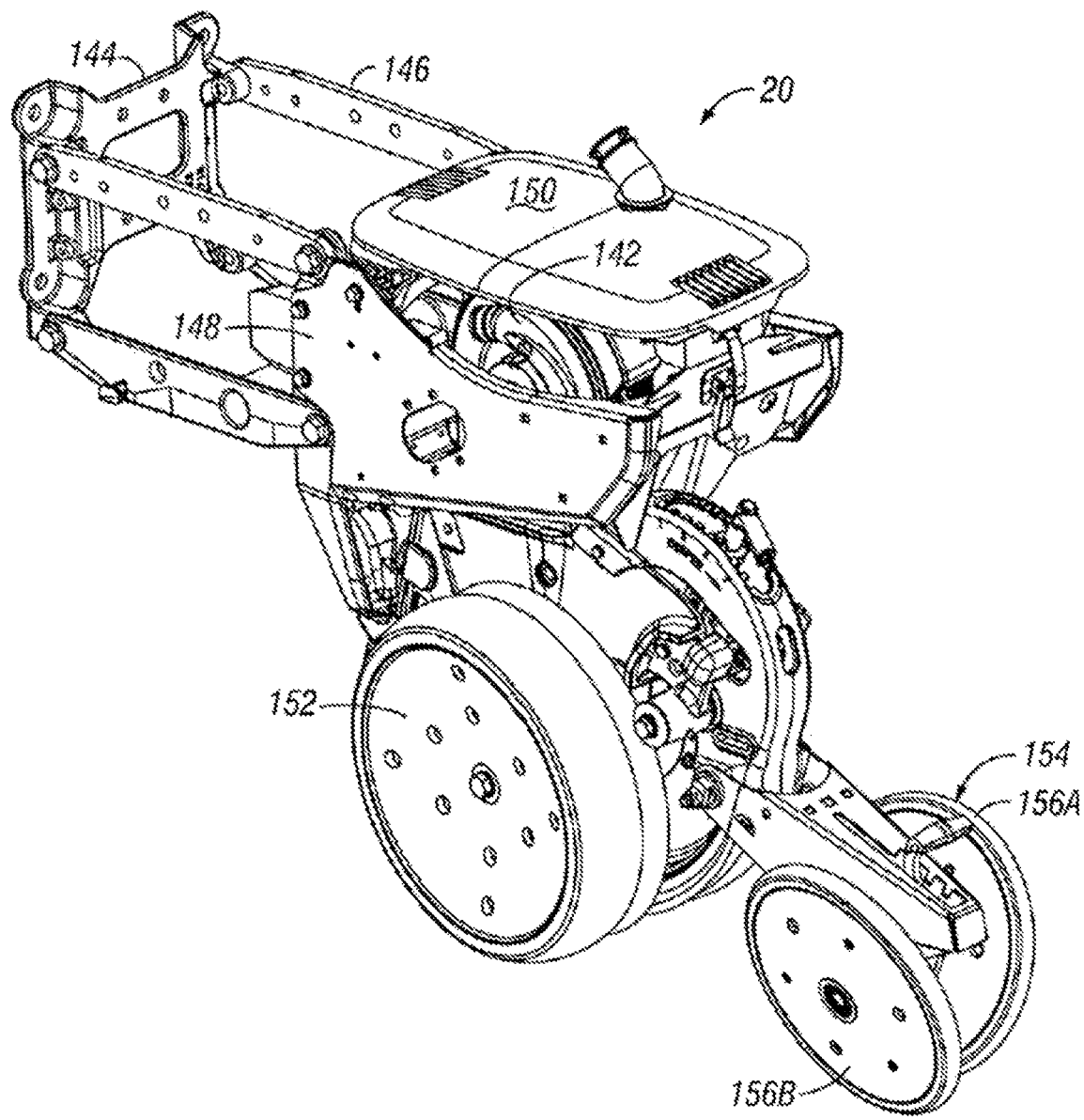
FIG. 5 is a perspective view of an exemplary row unit to be used with an agricultural implement.
Figure 6:
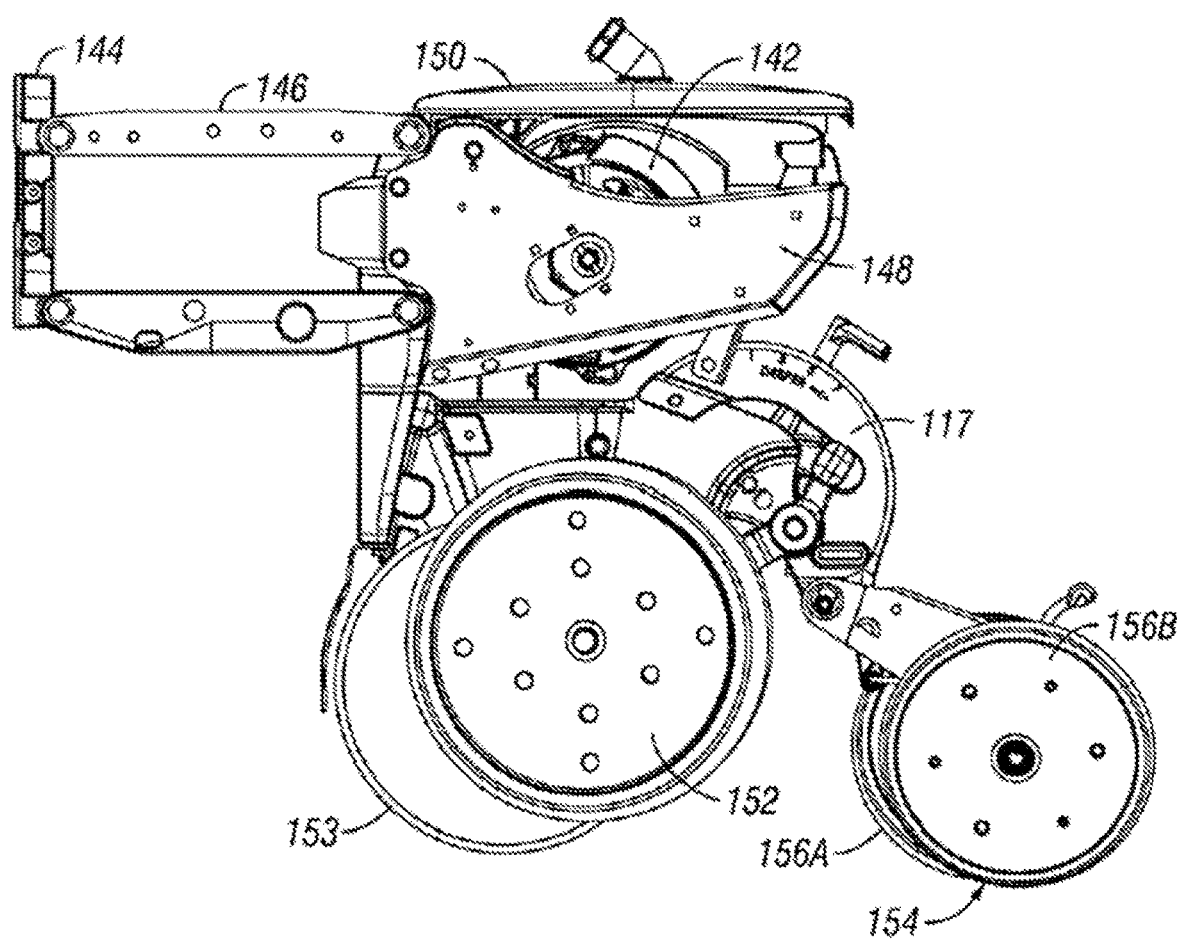
FIG. 6 is a side elevation view of the row unit.

FIGS. 5 and 6 disclose an exemplary row unit 20 of the plurality of row units 20, included as part of the implement 10, extending from the wings 17, 18 and the toolbar 16. A planter row unit 20 with an air seed meter 142 positioned therewith is shown in FIGS. 5 and 6. For example, the seed meter 142 may utilize a negative or positive air pressure to retain and transport seed about one or more seed discs within the seed meter housing. The row unit 20 and air seed meter 142 may be of the kind shown and described in U.S. Pat. No. 9,282,691, which is hereby incorporated in its entirety. However, it should be appreciated that aspects of embodiments of the present disclosure contemplate other types of seed meters, including mechanical, brush, finger, or the like, which may be used with the invention. In addition, the seed meter may be a multi-hybrid seed meter that is capable of dispensing one of a plurality of types, varieties, hybrids, etc. of seed at a row unit, such as by the use of multiple seed discs within the seed meter housing. In addition, when the implement 10 is not a planting implement, the row units 20 may take other forms, such as those for engaging with the ground associated with the particular type of implement (e.g., tillage equipment or the like).

The row unit 20 includes a U-bolt mount (not shown) for mounting the row unit 20 to the planter frame or toolbar 16 (on central frame and wings 17, 18), as it is sometimes called, which may be a steel tube of 5 by 7 inches (although other sizes are used). However, other mounting structures could be used in place of the U-bolt. The mount includes a face plate 144, which is used to mount left and right parallel linkages 146. Each linkage may be a four bar linkage, as is shown in the figures. The double linkage is sometimes described as having upper parallel links and lower parallel links, and the rear ends of the parallel links are pivotally mounted to the frame 148 of the row unit 20. The frame 148 includes a support for the air seed meter 142 and seed hopper 150, as well as a structure including a shank 117 for mounting a pair of ground-engaging gauge wheels 152. The frame 148 is also mounted to a closing unit 154, which includes a pair of inclined closing wheels 156A, 156B. The row unit 20 also includes a pair of opener discs 153. While the row unit 20 shown in FIGS. 5 and 6 is configured to be used with a bulk fill seed system, it is to be appreciated that the row unit 20 may have one or more seed hoppers 150 at each of the row units 20. Exemplary versions of row units with individual hoppers are shown and described in U.S. Pat. No. 9,420,739, which is hereby incorporated in its entirety. In addition, a high speed planting implement, such as that disclosed in U.S. Pat. No. 10,842,072, which is hereby incorporated in its entirety, could be utilized with any of the aspects of any embodiments disclosed herein.

The implement 10 and row units 20 shown and described in FIGS. 5 and 6 include an air seed meter 142 for singulating and transporting seed or other particulate material from the seed delivery source to the created furrow in the field prior to the closing wheels 156A, 156B closing said furrow.

Still further, it should be appreciated that aspects, features, apparatuses, methods, and/or systems as disclosed herein could be used with other types of agricultural implements in addition to planters, including but not limited to, sprayers, fertilizers, tillage equipment, plows, discs, and the like. The disclosure can be configured to work with generally any type of implement.

Aspects of the operation of the implement 10, including any operation associated with any of the electronic or mechanical components thereof, can be controlled and/or viewed on a display unit 200, which may be positioned and/or mounted in the cab 101 of the tractor 100 or located remote of the planter 10 and/or tractor 100. The display unit 200 may also be referred to as a display, user interface unit, monitor and input unit, monitor unit, interactive display, or other relative term. The display unit 200 is configured to be used with an agricultural implement, while being remote from an agricultural implement. For example, it is contemplated that the display unit 200 be in communication, such as electronic communication, with an implement. An operator can utilize the display unit 200 remote from the planter, such as in a tractor 100 or other tow vehicle that is connected to the planter 10. The display unit 200 can be displayed within the tow vehicle 100, but is also configured to be removable therefrom, thus creating a portable unit.

The display unit 200 can take many forms and can generally be considered or can comprise an intelligent control and a user interface. For example, an intelligent control is generally considered to be a computer readable medium or computing device or an apparatus including a processing unit. Examples of such units can be tablets, computers, servers, cell phones, or generally any other handheld, portable, permanent, or other device which may include a central processing unit and a graphical user interface ("GUI"). The graphical user interface may also be a user interface ("UI") without the graphics required. A user interface is how the user interacts with a machine. The user interface can be a digital interface, a command-line interface, a graphical user interface ("GUI"), oral interface, virtual reality interface, or any other way a user can interact with a machine (user-machine interface). For example, the user interface ("UP") can include a combination of digital and analog input and/or output devices or any other type of UI input/output device required to achieve a desired level of control and monitoring for a device. Nonlimiting examples of input and/or output devices include computer mice, keyboards, touchscreens, knobs, dials, switches, buttons, speakers, microphones, LIDAR, RADAR, etc. Input(s) received from the UI can then be sent to a microcontroller to control operational aspects of a device.

The user interface module can include a display, which can act as an input and/or output device. More particularly, the display can be a liquid crystal display ("LCD"), a light-emitting diode ("LED") display, an organic LED ("OLED") display, an electroluminescent display ("ELD"), a surface-conduction electron emitter display ("SED"), a field-emission display ("FED"), a thin-film transistor ("TFT") LCD, a bistable cholesteric reflective display (i.e., e-paper), etc. The user interface also can be configured with a microcontroller to display conditions or data associated with the main device in real-time or substantially real-time.

Additional aspects of the display unit 200 can include connections to wires to be able to communicate electronically to the implement. Thus, the display can include any number of ports, connections, or the like to receive or connect with wires. This can include, but is not limited to, USB-type ports, USB-C ports, HDMI ports (mini and micro), Ethernet ports, power ports, ISOBUS connection ports, PS/2 ports, Serial Ports (DB-25, DE-9 or RS-232 or COM Port), Parallel Port or Centronics 36 Pin Ports, Audio Ports, S/PDIF/TOSLINK, Video Ports (e.g., VGA Ports), Digital Video Interface (DVI) (e.g., Mini-DVI or Micro-DVI), Display Ports, Mini DisplayPorts, RCA Connectors, Component Video, S-Video, USB Type A, RJ-45, RJ-11, and/or e-SATA.

Still further, it is contemplated that the unit 200 be able to communicate in a wireless fashion, such as any wireless connection. This can include, but is not limited to Bluetooth, Wi-Fi, cellular data, radio waves, satellite, or generally any other form of wireless connection which will allow for communication between the unit 200 and the implement. Therefore, the unit 200 will include generally any electronic components necessary to allow for such wireless or wired communication. The intelligent control of the display unit 200 can provide for such wireless or wired communication. The wired communication can take the form of CAN bus, Ethernet, co-axial cable, fiber optic line, or generally any other line which will allow for communication between the unit 200 and the implement and/or planter.

Figure 7:
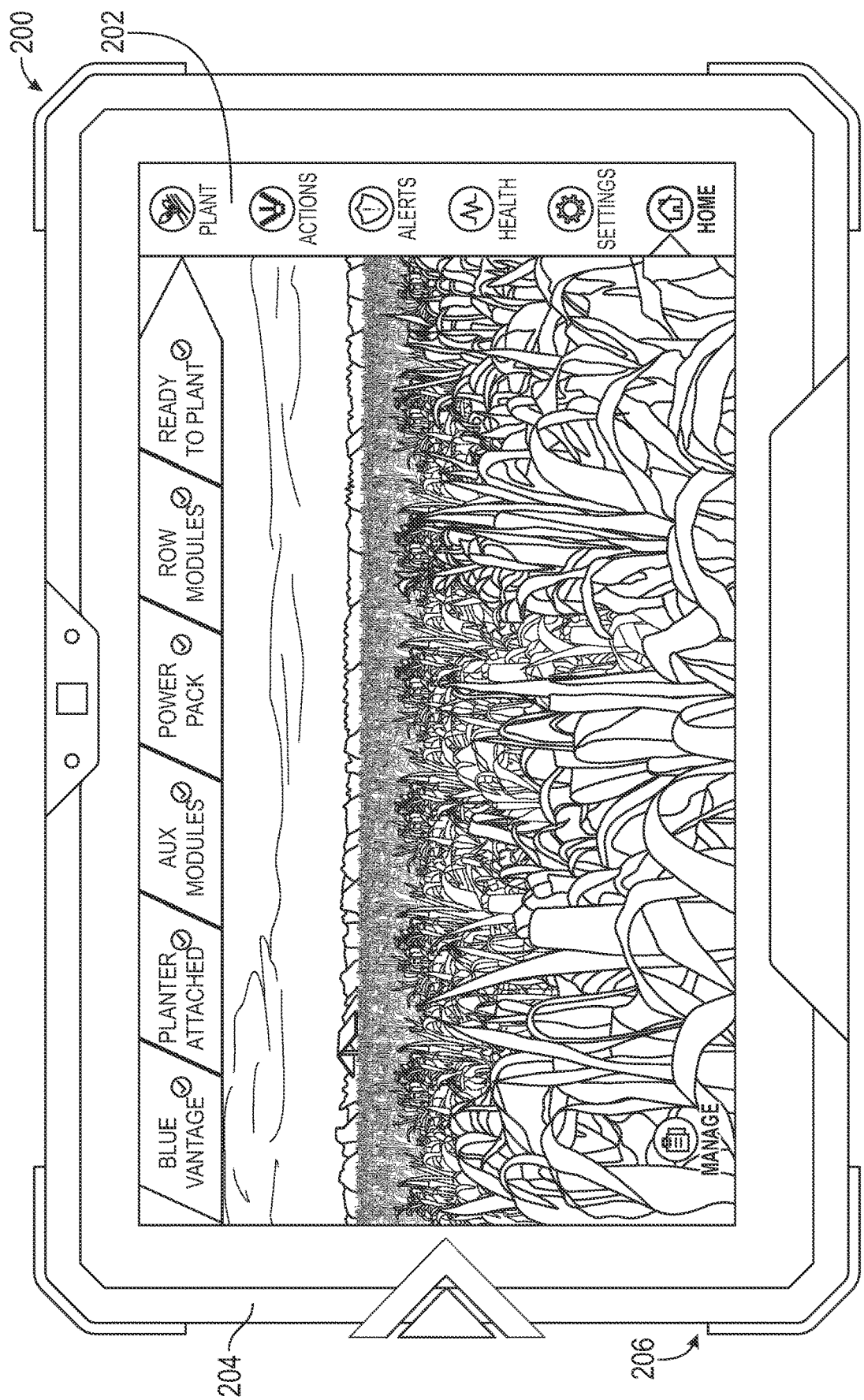
FIG. 7 is an exemplary view of a display unit for use with an agricultural planting implement.

An exemplary depiction of a display unit 200, such as may be used with any or all of the aspects and/or embodiments disclosed herein is shown generally in FIG. 7. It should be appreciated, as had been disclosed, that the display 200 shown in FIG. 7 is for exemplary purposes and is not to be limiting on the disclosure. However, as shown, the display 200 includes a screen area 202 surrounded by a fascia 204 or frame, which may be a part of the housing 206 of the display 200. The display 200 shown in FIG. 7 and others includes a colorized, graphical user interface, showing both colorized icons and images. In addition, it is noted that the display 200 shown in the figures is a touchscreen, allowing the display 200 to be interfaced via a touch by a user. This could be with an appendage, such as a finger, or a conduit, such as a stylus or other device. In the configuration shown, the housing/fascia 206/204 does not include any interfaces, such as inputs, but it is envisioned that buttons, knobs, or the like be included in the housing 206 outside of the screen 202 to provide inputs and other interfaces for controlling and/or inputting information with the display 200.

Additionally, while not shown, it is to be appreciated that the display unit 200 includes a processor, non-transitory computer readable medium, modules/programs, memory, operating system, database, power, communications/networks, and/or a number of inputs and/or outputs.

In communications and computing, a computer readable medium is a medium capable of storing data in a format readable by a mechanical device. The term "non-transitory" is used herein to refer to computer readable media ("CRM") that store data for short periods or in the presence of power such as a memory device.

One or more embodiments described herein can be implemented using programmatic modules, engines, or components. A programmatic module, engine, or component can include a program, a sub-routine, a portion of a program, or a software component or a hardware component capable of performing one or more stated tasks or functions. A module or component can exist on a hardware component independently of other modules or components. Alternatively, a module or component can be a shared element or process of other modules, programs, or machines.

The display 200 will preferably include an intelligent control (i.e., a controller) to establish and send/receive communications. The display can also include other components for establishing communications. Examples of such a controller may be processing units alone or other subcomponents of computing devices. The controller can also include other components and can be implemented partially or entirely on a semiconductor (e.g., a field-programmable gate array ("FPGA")) chip, such as a chip developed through a register transfer level ("RTL") design process.

A processing unit, also called a processor, is an electronic circuit which performs operations on some external data source, usually memory or some other data stream. Nonlimiting examples of processors include a microprocessor, a microcontroller, an arithmetic logic unit ("ALU"), and most notably, a central processing unit ("CPU"). A CPU, also called a central processor or main processor, is the electronic circuitry within a computer that carries out the instructions of a computer program by performing the basic arithmetic, logic, controlling, and input/output ("I/O") operations specified by the instructions. Processing units are common in tablets, telephones, handheld devices, laptops, user displays, smart devices (TV, speaker, watch, etc.), and other computing devices.

The memory includes, in some embodiments, a program storage area and/or data storage area. The memory can comprise read-only memory ("ROM", an example of non-volatile memory, meaning it does not lose data when it is not connected to a power source) and/or random access memory ("RAM", an example of volatile memory, meaning it will lose its data when not connected to a power source). Nonlimiting examples of volatile memory include static RAM ("SRAM"), dynamic RAM ("DRAM"), synchronous DRAM ("SDRAM"), etc. Examples of non-volatile memory include electrically erasable programmable read only memory ("EEPROM"), flash memory, hard disks, SD cards, etc. In some embodiments, the processing unit, such as a processor, a microprocessor, or a microcontroller, is connected to the memory and executes software instructions that are capable of being stored in a RAM of the memory (e.g., during execution), a ROM of the memory (e.g., on a generally permanent basis), or another non-transitory computer readable medium such as another memory or a disc.

Generally, the non-transitory computer readable medium operates under control of an operating system stored in the memory. The non-transitory computer readable medium implements a compiler which allows a software application written in a programming language such as COBOL, C++, FORTRAN, or any other known programming language to be translated into code readable by the central processing unit. After completion, the central processing unit accesses and manipulates data stored in the memory of the non-transitory computer readable medium using the relationships and logic dictated by the software application and generated using the compiler.

In one embodiment, the software application and the compiler are tangibly embodied in the computer-readable medium. When the instructions are read and executed by the non-transitory computer readable medium, the non-transitory computer readable medium performs the steps necessary to implement and/or use the present disclosure. A software application, operating instructions, and/or firmware (semi-permanent software programmed into read-only memory) may also be tangibly embodied in the memory and/or data communication devices, thereby making the software application a product or article of manufacture according to the present disclosure.

The database is a structured set of data typically held in a computer. The database, as well as data and information contained therein, need not reside in a single physical or electronic location. For example, the database may reside, at least in part, on a local storage device, in an external hard drive, on a database server connected to a network, on a cloud-based storage system, in a distributed ledger (such as those commonly used with blockchain technology), or the like.

The power supply outputs a particular voltage to a device or component or components of a device. The power supply could be a direct current ("DC") power supply (e.g., a battery), an alternating current ("AC") power supply, a linear regulator, etc. The power supply can be configured with a microcontroller to receive power from other grid-independent power sources, such as a generator or solar panel.

With respect to batteries, a dry cell battery may be used. Additionally, the battery may be rechargeable, such as a lead-acid battery, a low self-discharge nickel metal hydride battery ("LSD-NiMH"), a nickel—cadmium battery ("NiCd"), a lithium-ion battery, or a lithium-ion polymer ("LiPo") battery. Careful attention should be taken if using a lithium-ion battery or a LiPo battery to avoid the risk of unexpected ignition from the heat generated by the battery. While such incidents are rare, they can be minimized via appropriate design, installation, procedures and layers of safeguards such that the risk is acceptable.

The power supply could also be driven by a power generating system, such as a dynamo using a commutator or through electromagnetic induction. Electromagnetic induction eliminates the need for batteries or dynamo systems but requires a magnet to be placed on a moving component of the system.

The power supply may also include an emergency stop feature, also known as a "kill switch," to shut off the machinery in an emergency or any other safety mechanisms known to prevent injury to users of the machine. The emergency stop feature or other safety mechanisms may need user input or may use automatic sensors to detect and determine when to take a specific course of action for safety purposes.

In some embodiments, the network is, by way of example only, a wide area network ("WAN") such as a TCP/IP based network or a cellular network, a local area network ("LAN"), a neighborhood area network ("NAN"), a home area network ("HAN"), or a personal area network ("PAN") employing any of a variety of communication protocols, such as Wi-Fi, Bluetooth, ZigBee, near field communication ("NFC"), etc., although other types of networks are possible and are contemplated herein. The network typically allows communication between the communications module and the central location during moments of low-quality connections. Communications through the network can be protected using one or more encryption techniques, such as those techniques provided by the Advanced Encryption Standard (AES), which superseded the Data Encryption Standard (DES), the IEEE 802.1 standard for port-based network security, pre-shared key, Extensible Authentication Protocol ("EAP"), Wired Equivalent Privacy ("WEP"), Temporal Key Integrity Protocol ("TKIP"), Wi-Fi Protected Access ("WPA"), and the like.

ISO 11783, known as Tractors and machinery for agriculture and forestry—Serial control and communications data network (commonly referred to as "ISO Bus" or "ISOBUS") is a communication protocol for the agriculture industry based on the SAE J1939 protocol (which includes CAN bus). The standard comes in 14 parts: ISO 11783-1: General standard for mobile data communication; ISO 11783-2: Physical layer; ISO 11783-3: Data link layer; ISO 11783-4: Network layer; ISO 11783-5: Network management; ISO 11783-6: Virtual terminal; ISO 11783-7: Implement messages application layer; ISO 11783-8: Power train messages; ISO 11783-9: Tractor ECU; ISO 11783-10: Task controller and management information system data interchange; ISO 11783-11: Mobile data element dictionary; ISO 11783-12: Diagnostics services; ISO 11783-13: File server; ISO 11783-14: Sequence control.

Ethernet is a family of computer networking technologies commonly used in local area networks ("LAN"), metropolitan area networks ("MAN") and wide area networks ("WAN"). Systems communicating over Ethernet divide a stream of data into shorter pieces called frames. Each frame contains source and destination addresses, and error-checking data so that damaged frames can be detected and discarded; most often, higher-layer protocols trigger retransmission of lost frames. As per the OSI model, Ethernet provides services up to and including the data link layer. Ethernet was first standardized under the Institute of Electrical and Electronics Engineers ("IEEE") 802.3 working group/collection of IEEE standards produced by the working group defining the physical layer and data link layer's media access control ("MAC") of wired Ethernet. Ethernet has since been refined to support higher bit rates, a greater number of nodes, and longer link distances, but retains much backward compatibility. Ethernet has industrial application and interworks well with Wi-Fi. The Internet Protocol ("IP") is commonly carried over Ethernet and so it is considered one of the key technologies that make up the Internet.

The Internet Protocol ("IP") is the principal communications protocol in the Internet protocol suite for relaying datagrams across network boundaries. Its routing function enables internetworking, and essentially establishes the Internet. IP has the task of delivering packets from the source host to the destination host solely based on the IP addresses in the packet headers. For this purpose, IP defines packet structures that encapsulate the data to be delivered. It also defines addressing methods that are used to label the datagram with source and destination information.

The Transmission Control Protocol ("TCP") is one of the main protocols of the Internet protocol suite. It originated in the initial network implementation in which it complemented the IP. Therefore, the entire suite is commonly referred to as TCP/IP. TCP provides reliable, ordered, and error-checked delivery of a stream of octets (bytes) between applications running on hosts communicating via an IP network. Major internet applications such as the World Wide Web, email, remote administration, and file transfer rely on TCP, which is part of the Transport Layer of the TCP/IP suite.

Transport Layer Security, and its predecessor Secure Sockets Layer ("SSL/TLS"), often runs on top of TCP. SSL/TLS are cryptographic protocols designed to provide communications security over a computer network. Several versions of the protocols find widespread use in applications such as web browsing, email, instant messaging, and voice over IP ("VoIP"). Websites can use TLS to secure all communications between their servers and web browsers.

In some embodiments, a device could include one or more communications ports such as Ethernet, serial advanced technology attachment ("SATA"), universal serial bus ("USB"), or integrated drive electronics ("IDE"), for transferring, receiving, or storing data.

In some embodiments, a satellite-based radio-navigation system such as the global positioning system ("GPS") is used. GPS is owned by the United States and uses satellites to provide geolocation information to a GPS receiver. GPS, and other satellite-based radio-navigation systems, can be used for location positioning, navigation, tracking, mapping, and geofencing.

It should further be noted that it is contemplated that a planter includes sensors and/or modules. Modules can be placed on and around the planter and include various sensors to provide information to an intelligent control. The sensors may include vision sensors, radar sensors, LIDAR sensors, heat sensors, moisture content sensors, radio frequency sensors, short-range radio, long-range radio, antennas, and the like. These sensors can be grouped in any manner and can be used to determine many aspects. For example, the sensors can be used to determine the location of a nearby object or obstruction. The sensors may be used to determine soil characteristics, such as moisture content, compaction, temperature, and the like. The sensors can also be location sensors to determine if the planter is on level ground, on a side hill, going up or down hill, etc. The location sensors can also determine areas in which the planter and/or implement are not to travel, based upon pre-determined and/or programmed data. The sensors can then indicate to actuators or other mechanisms on the planter to prevent the planter from rolling over, becoming stuck, running into an object, or otherwise putting the planter in an undesirable situation. The sensors could also be used with location determining systems, such as GPS. The combination of the sensors and location determination systems would allow a planter to travel to a location without running into obstructions, without running into other planters, without damaging planted or existing crops, as well as with obeying other rules, such as traffic regulations. The sensors and/or location determining systems would allow a planter to travel from one location to another, to locations within a field, or otherwise in combination with additional vehicles safely and precisely.

Referring back to FIG. 7, the display 200 includes a number of icons and toolbars, for example, the toolbar across the upper portion of the display 200 and the toolbar with icons along the right side of the display 200, which can lead to additional screens, which will provide more options, inputs, and/or controls.

Figure 8:
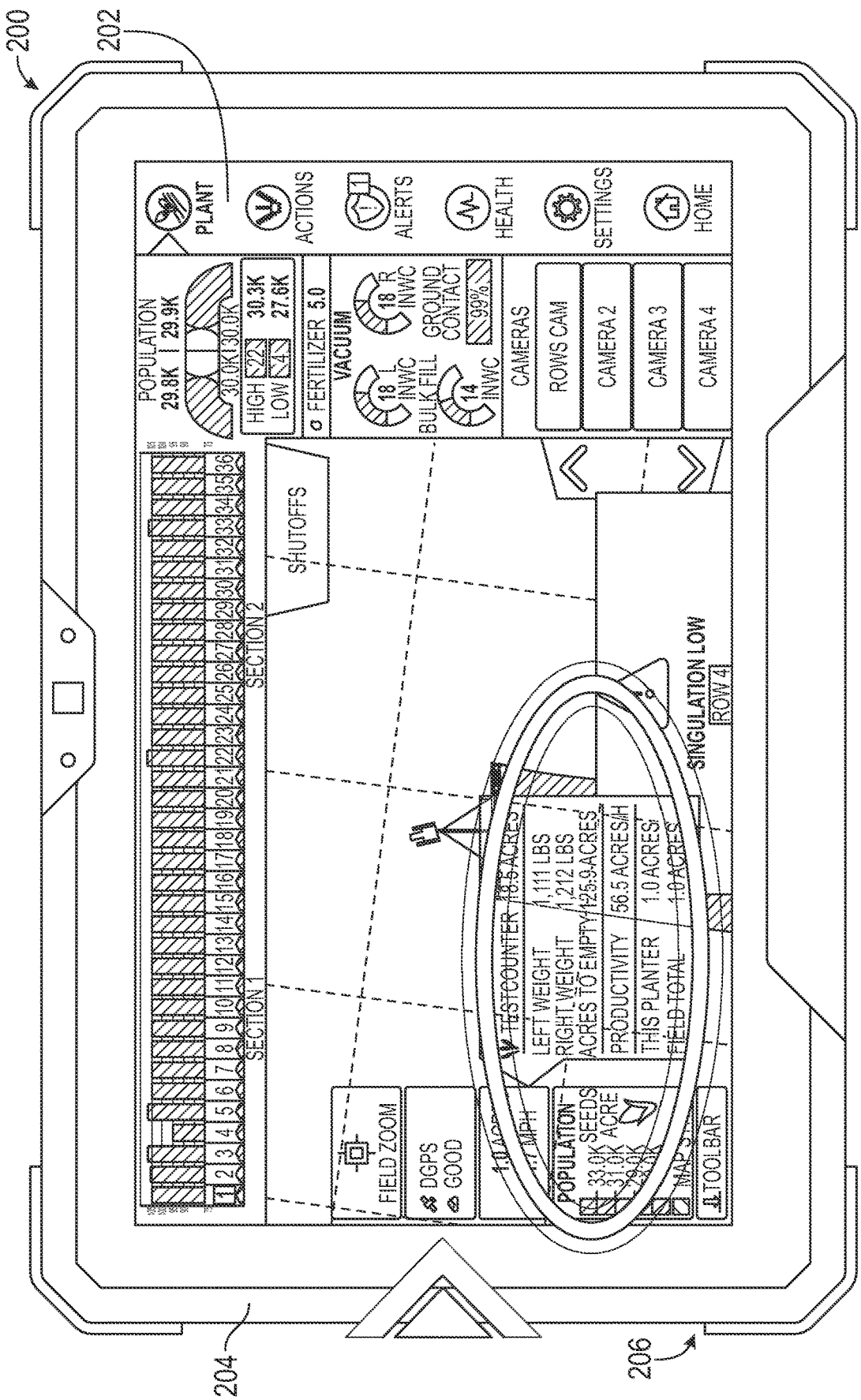
FIG. 8 is an exemplary view of a display unit for use with an agricultural planting implement showing planting and/or productivity data.

FIG. 8 is an exemplary depiction of the display 200 used during planting by a planting implement. The screen 202 shows a graphical depiction of a tow vehicle and agricultural planting implement moving through an exemplary agricultural field. A number of icons, sections, and other portions of the display screen 202 include information related to the planting and movement of the tractor and implement. This includes, but is not limited to, speed, heading, downforce information (contact %), row unit information, population, planting and productivity information (seen in the lower, left portion of the exemplary display of FIG. 8), etc. This is in the form of numbers, text, percentages, colorized information, graphics, and combinations of the same. As will be understood, the screen 202 can be changed, such as per user preference, to selectively show desired information and to shuffle through various screens. Nonlimiting examples include that the user can look at issues/warnings/alerts that may be indicated by the system, can look at help guides and/or manuals for operation instructions, can look at field information, or can even make changes to one or more components of the planting system. For example, changes can be made to accommodate planting preferences, information shown/displayed, or to run diagnostics.

The display system is adapted to include the ability to continuously measure and/or monitor the amount of seed remaining in the planting implement. By monitoring the amount of seed remaining in the implement, the system can continuously calculate and/or determine the number of acres that the implement can plant without needing to refill with more seed. For example, in FIG. 8, the planting and/or productivity information includes a field titled ACRES TO EMPTY, which measures the number of acres the planter can plant before running out of seed. This "acres to empty" number is based, at least in part, on the amount of seed remaining in the planter. The number includes the amount of seed as well as the rate of seed (population, number of row units, etc.) and other data points to provide an estimate for how many additional acres the implement could plant with the current amount of seed.

Figure 11:
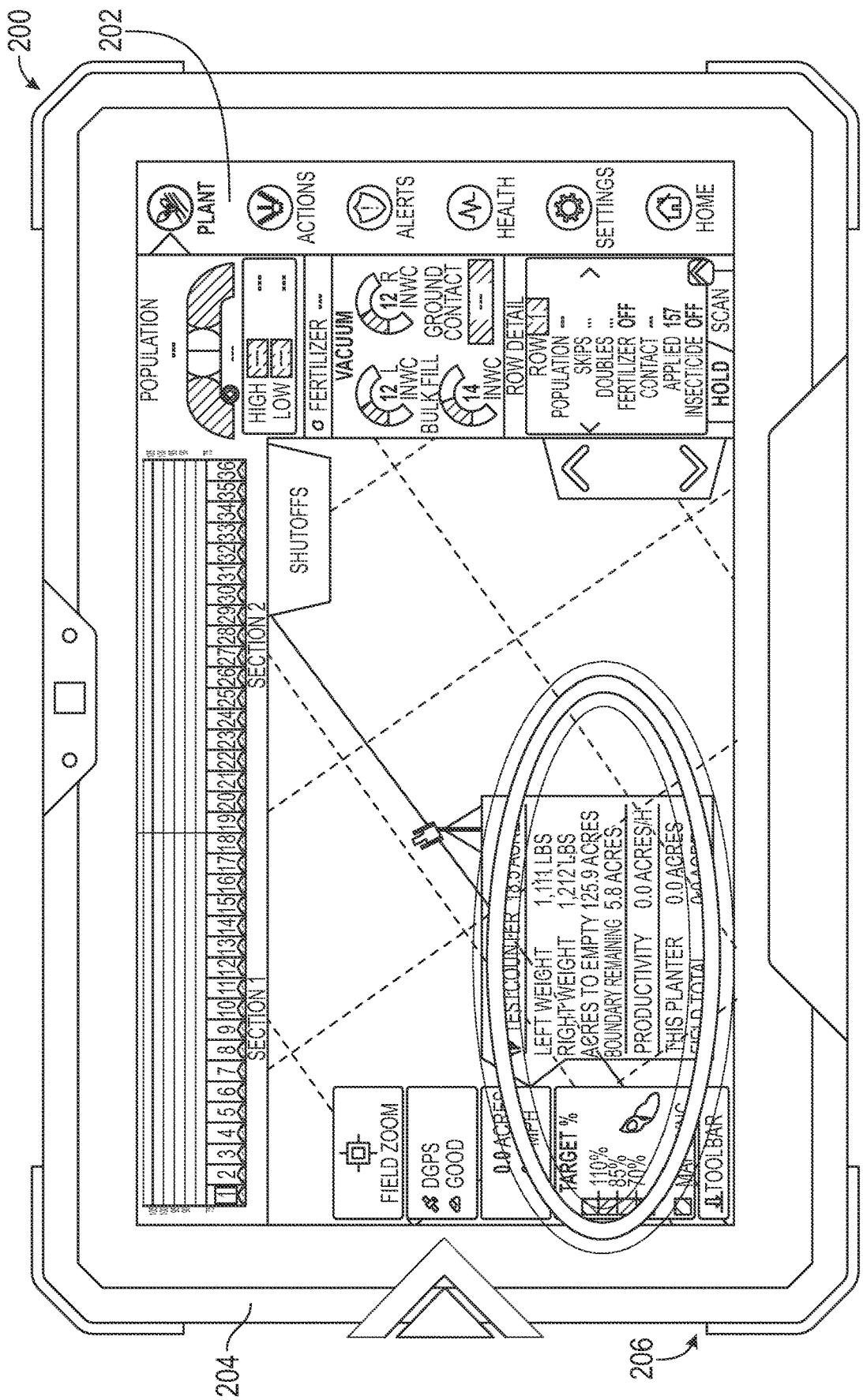
FIG. 11 is an exemplary view of a display unit for use with an agricultural planting implement showing planting and/or productivity data.

The display system is also adapted to be able to continuously measure and/or monitor the number of acres remaining to plant. The display system continuously calculates and/or determines the number of acres remaining to plant, which is based, at least in part, on a total number of acres to plant (which may be specified in a particular boundary), and the number of acres already planted. The total number of acres to plant can initially be input into the display unit 200 via a user. Alternatively, the total number of acres to plant can be determined automatically by the display system in a number of ways including, but not limited to, mapping data, GPS data, geofencing, boundary data input by a user, historical data, and any combination thereof. For example, the display system could use GPS coordinates of an agricultural field to calculate and/or determine the size of the field in acres. A user can input boundary data via the display unit 200 such that the display system only calculates total acres to be planted and remaining acres to be planted inside of that boundary. FIG. 11 provides an example. FIG. 11 shows planting and/or productivity data in the lower, left portion of the screen 202 of the display unit 200, wherein the planting and/or productivity information includes a field labeled BOUNDARY REMAINING. This "boundary remaining" field notes how many acres are remaining within the specified boundary that still need to be planted. The display system is able to continuously measure and/or monitor the number of acres already planted.

By determining the amount of seed remaining in the planter and the number of acres remaining to be planted, the display system can determine whether the planter can finish planting the specified area without needing to be filled with additional seed. The display system can first determine the amount of seed required to finish planting the specified area based, at least in part, on the number of acres remaining to be planted and the amount of seed being planted per acre. If the amount of seed remaining in the planter is less than that required, the planter will need to be filled with additional seed in order to finish planting the specified area. If the amount of seed remaining in the planter is greater than that required, the planter will not need to be filled with additional seed in order to finish planting the specified area. Additionally, the system can utilize the ACRES TO EMPTY calculation. If the ACRES TO EMPTY number is less than the number of acres remaining to be planted, the planter will require additional seed in order to finish planting the specified area. If the ACRES TO EMPTY number is greater than the number of acres remaining to be planted, the planter will not require additional seed in order to finish planting the specified area. The system is adapted to display, as a message via the 200, the amount of seed required to finish planting a specified area. This message may be displayed based on an automatic and/or configurable threshold.

If the planter needs to be filled with additional seed, the display system is adapted to present an alert and/or warning via the display unit 200 indicating that the planter does not have enough seed to finish planting and to indicate the amount of seed needed to finish planting. Additionally and/or alternatively, the display system may present an option via the display unit 200 to call for the precise amount of seed needed in order to finish planting to be delivered. The display unit 200 can call for additional seed to be delivered via cellular network, Wi-Fi, Ethernet, Bluetooth, radio, satellite, or any other reasonable medium of communication. For example, the tablet could be connected to a farm management system that will indicate the need for and amount of seed needed to finish planting in a particular area. The management system could coordinate the delivery of the needed amount of seed to the field location for addition to the implement. The system could also be connected to a seed distributor to allow for the direct communication for the need of additional seed. In either sense, the communication for the addition of seed would increase the efficiency of completing the tasks in a field.

Another feature of the display system is the ability for a display unit, which is associated with an agricultural implement, to communicate with other agricultural implements, either directly or via a plurality of display units each of which is associated with an agricultural implement.

Figure 9:
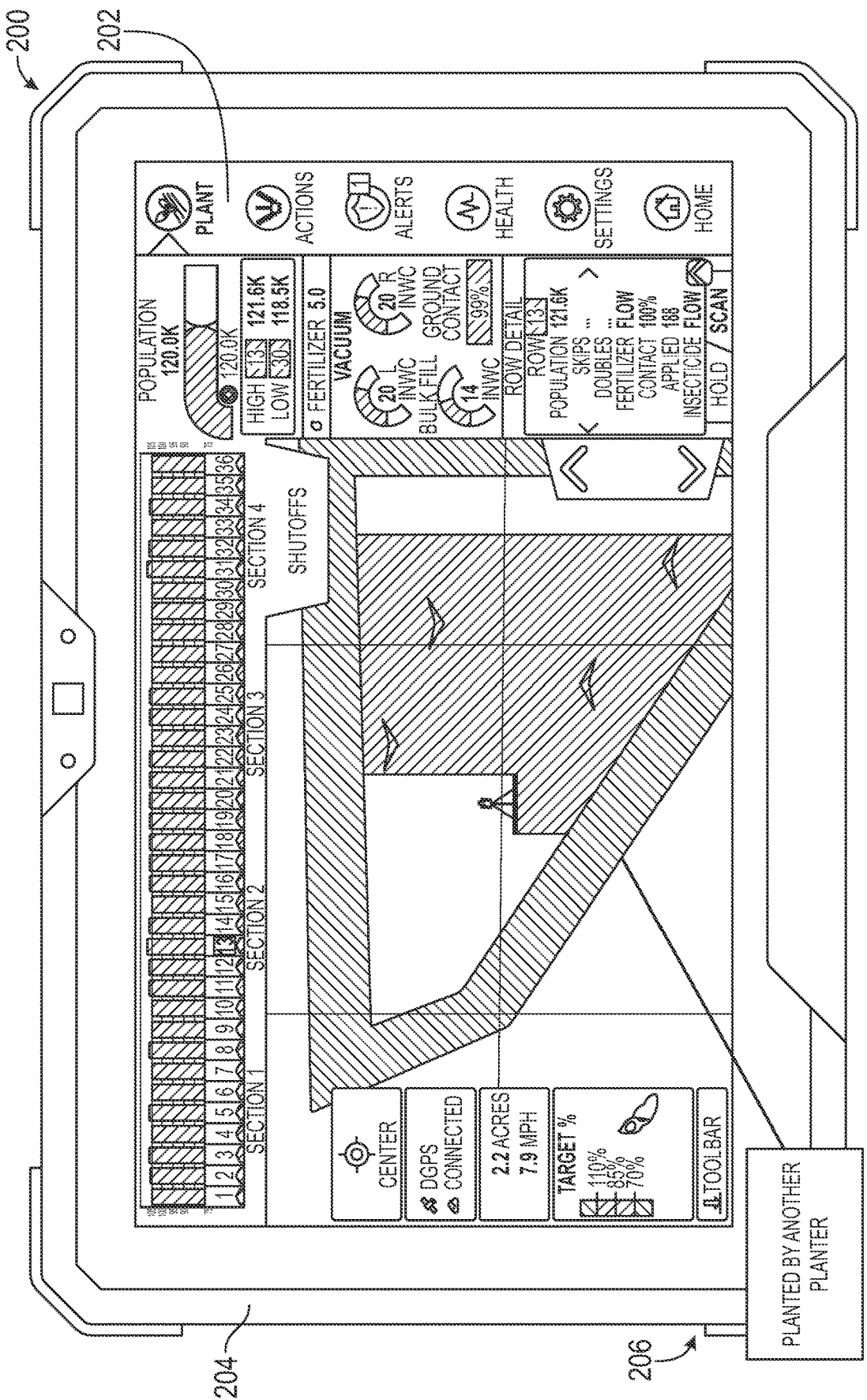
FIG. 9 is an exemplary view of a display unit for use with an agricultural planting implement showing planting data.

FIG. 9 is an example of multiple display units in communication with each other. For instance, the exemplary display unit 200 of FIG. 9 includes a graphical depiction of a tow vehicle and implement moving through an exemplary field. The display unit 200 also shows areas of the field that have been planted by another implement, represented in blue in FIG. 9. Thus, multiple planters are capable of planting the same field while being in communication with one another via each of their display units. Additional details for this can be found in co-owned patent application Ser. No. 17/302,344, which is hereby incorporated by reference in its entirety.

When multiple planters are planting the same field, the system is adapted to calculate and determine, as described above, the amount of seed each planter has remaining as well as the number of acres remaining to plant. The system can also monitor and/or calculate the total number of acres planted as well as the number of acres planted by each planter and communicate that information amongst each display unit (i.e., "shared data"). The display system is adapted so that the multiple planters can communicate with one another, via their respective display units, such that they can coordinate and/or strategize as to how to finish planting the field. Users can facilitate communication between planters via the display 200. Users can communicate via the display units 200 to decide which planter should plant which portions of the field. Alternatively, the display system can automatically determine a planting strategy. For example, part of the planting strategy may include determining which portions of the field each planter should plant as well as whether a subset of the multiple planters should finish planting while other planters cease planting. Additionally, a user can input via a display unit 200 a command and/or instructions for the multiple planters to optimize a path for each of the multiple planters to ensure that the field is completely planted in an efficient, cost-effective, and/or time-sensitive manner. Factors that may affect the strategy and/or optimization of the multiple planters include, but are not limited to the amount of seed remaining in each planter, the number of acres remaining to plant, the location of each planter, the model, size, and/or nature of each planter, the terrain of the field to be planted, the weather and/or environmental conditions, or any combination thereof.

Figure 22:
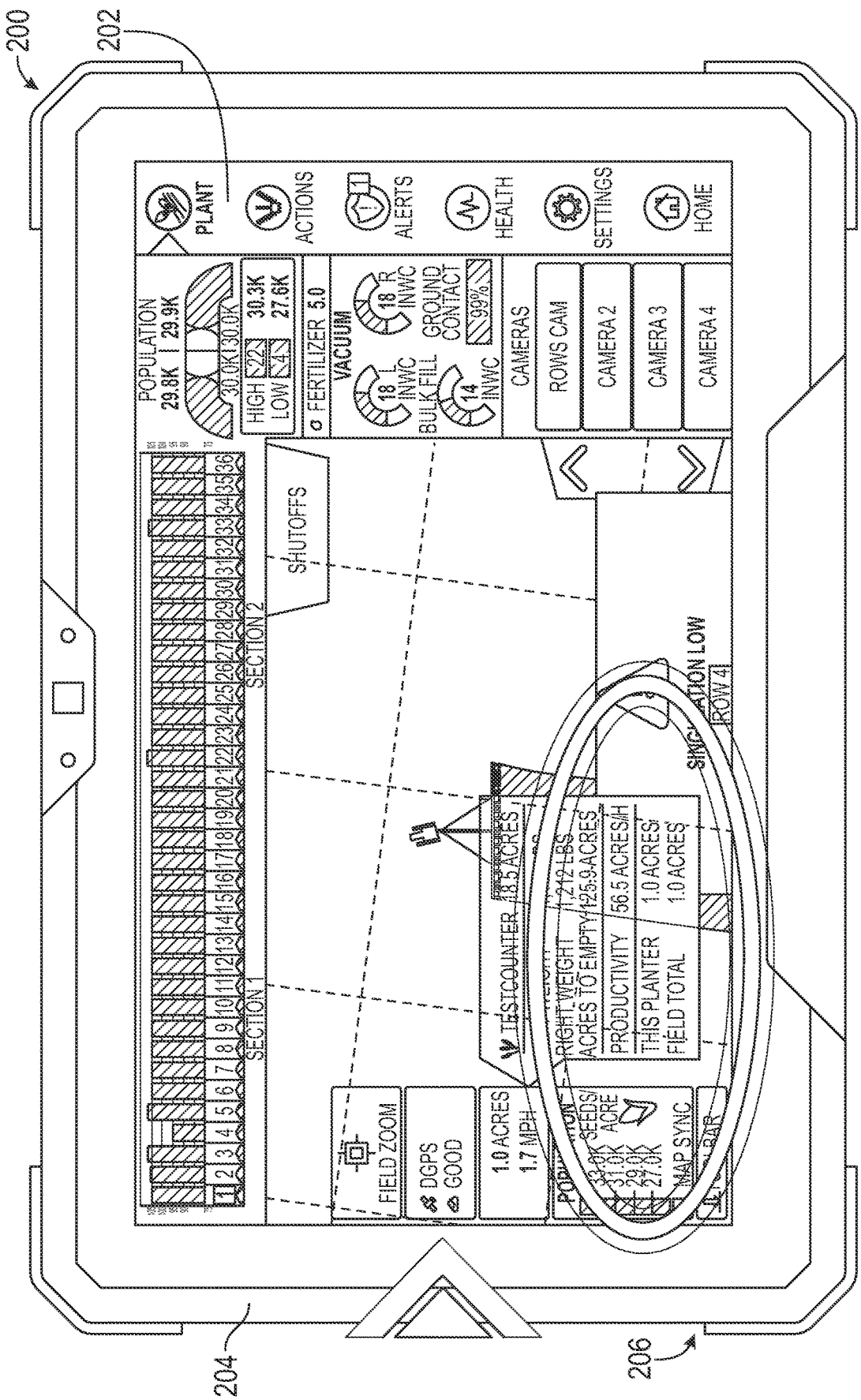
FIG. 22 is an exemplary view of a display unit for use with an agricultural planting implement showing planting and/or productivity data.

As an example, FIGS. 8 and 22 show an example of a display unit 200 wherein multiple planters are being used to plant a field. In the bottom, left portion of the exemplary display units 200 of FIGS. 8 and 22, the planting and/or productivity information includes an acre number displayed for THIS PLANTER and for FIELD TOTAL. Thus, the display unit 200 shows the number of acres planted by the planter associated with that particular display unit 200 as well as the total number of acres of the field that are planted, which may include acres planted by other planters. Accordingly, the display units 200 associated with each planter that are planting the same field are in communication with each other and are each capable of showing a shared acre count.

Figure 10:
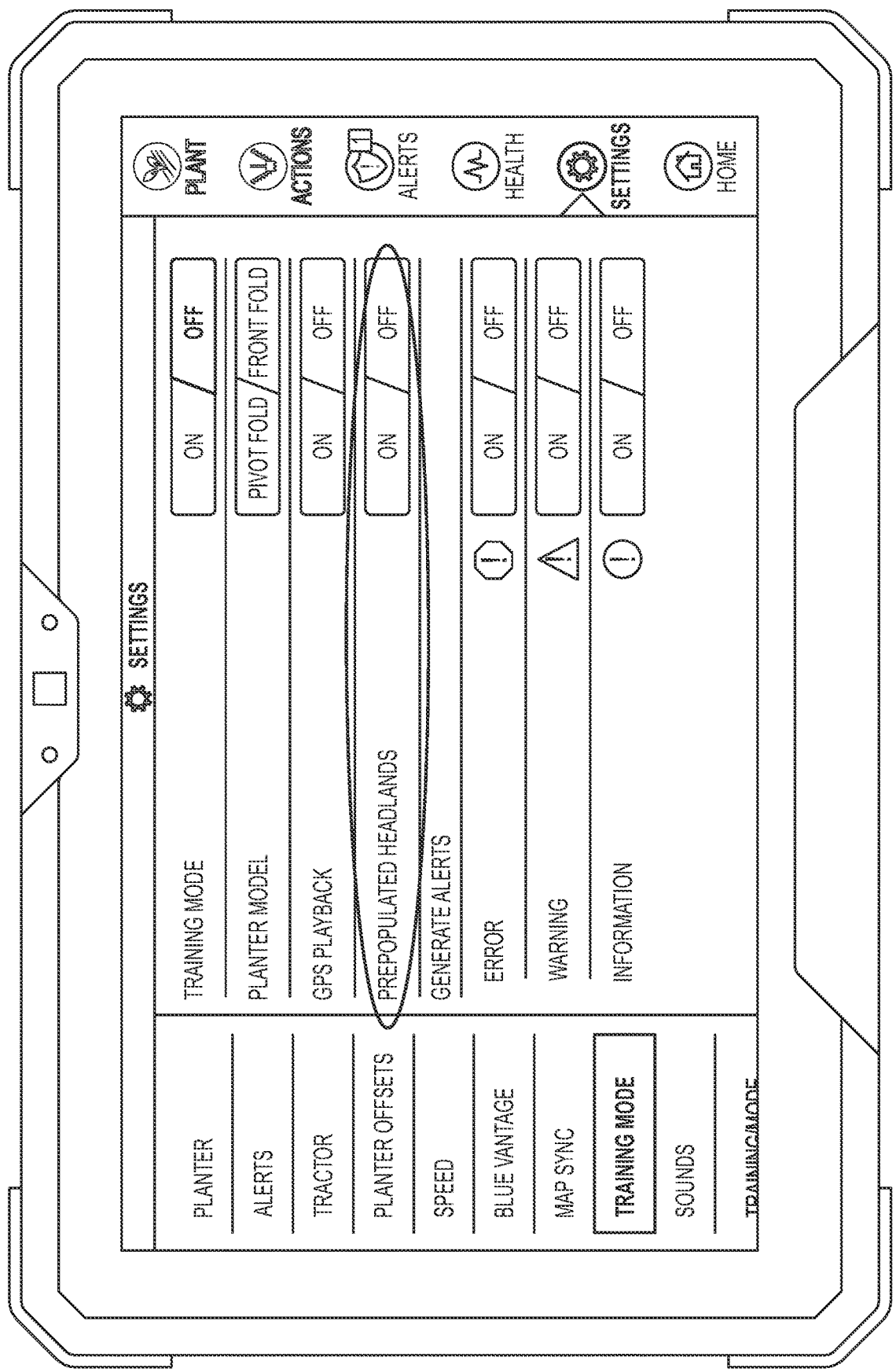
FIG. 10 is an exemplary view of a portion of a display unit for use with an agricultural planting implement showing customizable categories.

FIG. 10 is an exemplary sub-screen highlighting the ability to toggle prepopulated headlands on or off. Headlands refer to the strip of land around the perimeter of an agricultural field. For example, the area of the field in FIG.

9 that is planted by another planter may be the prepopulated headlands for a particular field. Thus, a user can include prepopulated headlands as part of the data if they have already been planted by another implement. The toggle in FIG. 10 allows for training or viewing to see what the display would look like if another planter was planting in a common field. This would allow a user to practice with the display unit ahead of actual operations with an implement, so that they can be familiar with the look and feel of the system.

Referring back to FIG. 11, and as stated above, a user is able to specify, via the display unit 200, a boundary such that the display system calculates the acres remaining to be planted within said boundary. Additionally or alternatively, the display system is able to determine the boundary automatically.

Figure 12:
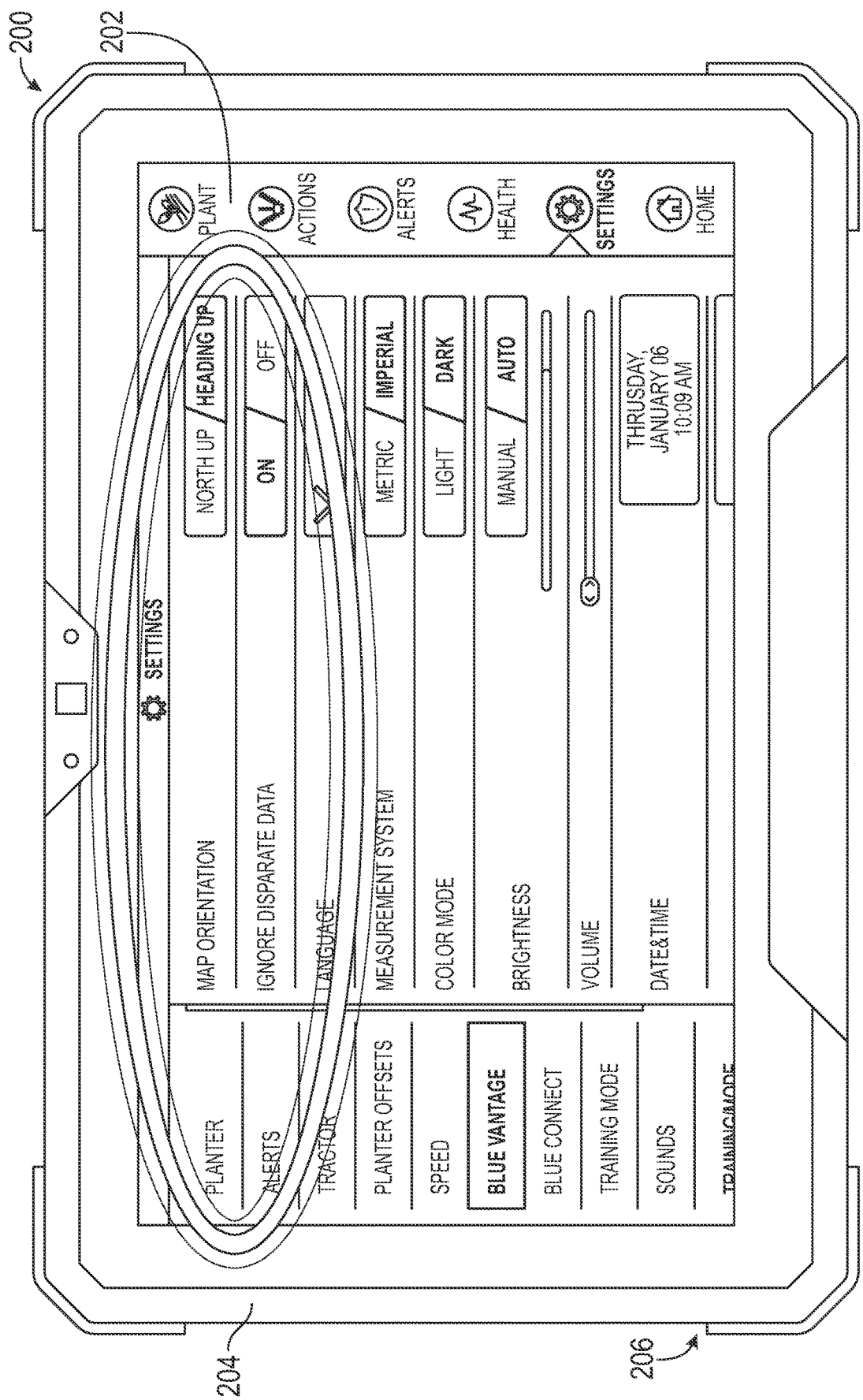
FIG. 12 is an exemplary view of a display unit for use with an agricultural planting implement showing customizable categories.

Another feature of the display system is the ability to ignore disparate data from outside an area. FIG. 12 shows an exemplary depiction of the display unit 200 wherein a user is able to toggle ON or OFF the ability to ignore disparate data. The user is also able to specify, via the display unit 200, an area X miles around a field, wherein X is any number greater than zero, such that the area extends X miles from each side of a field. For example, the area may be defined as a circular area, wherein X refers to a radius from the center of the field. Additional geometric shapes for determining the area may also be used. Specifying and/or defining such an area may be accomplished via geofencing, GPS information, and/or any other reasonable means. Then, if a user has chosen to ignore disparate data via the display unit 200, the display system will not display any data outside of the specified area. No information related to planting (such as any acre count, location of planting, or other operation) and/or movement of the tractor and/or implement will be displayed outside of the specified area. Also, no data related to weather, environmental factors, and the like will be displayed outside of the specified area. By specifying an area that extends beyond the perimeter of a field, the display system is able to provide better zoom-in/zoom-out functionality pertaining to that particular agricultural field and is able to provide better reports than if the specified area did not extend beyond the perimeter of the field.

Figure 13:
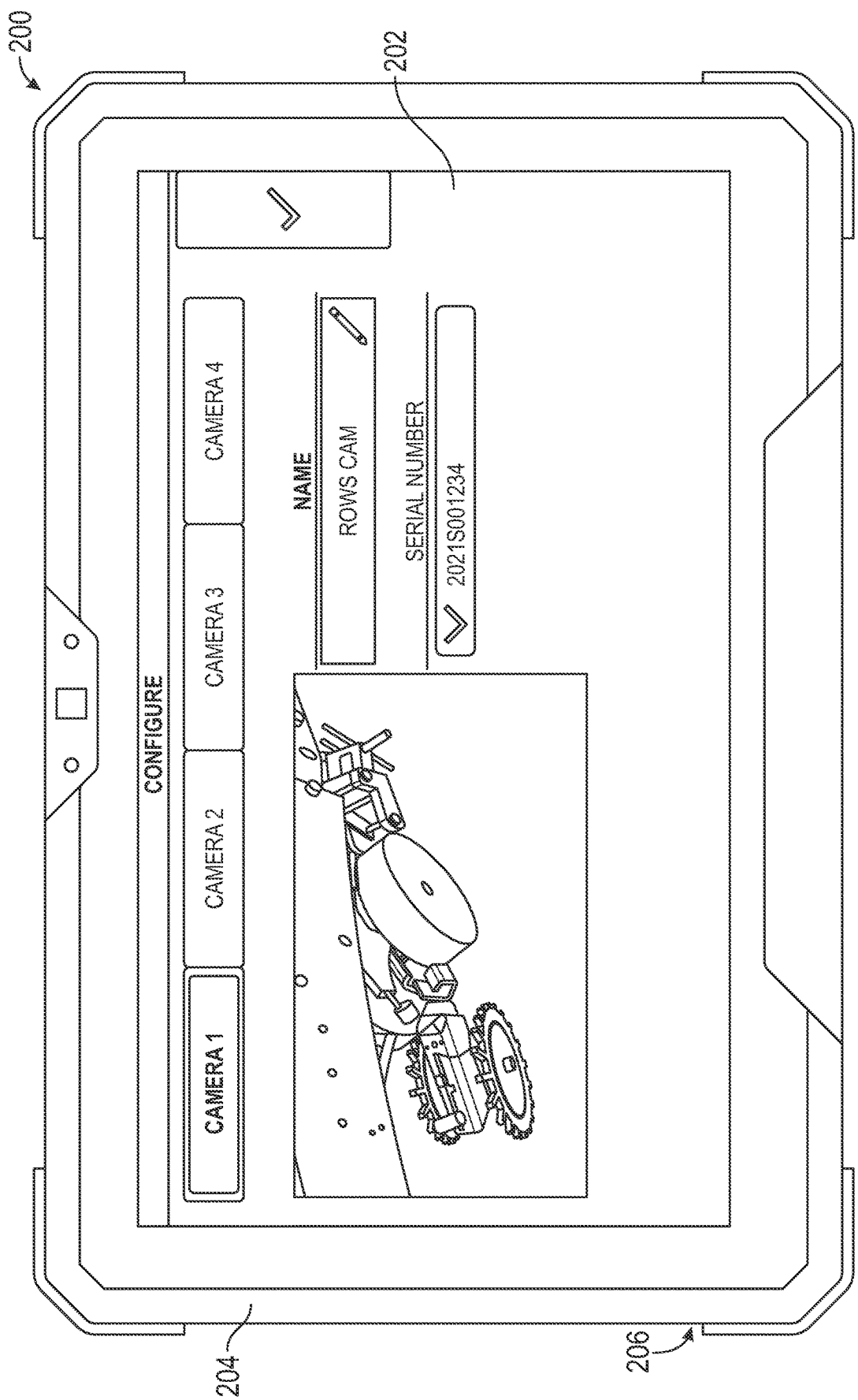
FIG. 13 is an exemplary view of a display unit for use with an agricultural planting implement showing camera data.
Figure 14:
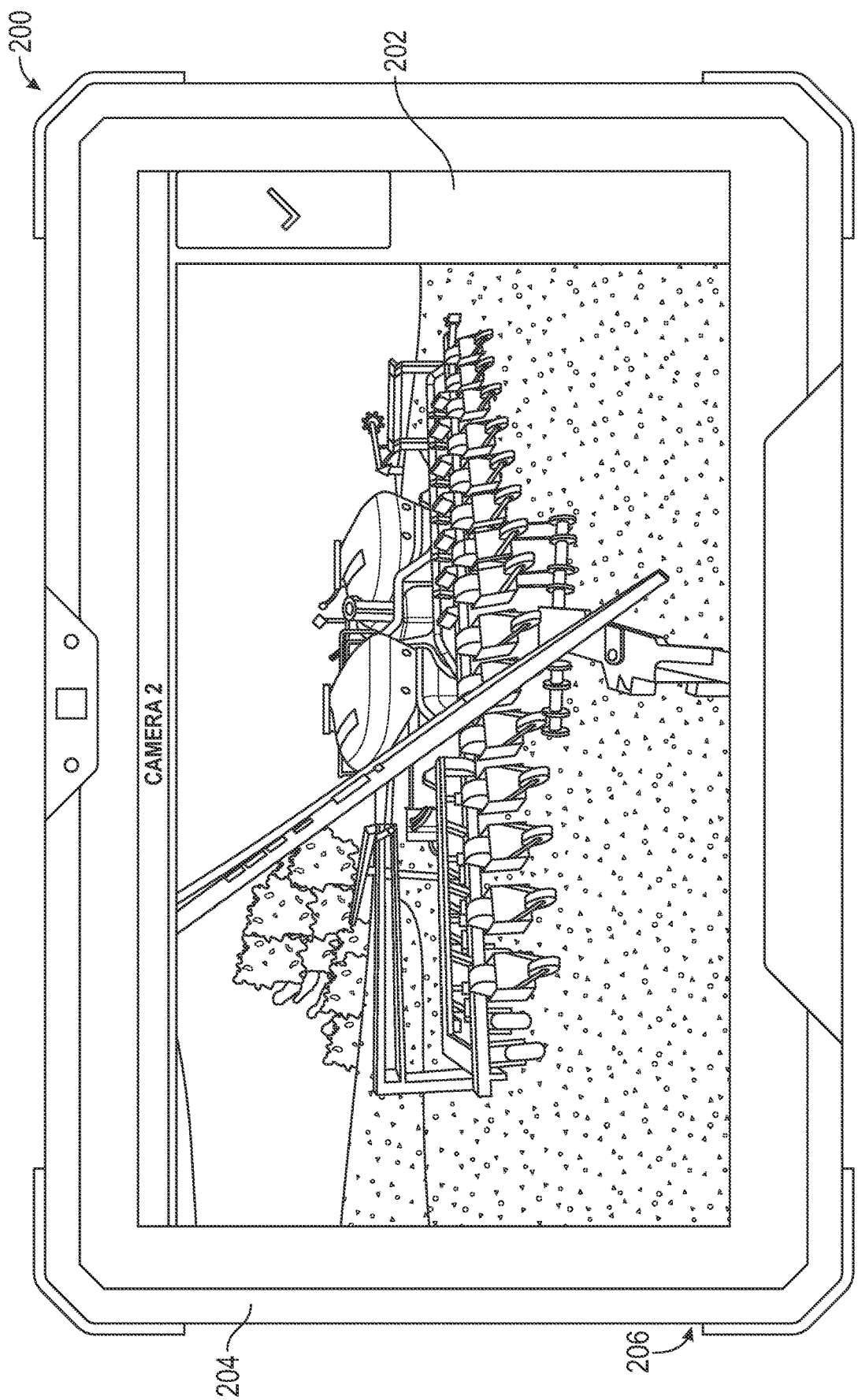
FIG. 14 is an exemplary view of a display unit for use with an agricultural planting implement showing camera data.
Figure 15:
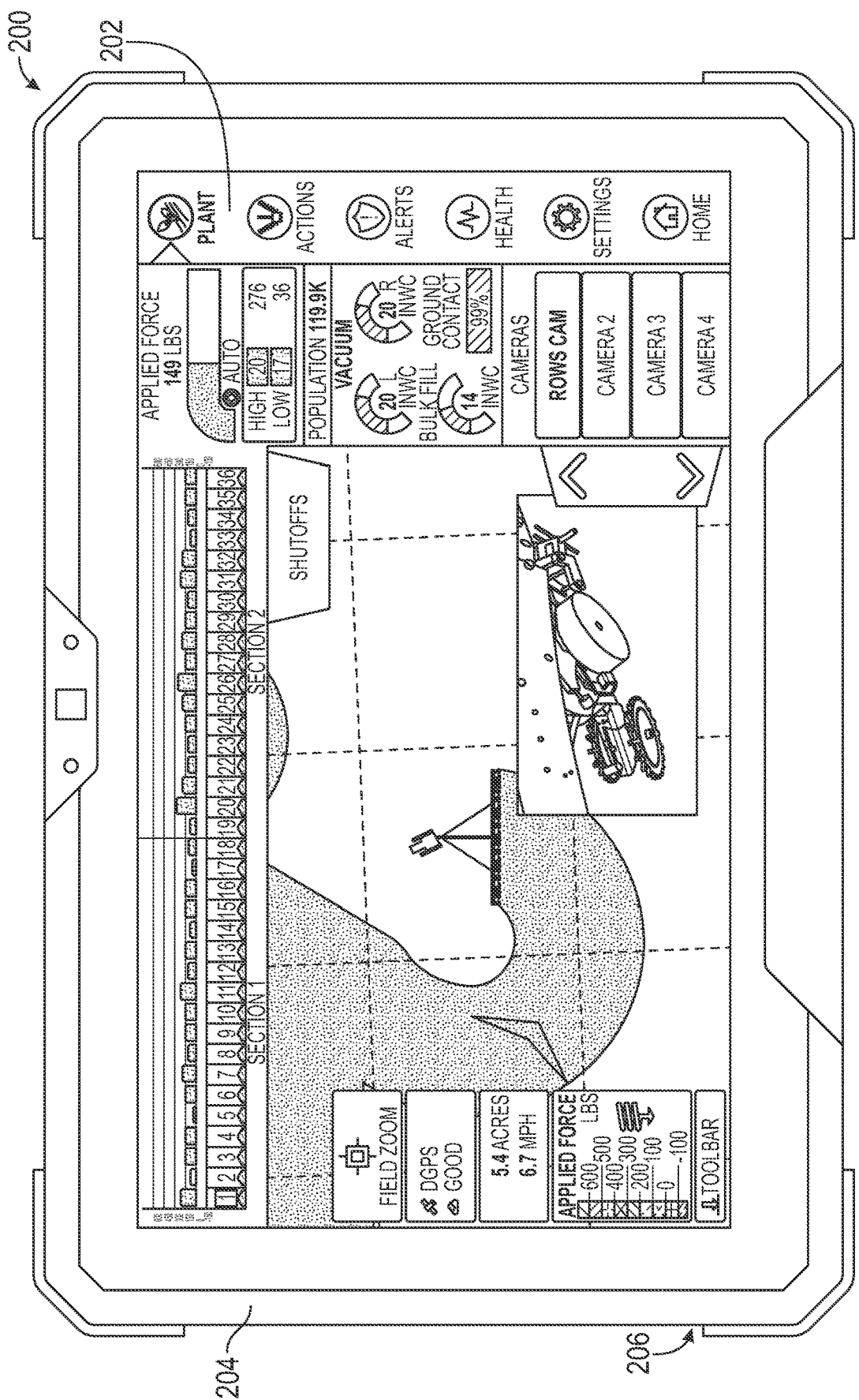
FIG. 15 is an exemplary view of a display unit for use with an agricultural planting implement showing camera data and planting data.

Another feature of the display system is to have one or more cameras associated with and operationally connected to a display unit 200 so that the display unit 200 can show camera data related to any of the cameras. Such camera data refers to any picture, image, video, audio, information, and/or recording captured by a camera. Camera data captured by the one or more cameras can be in real time or can be recorded. Thus, the display unit 200 is capable of displaying whatever is captured by the one or more cameras. FIGS. 13, 14, and 15 show an exemplary display unit 200 that is showing camera data from the associated cameras.

The cameras may be located on, at, or near the tow vehicle, such as a tractor, and/or on, at, or near the agricultural implement, such as a planter. The cameras can be positioned such that camera data captured by the cameras shows particular aspects and/or modules of the implement and or tow vehicle such as, but not limited to, zoomed-in views of, for example, particular row units and/or wheels, as well as zoomed-out views that may encompass a view of the entire tow vehicle and/or planter. The display system is adapted to allow a user to name the different cameras and choose which cameras to show on the display unit 200. A user can choose to show camera data from a particular camera on the display unit 200 or on a portion of the display unit 200. The presentation of camera data on the display unit 200 is customizable and modifiable. For example, the exemplary display unit 200 of FIG. 13 shows camera data being displayed in a portion of the display unit's screen 202 during configuration of the cameras. The display unit 200 includes a toolbar at the top in which a user can toggle between cameras. The display unit 200 also includes an editable field in which a user can name each camera. The cameras are automatically configurable and are automatically calibrated with the display unit 200. A user may add additional configuration by naming each camera.

As mentioned, a user can manipulate the layout of the cameras on the display unit 200 so that they are presented to the user's liking. For instance, the display is adapted to show camera data in a portion of the screen 202, such as in a single quadrant of the screen 202. The display system is adapted to allow a user to move the camera data such that at one moment in time it appears in a particular quadrant and/or portion of the screen 202 and at a different moment it appears in a different quadrant and/or portion of the screen 202. Additionally, the display unit 200 is adapted to allow camera data to be shown in a full-screen manner so that the camera data appears in substantially the entirety of the display unit's screen 202. An example of camera data appearing in a full-screen manner can be seen in FIG. 14.

The system is also adapted to allow camera data to be displayed in a picture-in-picture manner such that camera data is visible in a portion of the screen 202 wherein other data such as planting and/or productivity information is visible in other portions of the display unit's screen 202 at the same time. An example of displaying camera data in a picture-in-picture manner with other data such as planting and/or productivity information also being displayed can be see in FIG. 15. The exemplary display unit 200 in FIG. 15 also includes options to toggle between the different cameras. While the camera data shown in FIG. 15 is located somewhat in the lower, right portion of the display unit 200, a user is able to move the camera data so that it is shown in other places on the display unit 200. Thus, if a user wants to be able to view other data such as planting and/productivity data that is currently being covered by camera data, a user can move the camera data so that it is shown in a different portion of the display unit's screen 202, such as in a different quadrant.

Still further, it is envisioned that the images from the cameras can be communicated to a different device or to multiple devices at once, such as via the display unit 200. A user may connect to the particular display unit 200, such as via another display unit 200 or another device (e.g., handheld, phone, tablet, computer, or the like). The remote user can view the screen 202 of the display 200 in real time, so as to view the operations of the implement 10.

Figure 16:
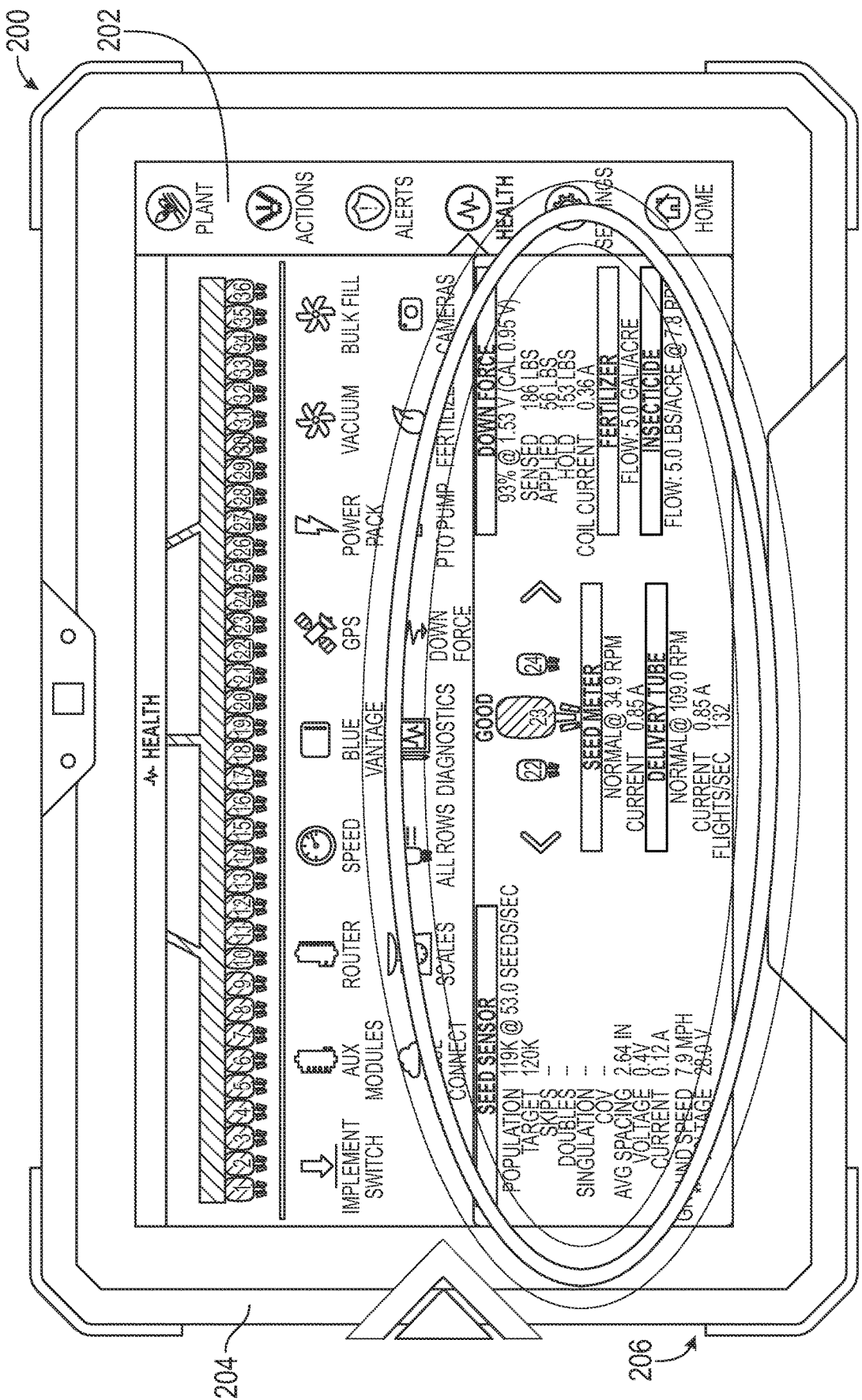
FIG. 16 is an exemplary view of a display unit for use with an agricultural planting implement showing information related to components of the implement.

FIG. 16 is an exemplary display unit 200 wherein the display unit 200 is showing diagnostic information related to row health. The row health diagnostic feature of the display system allows the display unit 200 to show individual row units and information related to each row unit such as the condition and/or status of the seed meter 142 and or delivery tube of each row unit. Additionally, the exemplary row health diagnostics tool of FIG. 16 shows information related to seed sensors, down force, fertilizer, and insecticide. A user is able to toggle between different row units to view the information associated with each row unit.

Figure 17:
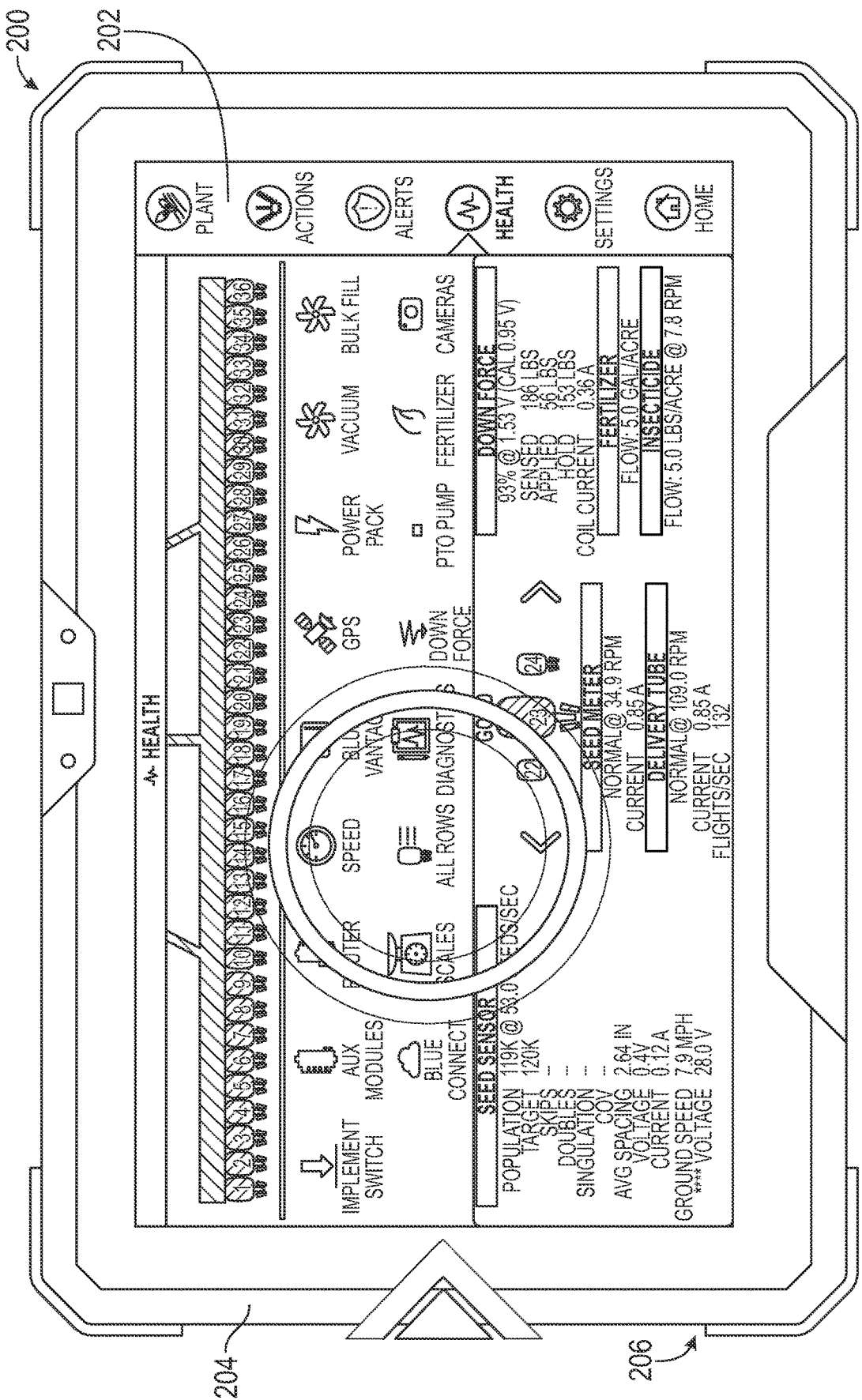
FIG. 17 is an exemplary view of a display unit for use with an agricultural planting implement showing information related to components of the implement.

FIG. 17 is an exemplary display unit 200 highlighting the fact that a user may view information related to the row units of the planter across all rows in addition to viewing information pertaining to a single row unit.

Figure 18:
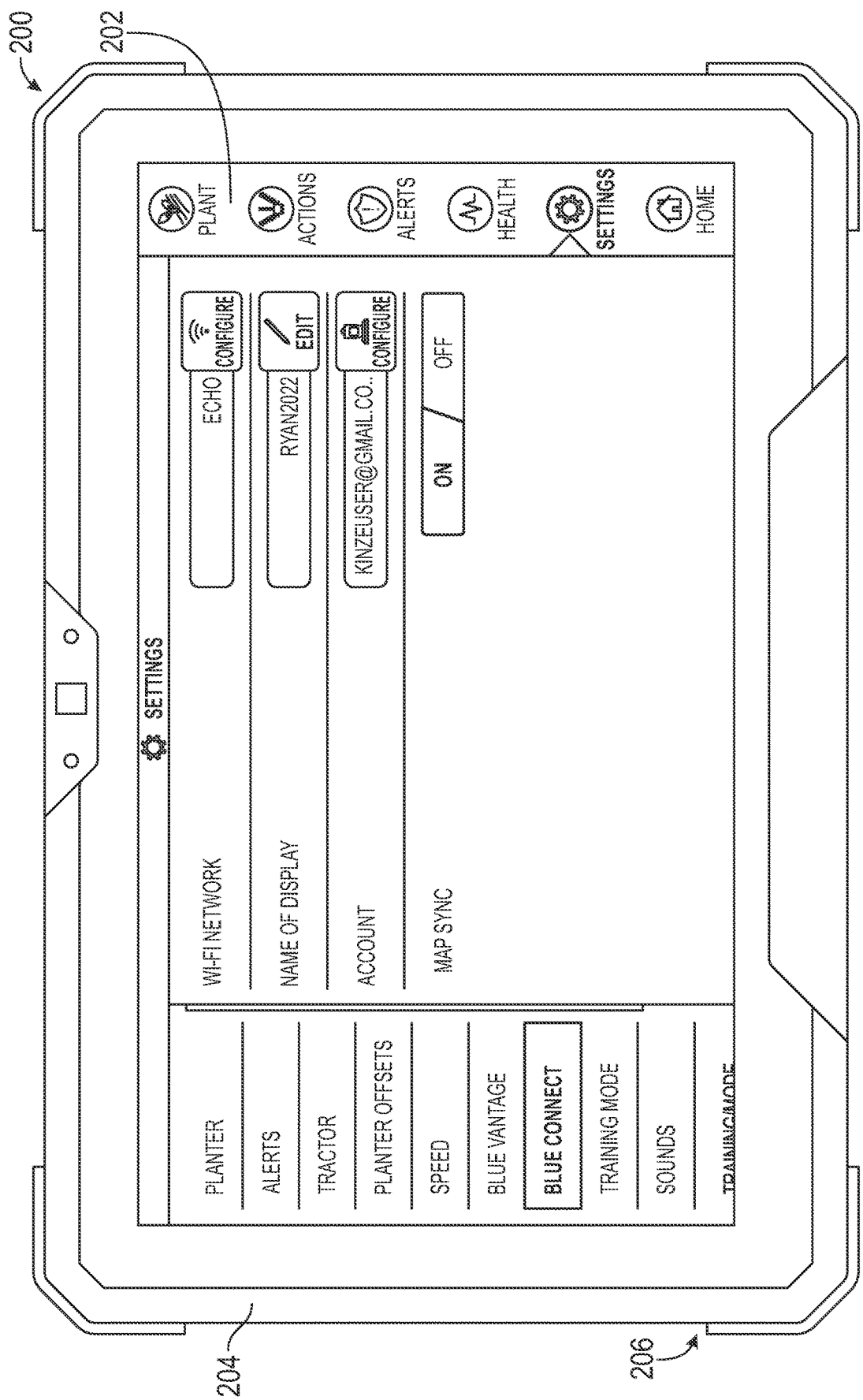
FIG. 18 is an exemplary view of a display unit for use with an agricultural planting implement showing configurable settings and features.

FIG. 18 is an exemplary display unit 200 showing the capability to configure the settings of the display unit 200. A user may specify the Wi-Fi network, the name of the display unit 200, and account information wherein the user can create and account and/or sign-in via an account. The display system is also adapted to allow a user to toggle ON or OFF the sync and/or map sync feature. By toggling ON the sync feature, the system can share and/or sync content, such as but not limited to tasks, product names, grower/farm/field names, where planting has occurred, information related to monitoring the health of an implement or components thereof, and other planting and/or productivity information, with other display units that are signed-in to the account.

Figure 19:
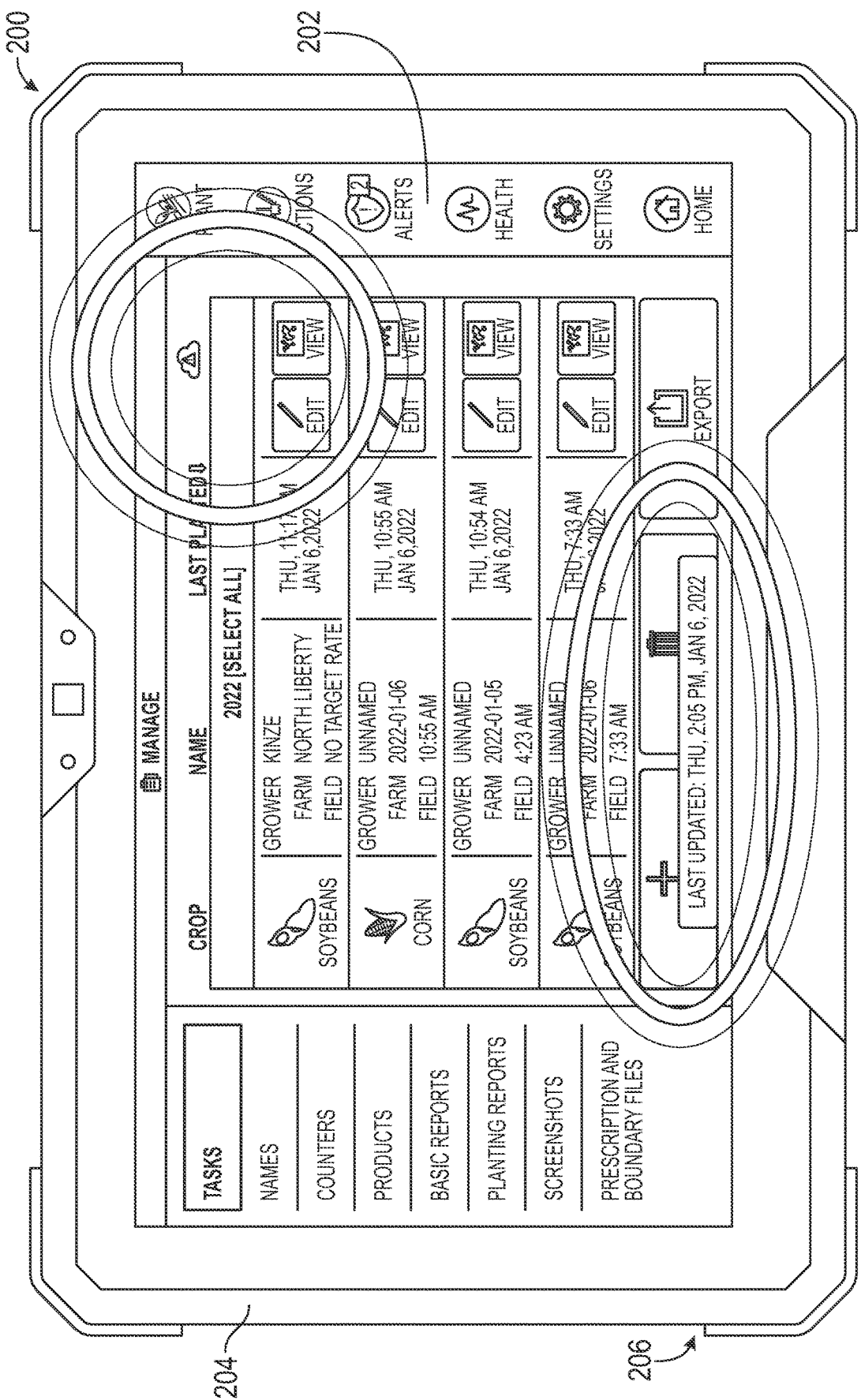
FIG. 19 is an exemplary view of a display unit for use with an agricultural planting implement showing planting data.

FIG. 19 is an exemplary display unit 200 showing a view of the screen 202 wherein a user can view data synced via the sync feature. As mentioned, shared and/or synced data may include crop, tasks, product names, grower/farm/field names, where planting has occurred, when planting occurred, health information related to an implement or components thereof, as well as any other planting and/or productivity information. Additionally, the display unit 200 can indicate the status of a sync such as if it is in progress. For example, the exemplary display unit 200 in FIG. 19 shows a cloud-type icon, visible in the top, right portion of the exemplary display unit 200 to indicate the status of syncing.

Figure 20:
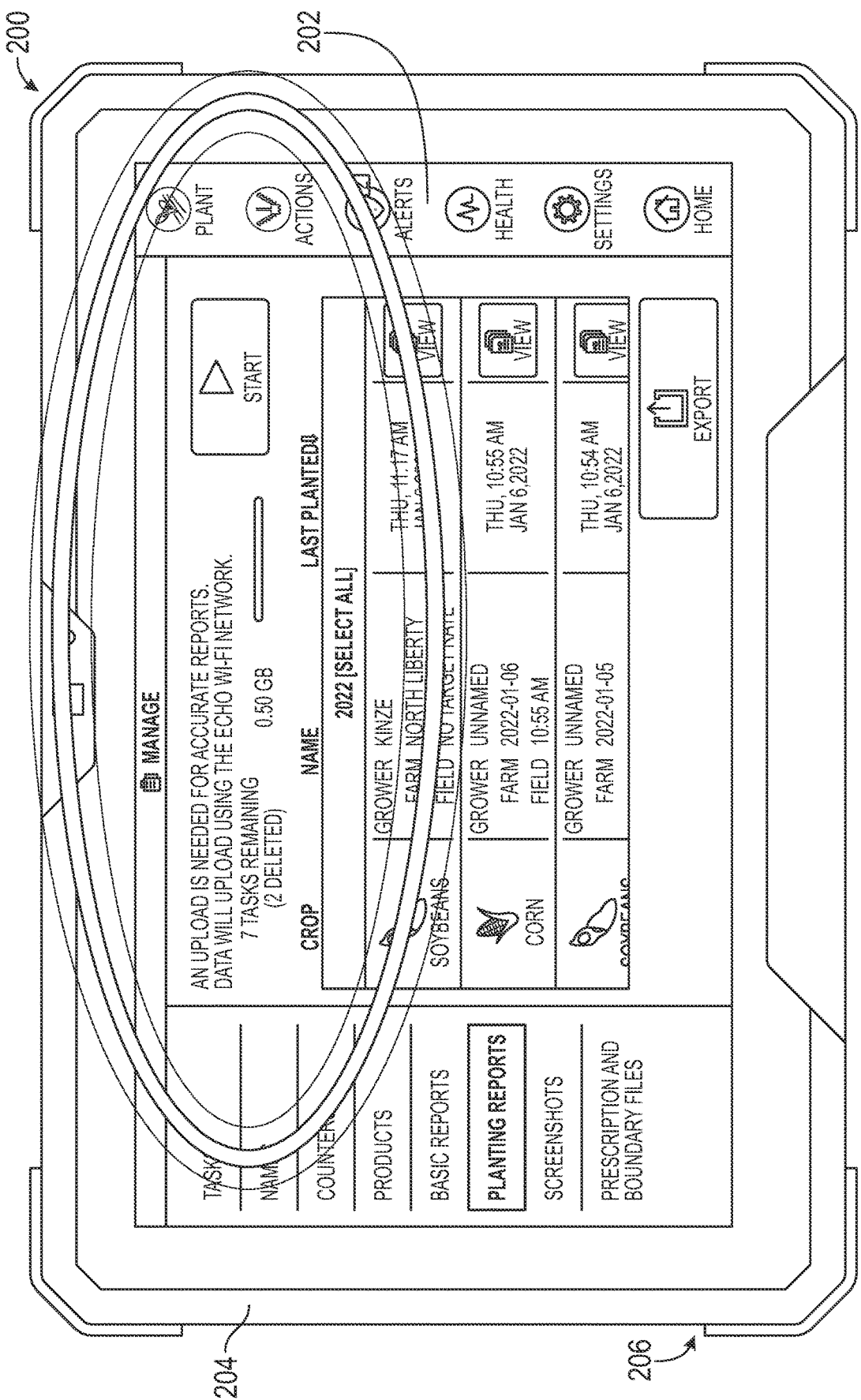
FIG. 20 is an exemplary view of a display unit for use with an agricultural planting implement planting data.

FIG. 20 is an exemplary display unit 200 showing another view of the sync and/or map sync feature. The display system allows a user to upload any information and/or data to be synced across all display units 200 for which an account is signed-in. The display system also allows for the ability to generate reports related to any synced data.

Figure 21:
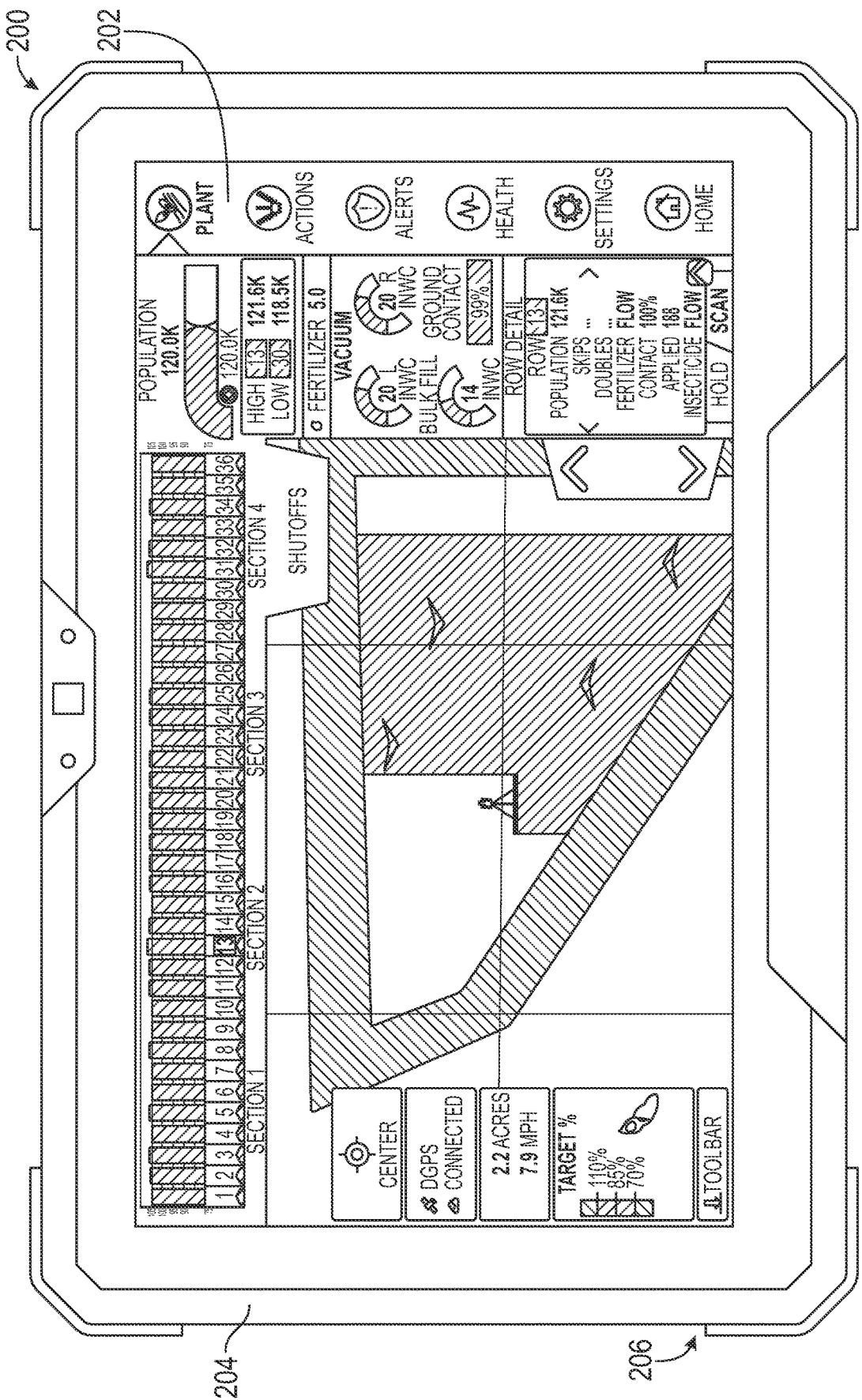
FIG. 21 is an exemplary view of a display unit for use with an agricultural planting implement showing planting data.

FIG. 21 is an exemplary display unit 200 showing the ability of the system to display shared information related to shutoffs. Information related to shutoffs is an example of the type of data that may be shared and/or synced across multiple display units 200. Shutoffs refer to when individual row units of an implement and/or an entire implement is shut off. For example, the upper portion of the display in the figure shows a number of row units. The display unit is capable of showing which, if any, of the row units are not being used (i.e., shut off), such as when traversing an area that has already been planted by another implement or the same implement itself.

FIG. 22 is an exemplary display unit 200 showing the ability for multiple planting implements to plant the same field and communicate information such as the number of acres planted by each implement, total acres planted by all implements, and number of acres remaining to plant as described above.

Figure 23:
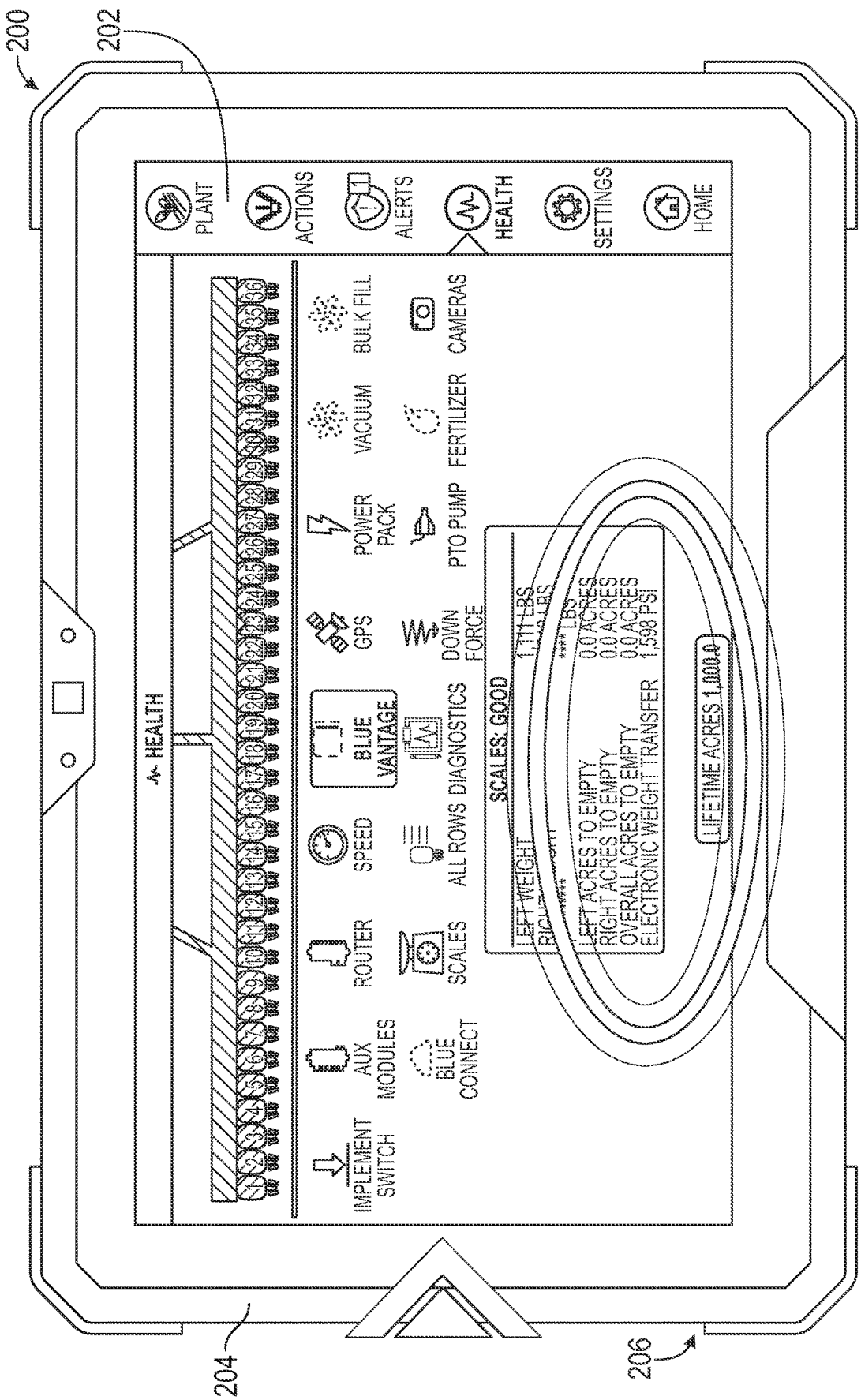
FIG. 23 is an exemplary view of a display unit for use with an agricultural planting implement showing information related to aspects and/or components of the implement.

FIG. 23 is an exemplary display unit 200 showing a view that includes information related to electronic weight transfer. Thus, a user can view electronic weight transfer of an associated implement. Examples of weight transfer system are shown and described in U.S. Pat. No. 10,045,474, which is hereby incorporated by reference in its entirety.

Figure 24:
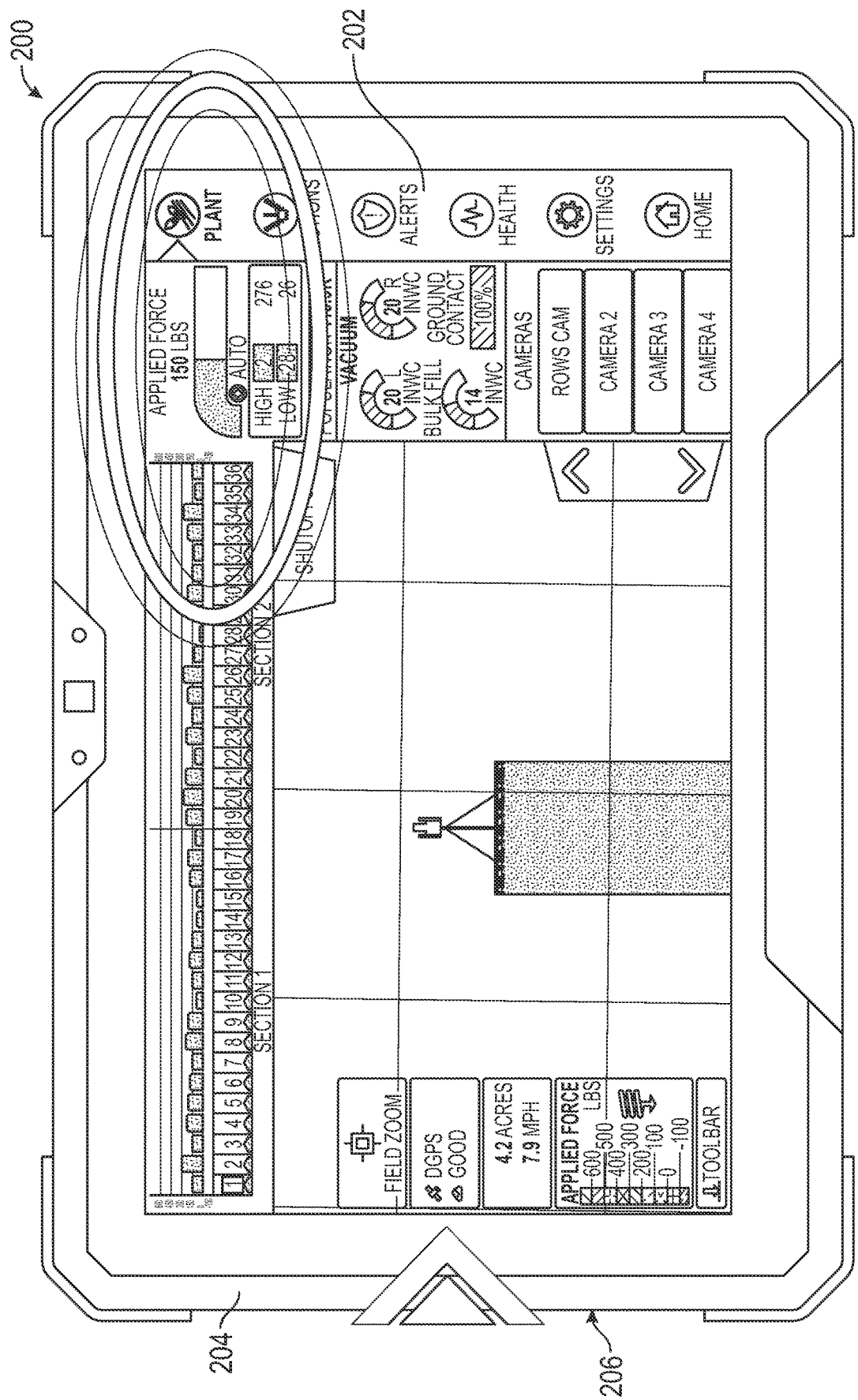
FIG. 24 is an exemplary view of a display unit for use with an agricultural planting implement showing planting data and information related to aspects and/or components of the implement.

FIG. 24 is an exemplary display unit 200 showing a view that includes information related to applied force. Thus, a user can view the down force applied by an associated implement.

Figure 25:
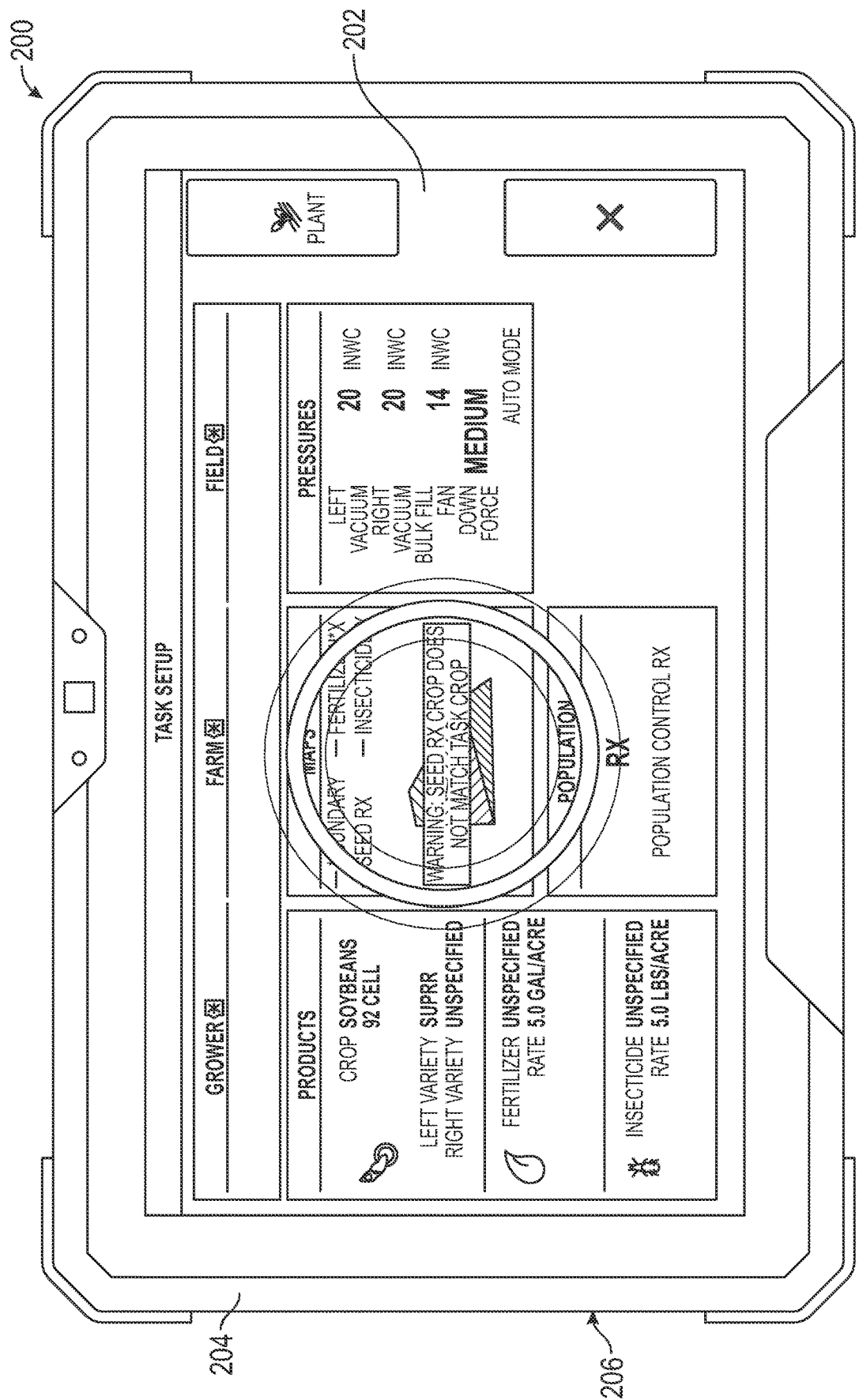
FIG. 25 is an exemplary view of a display unit for use with an agricultural planting implement showing an output message.

FIG. 25 is an exemplary display unit 200 showing a warning and/or alert in which the prescribed crop does not match the task crop for a particular task. Thus, the display system is configured to output warnings and/or alerts via the display unit 200 when a prescribed crop does not match the task crop. Therefore, after viewing the warning and/or alert, a user is informed as to whether to modify the task crop.

Figure 26:
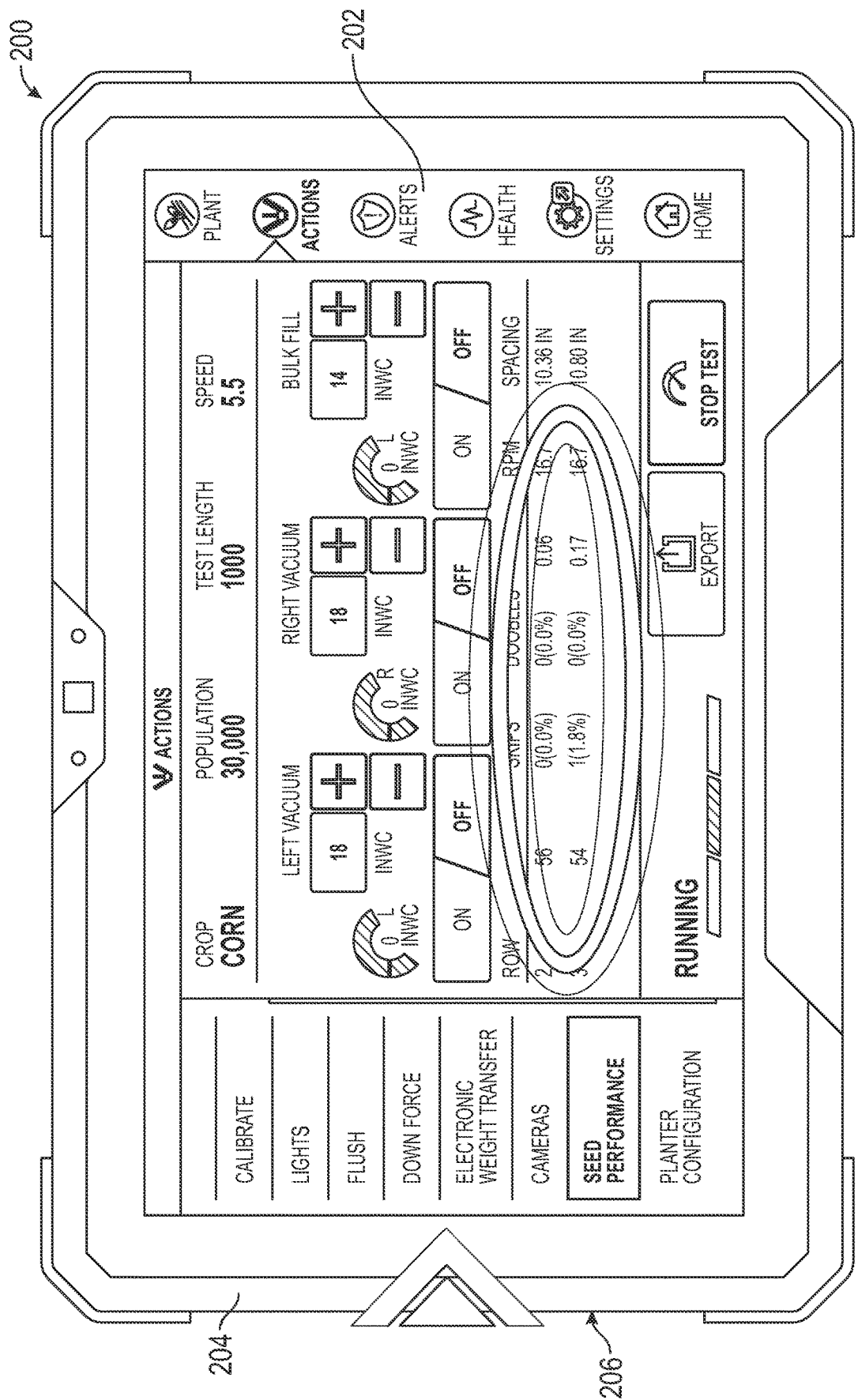
FIG. 26 is an exemplary view of a display unit for use with an agricultural planting implement showing seed performance testing data.

FIG. 26 is an exemplary display unit 200 showing accuracy percentages in seed performance testing. For instance, the exemplary view includes columns for row, number of seeds, skips, doubles, COV, RPM, and spacing. These columns can include raw numbers as well as percentages in terms of total population. Skips refer to a furrow being skipped wherein a seed is not placed in the furrow. Doubles refer to two seeds being placed in one furrow. Thus, a user can view information related to seed performance testing.

Figure 27:
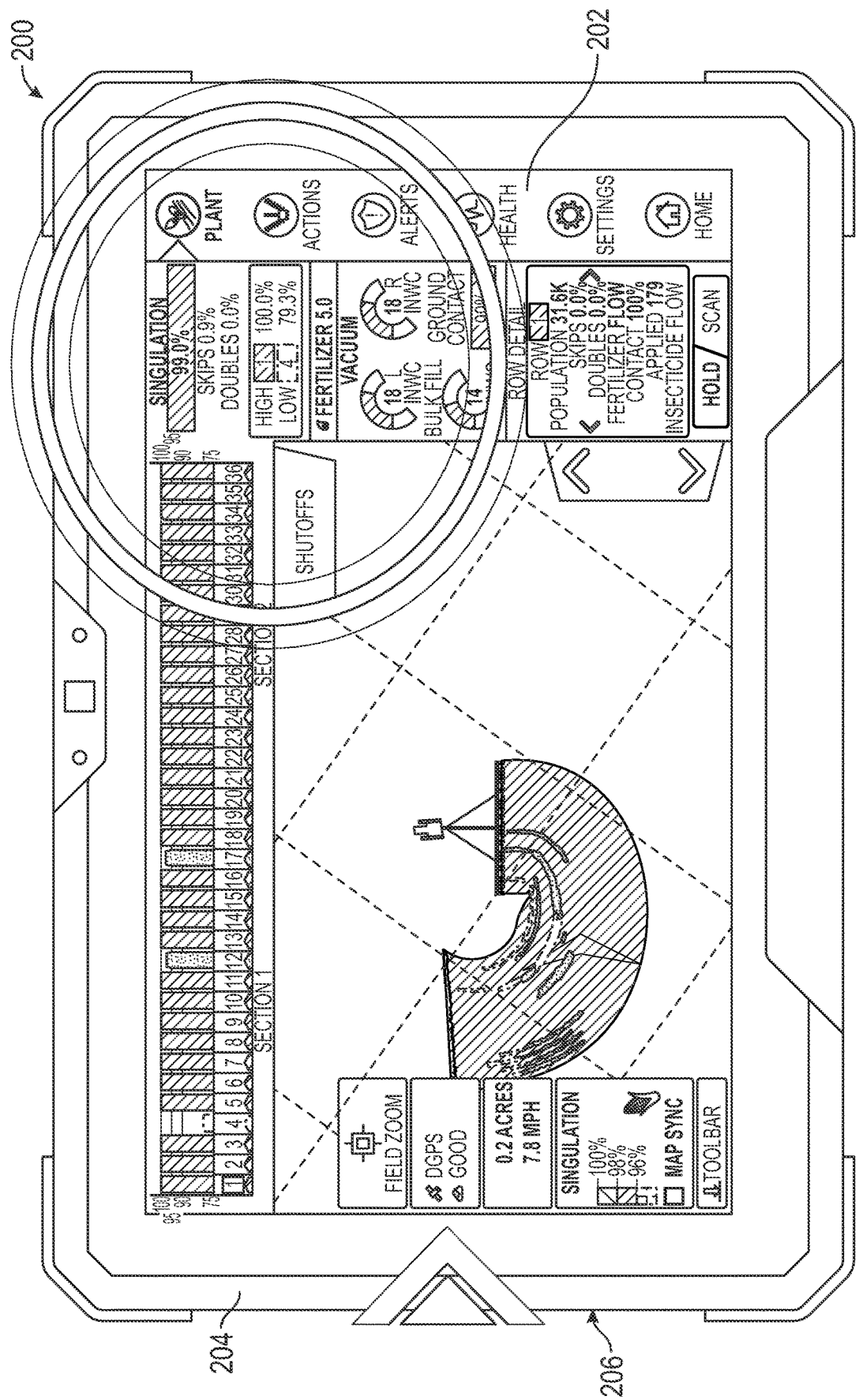
FIG. 27 is an exemplary view of a display unit for use with an agricultural planting implement showing planting information.

FIG. 27 is an exemplary display unit 200 showing a view that includes both a graphical representation of a tow vehicle and implement moving through a field and planter-wide singulation information including, but not limited to, skips and doubles. Skips and doubles percentages are shown in the top, right portion of the exemplary display unit 200 of FIG. 27. Additional singulation information is shown in both the bottom, left and bottom, right portions of the exemplary display unit 200 of FIG. 27. Singulation information can be included in both numerical percentage form and also as a colorized, graphical representation that includes location in the field related to singulation information. The exemplary display unit 200 of FIG. 27 also shows each individual row unit of the planter and graphically represents singulation data for each row unit along the top of the exemplary display unit 200.

Figure 28:
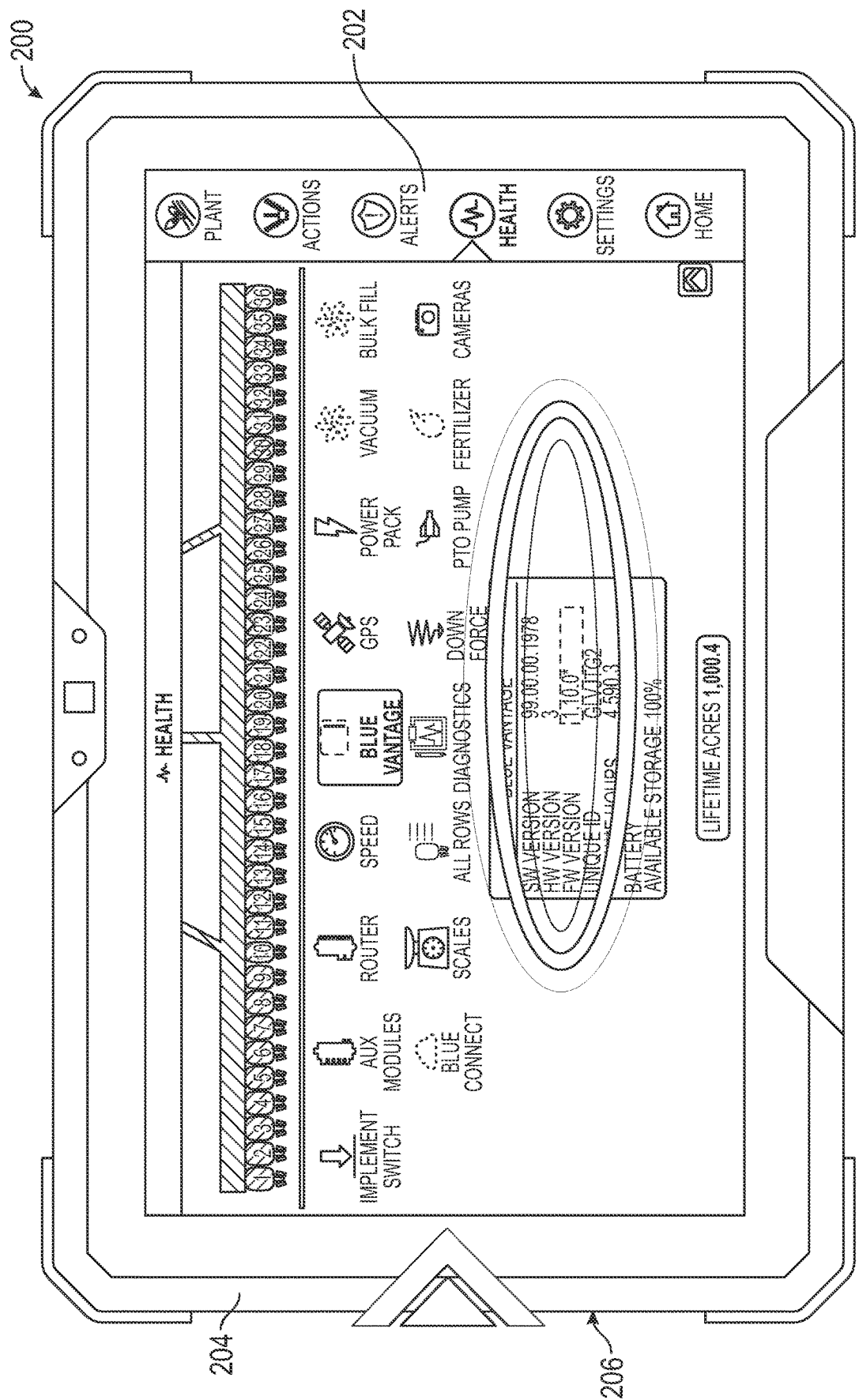
FIG. 28 is an exemplary view of a display unit for use with an agricultural planting implement showing information related to aspects and/or components of the implement.

FIG. 28 is an exemplary display unit 200 showing a view in which the display unit 200 is presenting a warning and/or alert warning a user that the display unit 200 is not up-to-date and/or is not properly provisioned.

Figure 29:
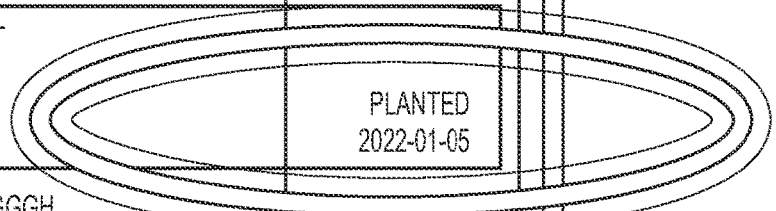
FIG. 29 is an exemplary view of a portion of display unit for use with an agricultural planting implement showing information related to crops.

FIG. 29 is a sub-screen of an exemplary display unit 200 showing a view of a crops report wherein the grower name, farm, field, products, acres, and date planted is visible.

Figure 30:
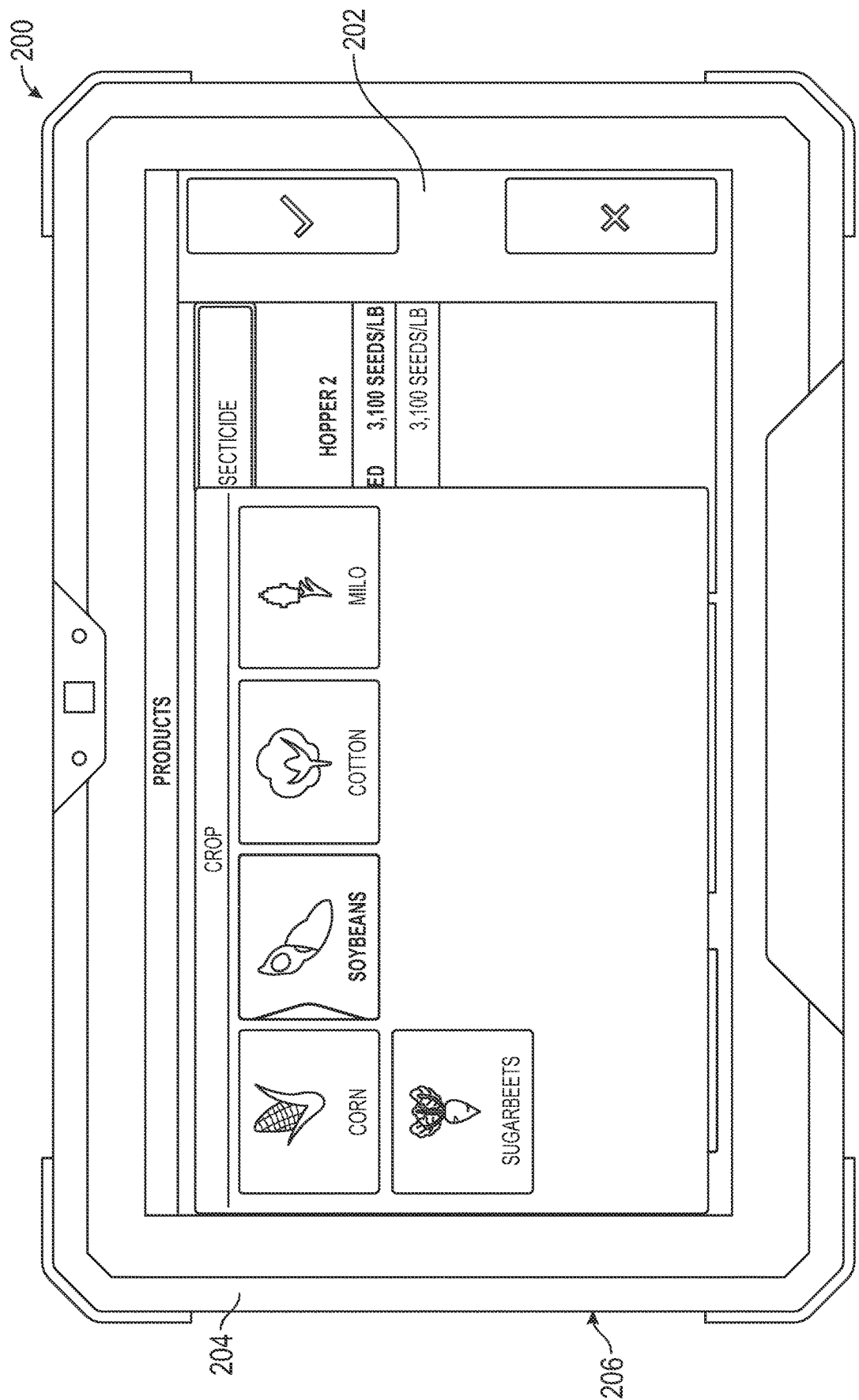
FIG. 30 is an exemplary view of a display unit for use with an agricultural planting implement showing information related to crops supported by the display system.

FIG. 30 is an exemplary display unit 200 showing crops supported by the display system and information related to the number of seeds per pound. A user may provide input to choose which crop the user is planting.

Figure 31:
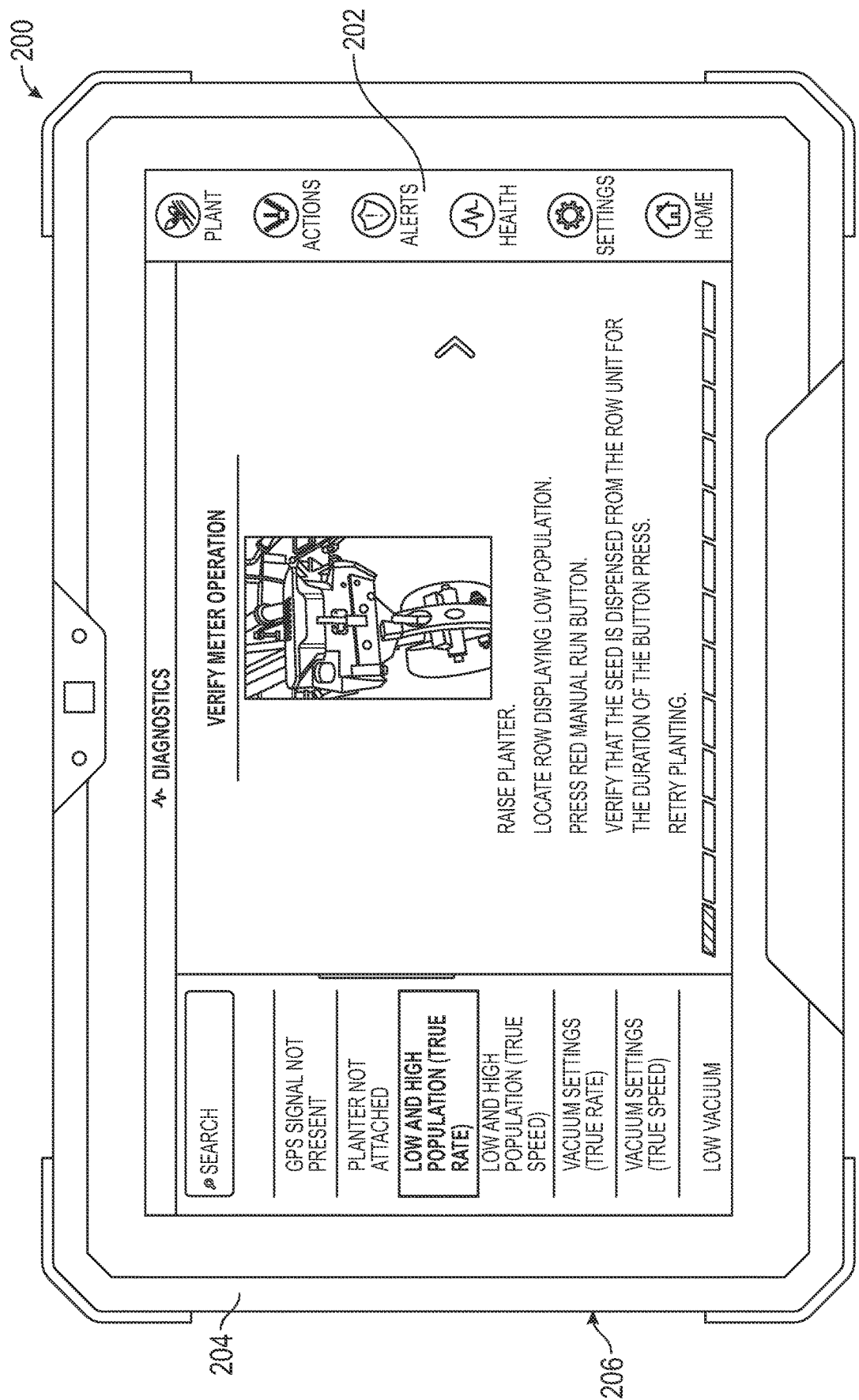
FIG. 31 is an exemplary view of a display unit for use with an agricultural planting implement showing an exemplary workflow.

FIG. 31 is an exemplary display unit 200 showing an example of a diagnostic workflow. The display system is adapted to allow a user to search for and/or navigate to and view different diagnostic workflows related to aspects of the display system and or the agricultural implement associated with the display system. A diagnostic workflow may include, but is not limited to, video, audio, pictures, images, symbols, text instructions, and the like to aid a user in performing maintenance, conducting a diagnostic check, verifying proper functionality, and the like related to aspects of the display system and/or agricultural implement, and components thereof, associated with the display system.

Figure 32:
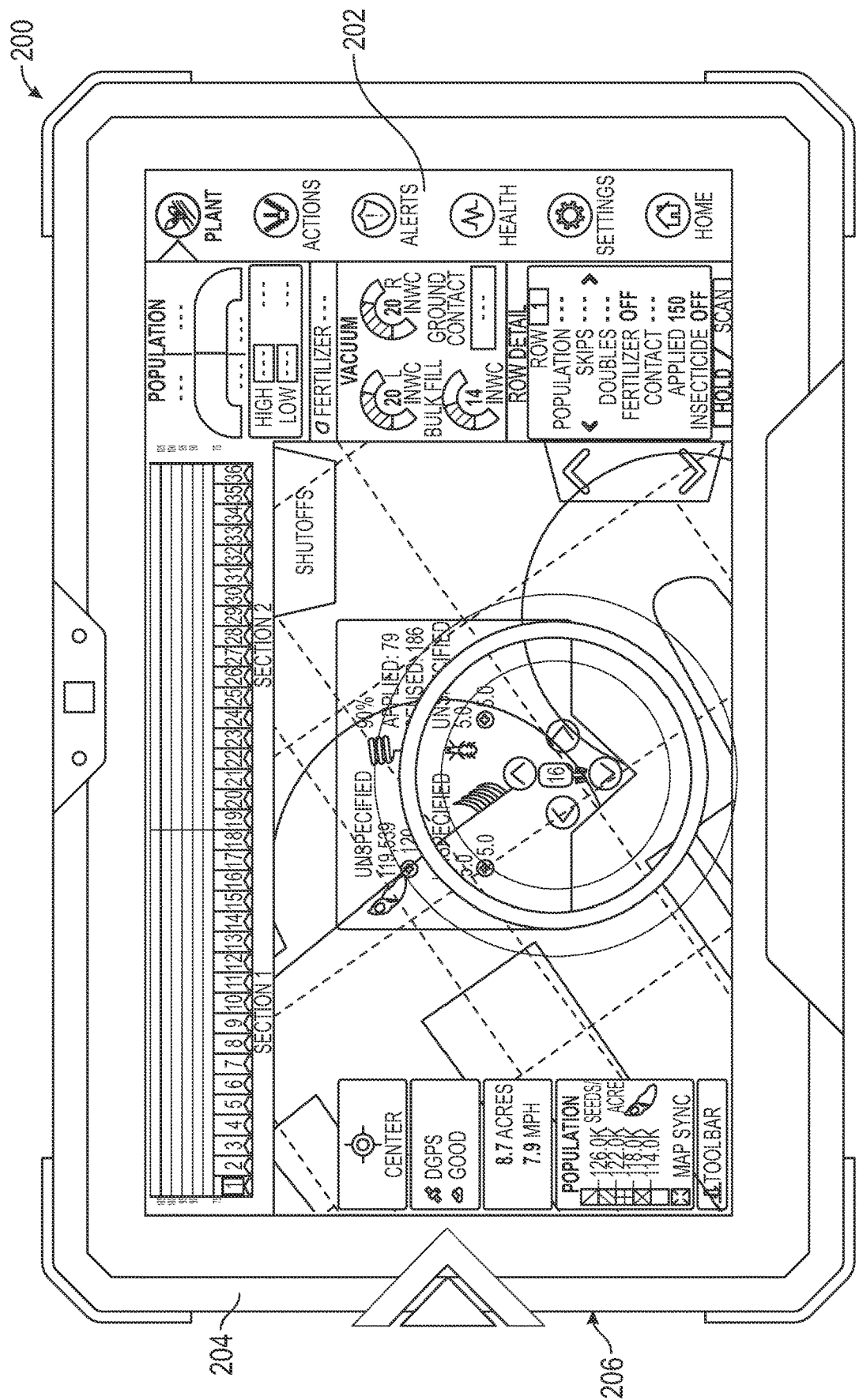
FIG. 32 is an exemplary view of a display unit for use with an agricultural planting implement showing planting information and map adjustment controls.

FIG. 32 is an exemplary display unit 200 showing the capability of the display system to allow a user to adjust and/or micro-adjust the map and/or aspects of the map shown on the display unit 200. The exemplary display unit 200 in FIG. 32 includes arrows wherein a user can adjust and/or micro-adjust the map shown on the display unit 200 to jump to a specific spot on the map to view data at that spot. The display system includes the ability for a user to jump a particular number of inches on the map in any direction to view data in the area in which the map jumped to.

Figure 33:
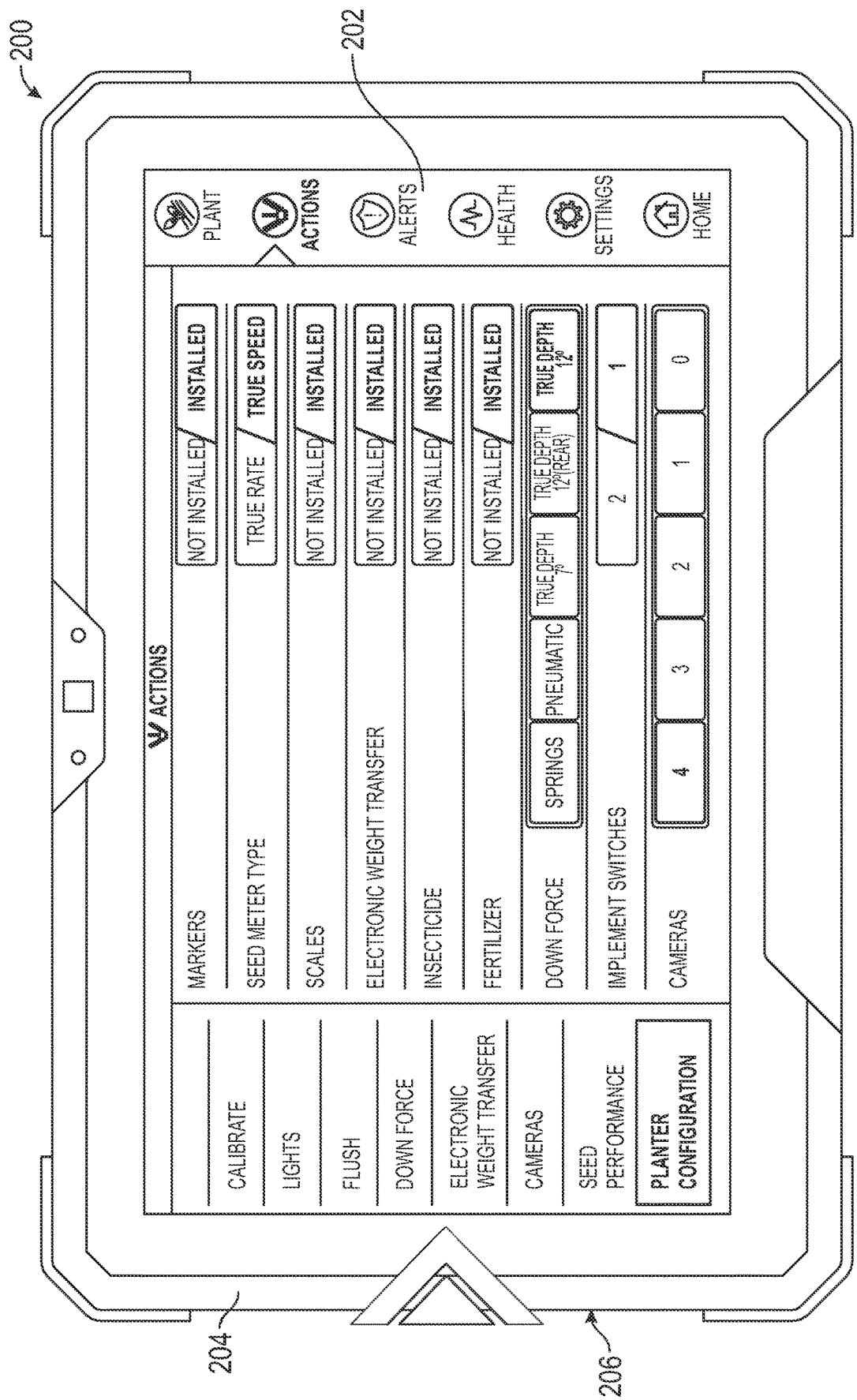
FIG. 33 is an exemplary view of a display unit for use with an agricultural planting implement showing customizable configuration options for the planting implement.

FIG. 33 is an exemplary display unit 200 showing the capability of the display system to allow a user to configure and/or customize planter options. Configuration and/or customization options include allowing a user to make selections regarding markers, seed meter type, scales, electronic weight transfer, insecticide, fertilizer, down force, implement switches, cameras, and the like.

Figure 34:
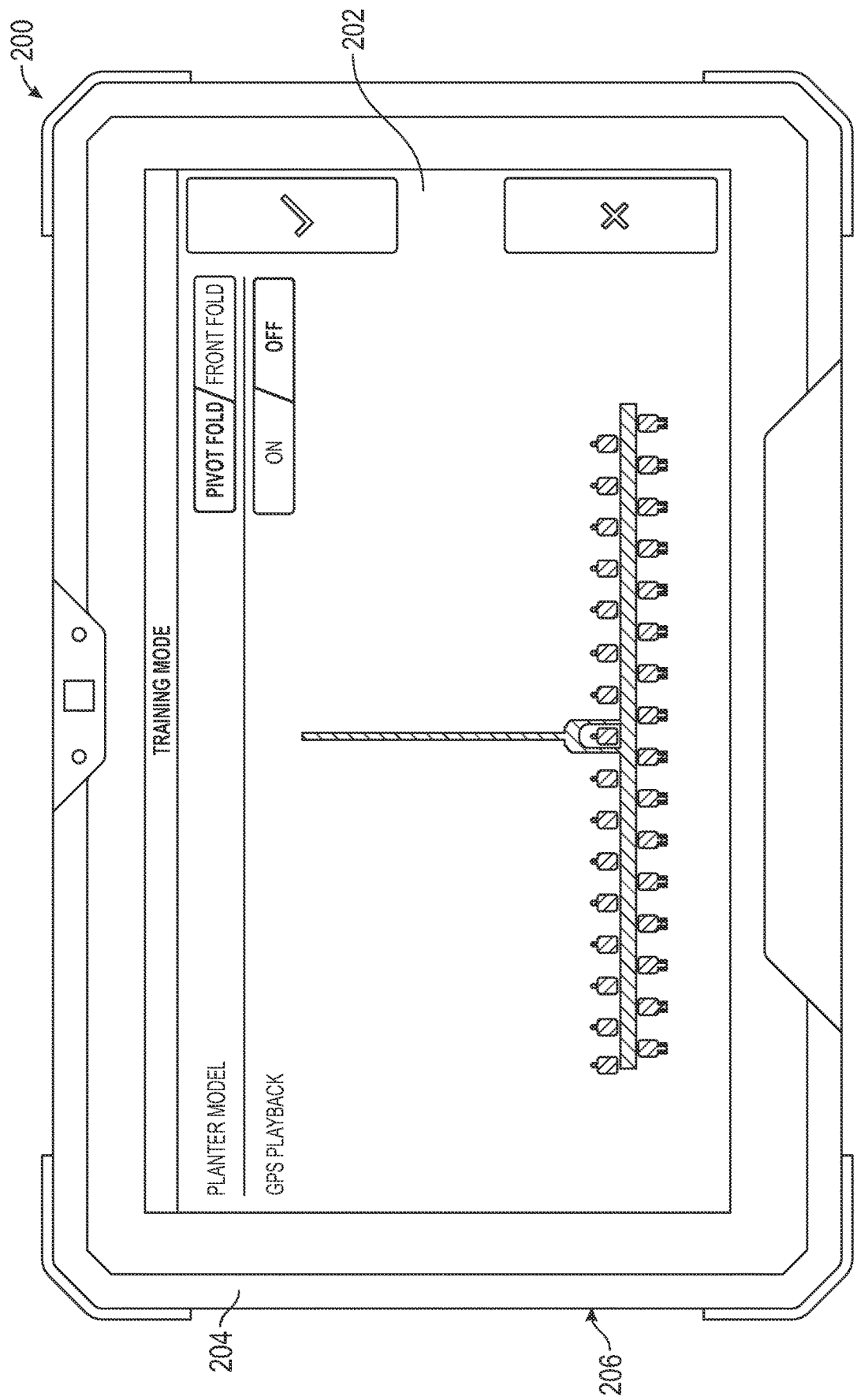
FIG. 34 is an exemplary view of a display unit for use with an agricultural planting implement showing an exemplary view of a training mode.

FIG. 34 is an exemplary display unit 200 showing a training mode. The training mode allows a user to have a space to sandbox, test, and/or experiment with aspects of the display system and/or associated agricultural implement wherein none of the real and/or actual settings of the agricultural implement are affected. Aspects that a user can sandbox, test, and/or experiment with include, but are not limited to, lifting and/or pivoting associated with the agricultural implement as well as GPS information.

Figure 35:
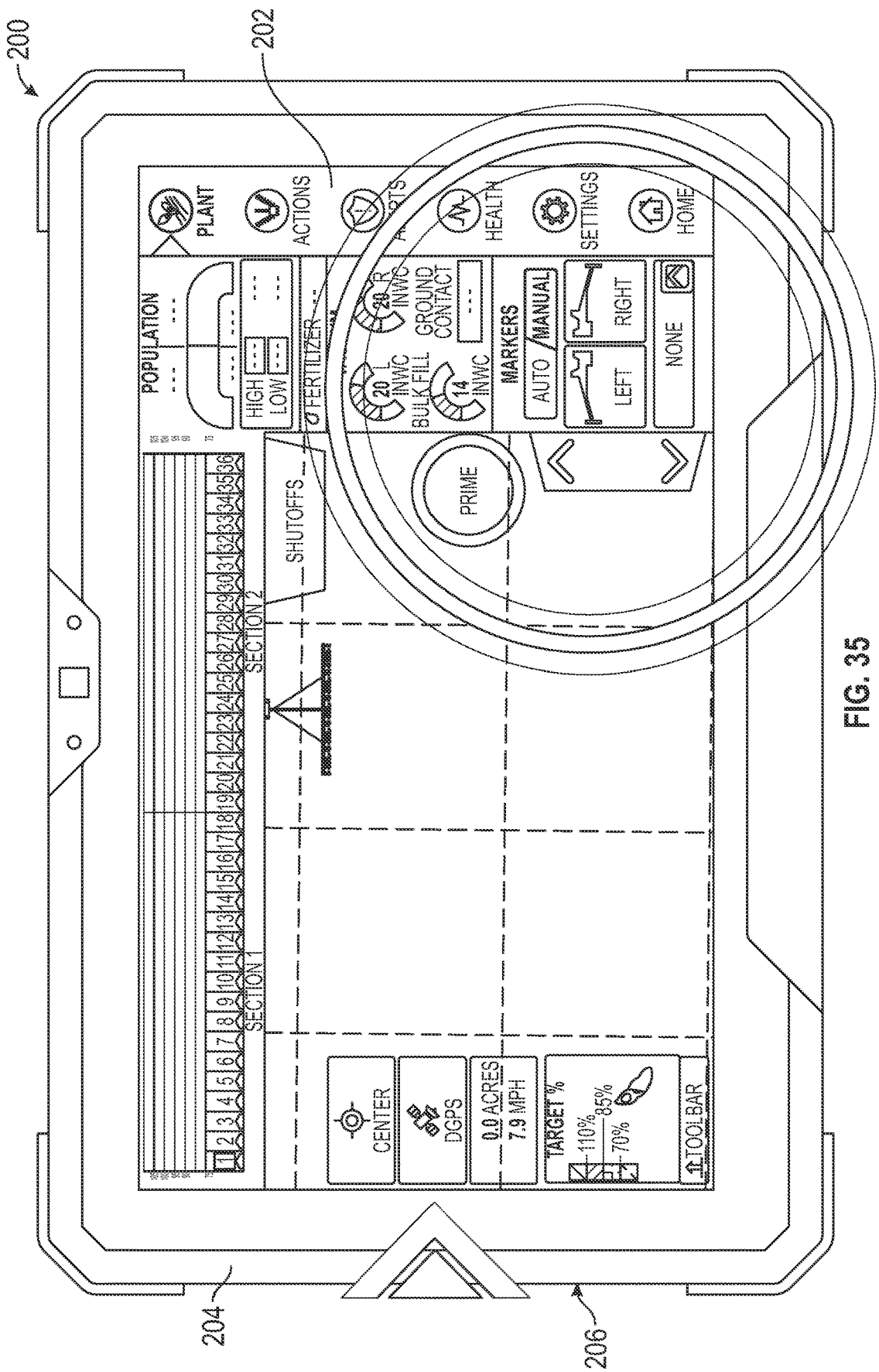
FIG. 35 is an exemplary view of a display unit for use with an agricultural planting implement showing an exemplary layout of the display unit.

FIG. 35 is an exemplary display unit 200 showing that particular aspects shown on the display unit 200 may be shown in a carousel-type arrangement wherein a user can sift, swipe, and/or tap through a variety of options and/or inputs. For example, the exemplary display unit 200 shown in FIG. 35 includes a carousel-type arrangement in the bottom, right of the screen 202 wherein a user can use the arrows to change what type of data, content, options, and/or inputs are viewable on the screen 202 at a particular time. For example, the exemplary display unit 200 shown in FIG. 35 shows data, content, options, and/or inputs related to markers in the bottom, right portion of the screen 202. By using the arrows, a user can sift through other data, content, options, and/or inputs and make it viewable in that bottom, right portion of the screen 202. For instance, a user could make data, content, options, and/or inputs related to cameras, rather than markers, viewable.

Figure 36:
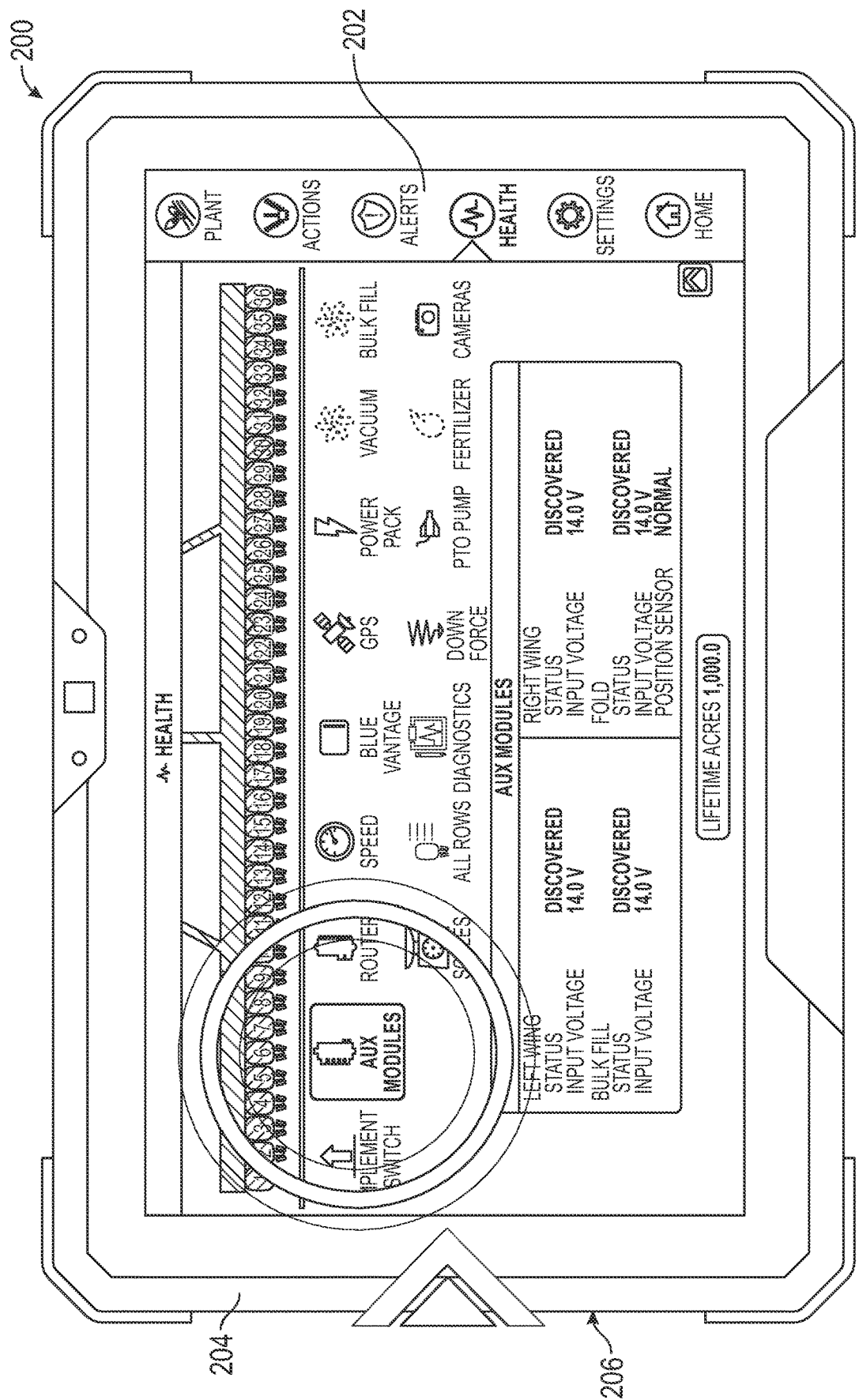
FIG. 36 is an exemplary view of a display unit for use with an agricultural planting implement showing information related to aspects and/or components of the implement.

FIG. 36 is an exemplary display unit 200 showing that auxiliary modules are consolidated into and able to be accessed via one icon. In the exemplary embodiment of FIG. 36, the icon is labeled "AUX MODULES". Consolidating auxiliary modules increases ease of use for the user and makes the display unit 200 less messy and more easily accessible. For example, instead of having separate icons for different auxiliary modules such as left wing, right wing, and bulk fill modules, all auxiliary modules can be consolidated into one icon.

Figure 37:
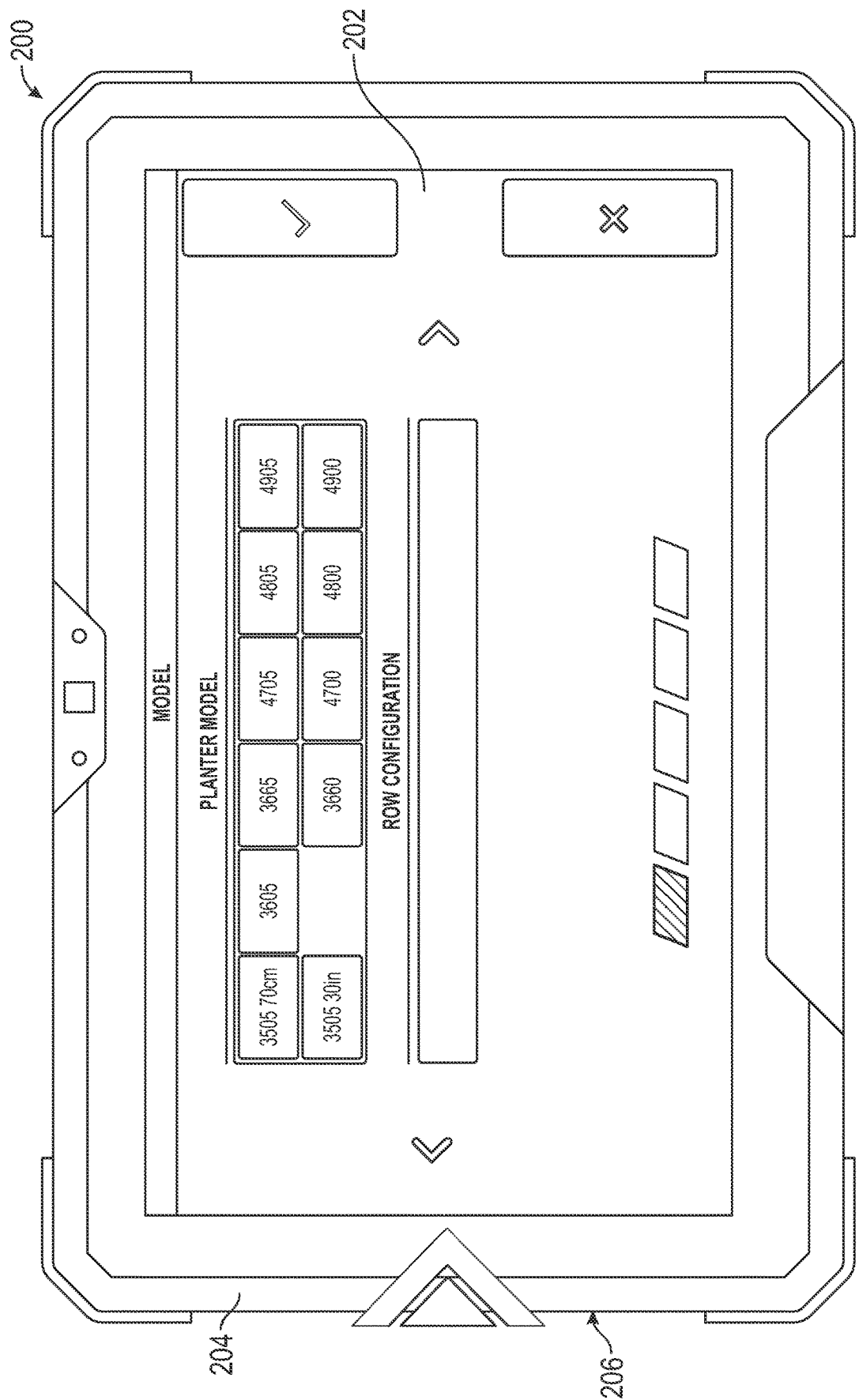
FIG. 37 is an exemplary view of a display unit for use with an agricultural planting implement showing customizable setup options for the display unit and/or planting implement.

FIG. 37 is an exemplary display unit 200 showing the ability for a user to configure and customize an agricultural implement via the display system. For example, as shown in FIG. 37, a user may configure data related to the model of the associated agricultural implement and/or its row configuration including number of rows.

Figure 38:
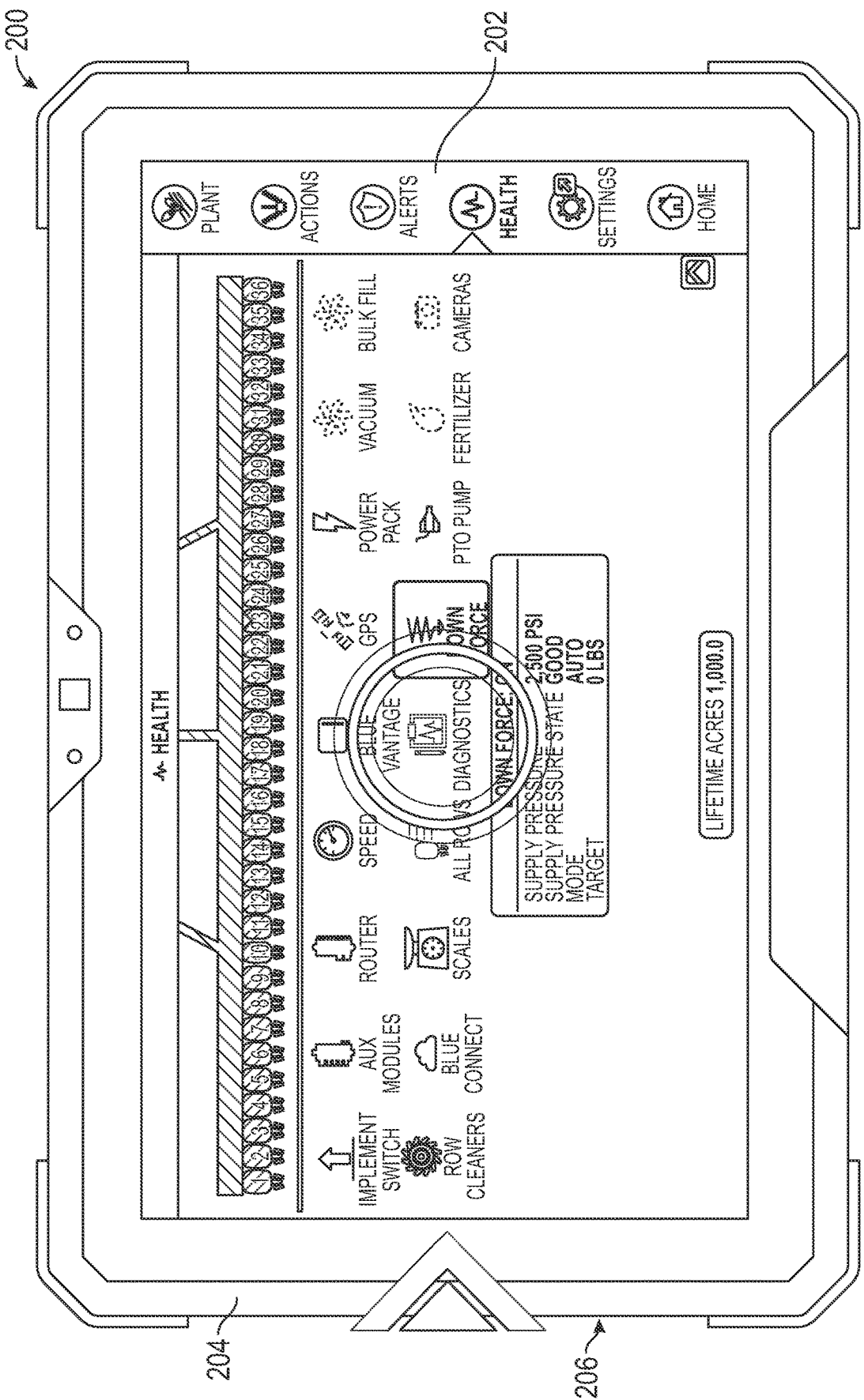
FIG. 38 is an exemplary view of a display unit for use with an agricultural planting implement showing a diagnostics icon on the screen of the display unit.
Figure 39:
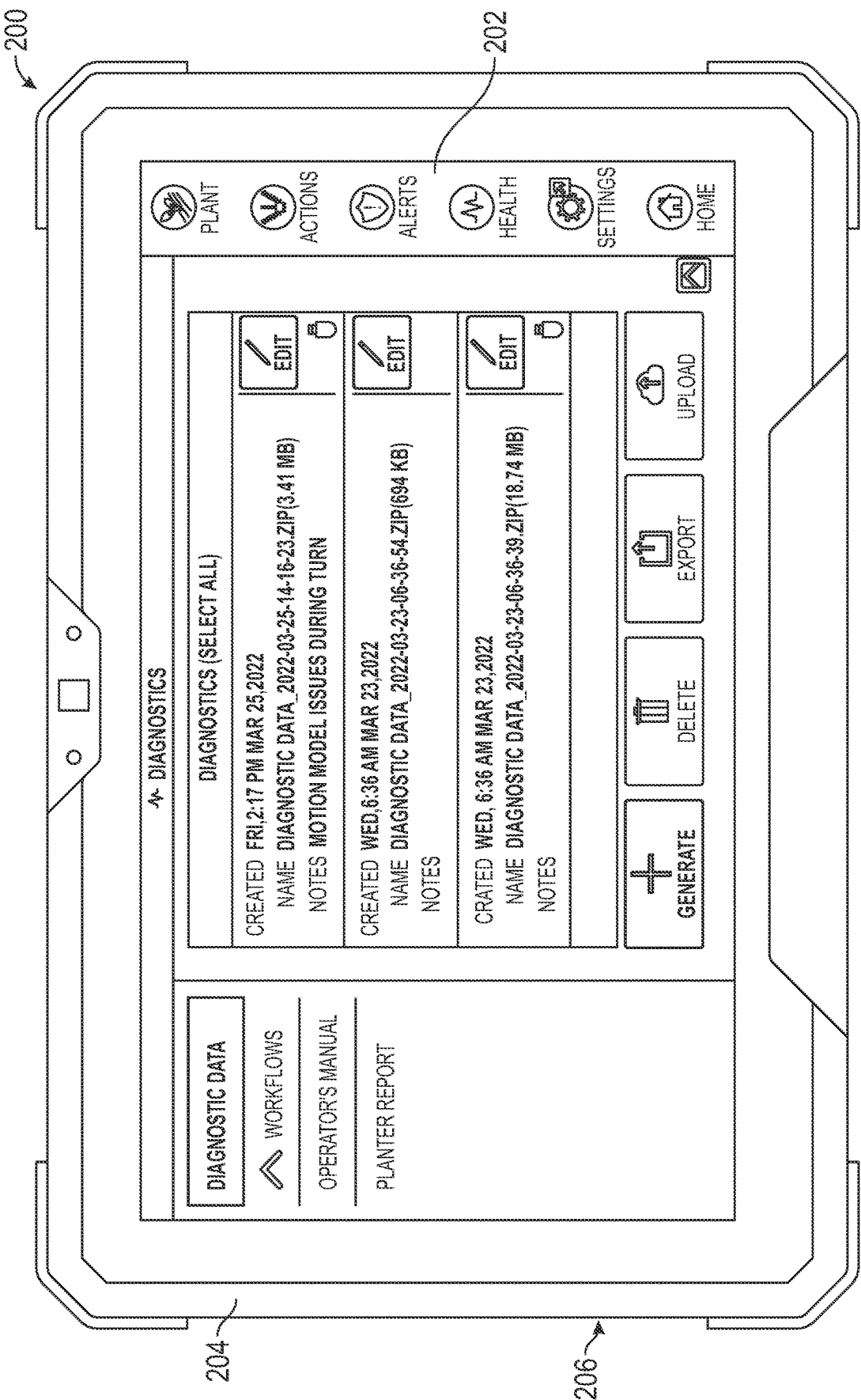
FIG. 39 is an exemplary view of a display unit for use with an agricultural planting implement showing the ability to create diagnostic reports related to the planting implement.
Figure 40:
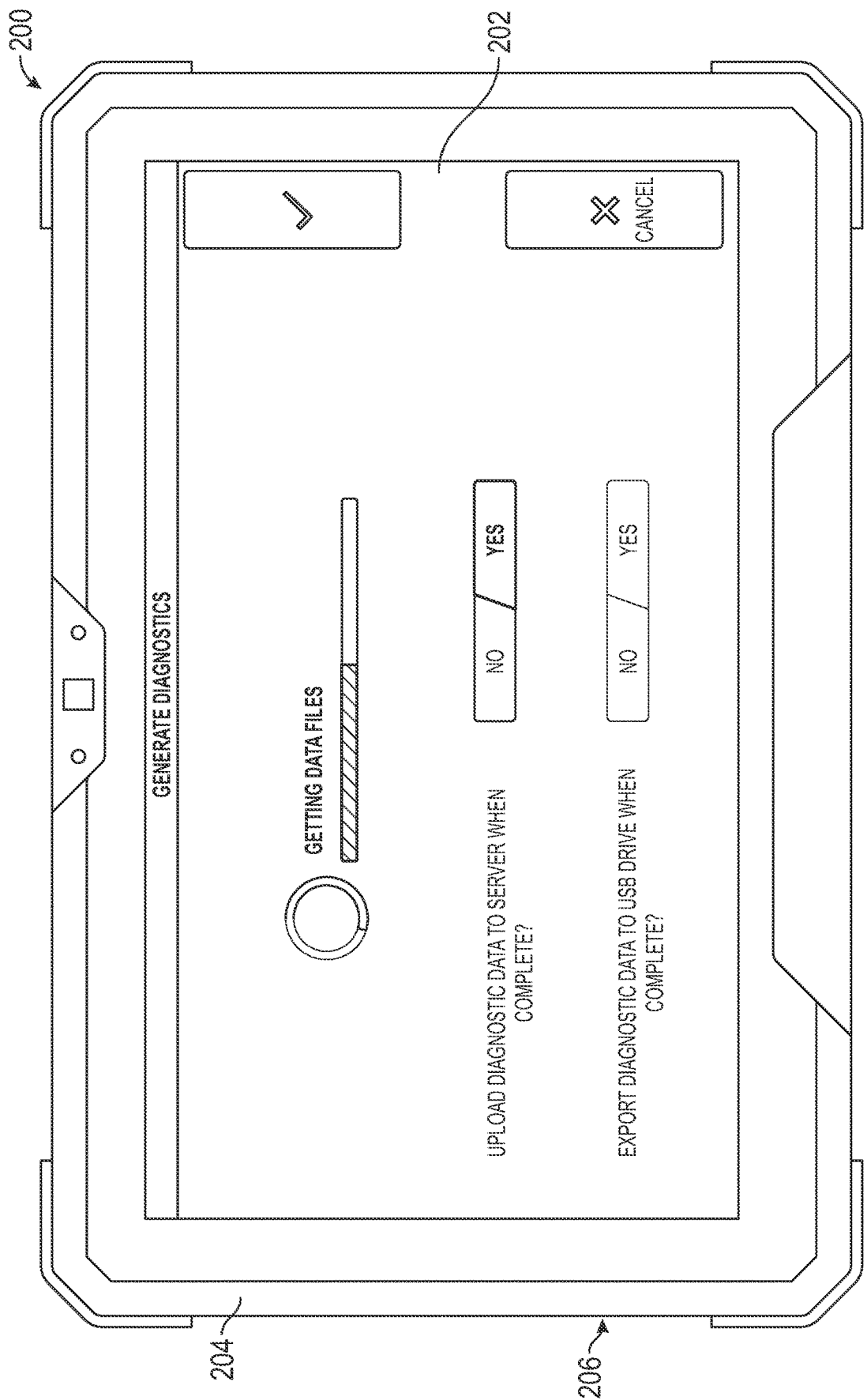
FIG. 40 is an exemplary view of a display unit for use with an agricultural planting implement showing the ability to transfer diagnostic reports from the unit.

FIGS. 38-41 show yet additional aspects of at least some embodiments of the display unit 200. As shown in FIG. 38, the screen 202 includes a number of labeled icons. In the second row of the icons is an icon labeled "DIAGNOSTICS". As has been disclosed herein, at least some aspects of some embodiments include the ability to diagnose issues with the planting implement 10 or any components or operations thereof. FIG. 39 shows the screen 202 once the "DIAGNOSTICS" icon has been selected to show all of the diagnostic functions in one spot. FIG. 39 shows a diagnostics data screen, which allows a user to create diagnostic reports for any of the operations and/or components of the planting implement. As further shown in the figure, additional features of the display unit 200 include the ability to add notes, compile diagnostic data, and the ability to send any of the diagnostic data, reports, and/or notes to a third party, such as via a cloud-based network.

FIG. 39 shows aspects of the diagnostic reports, including when they were created (date and time stamped), the name of the reports, and any notes added for the report. As shown, the first report includes the note, "Motion model issues during turn". The addition of notes can help figure out the issues and provide support. It should be appreciated that the notes can be edited at a later time. Still further, there are indicators in the form of icons that show the status of the reports, such as if one or more of the reports or a bundle of the reports has been exported to a removable drive (e.g., USB drive) or uploaded to a remote location, such as via the cloud network, cellular network, etc. The use of removable devices/drives in addition to the memory and wireless connectivity of the display allows the user to choose how, when, and where to upload or share the diagnostic data and reports. This is shown best in FIG. 40. As shown in the figure, there is a status bar showing the status of the data files being prepared as part of the diagnostics. There are additional toggle switches on the screen 202 of the unit 200. The top one asks if the created report should be uploaded to a servers, such as via a cloud network, Wi-Fi, cellular network, or other. The second, lower toggle asks if the data is to be exported to a USB or other removable device when complete. Thus, the user has complete control over diagnostics.

Figure 41:
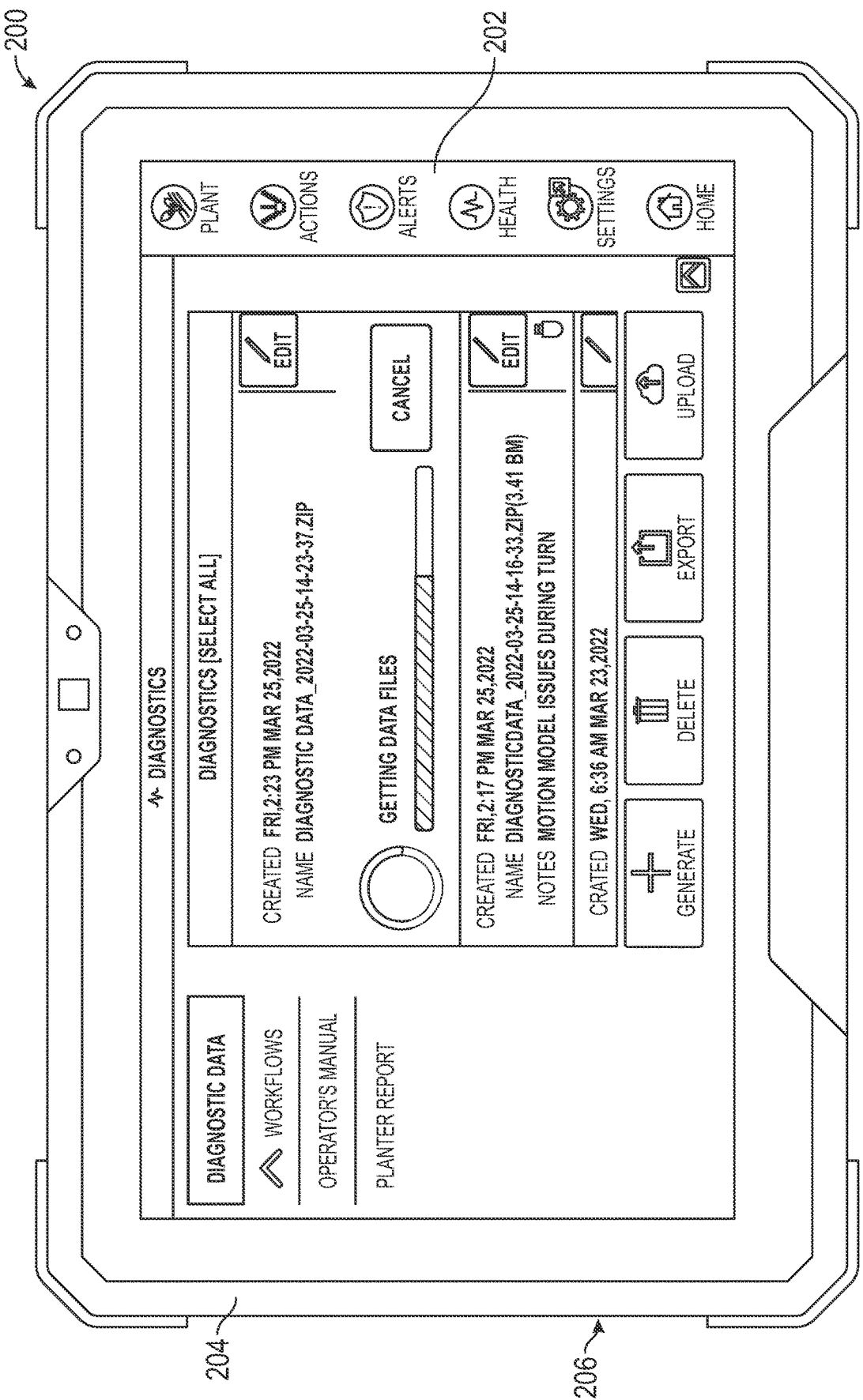
FIG. 41 is an exemplary view of a display unit for use with an agricultural planting implement showing the generation of diagnostic reports.
Figure 42A:
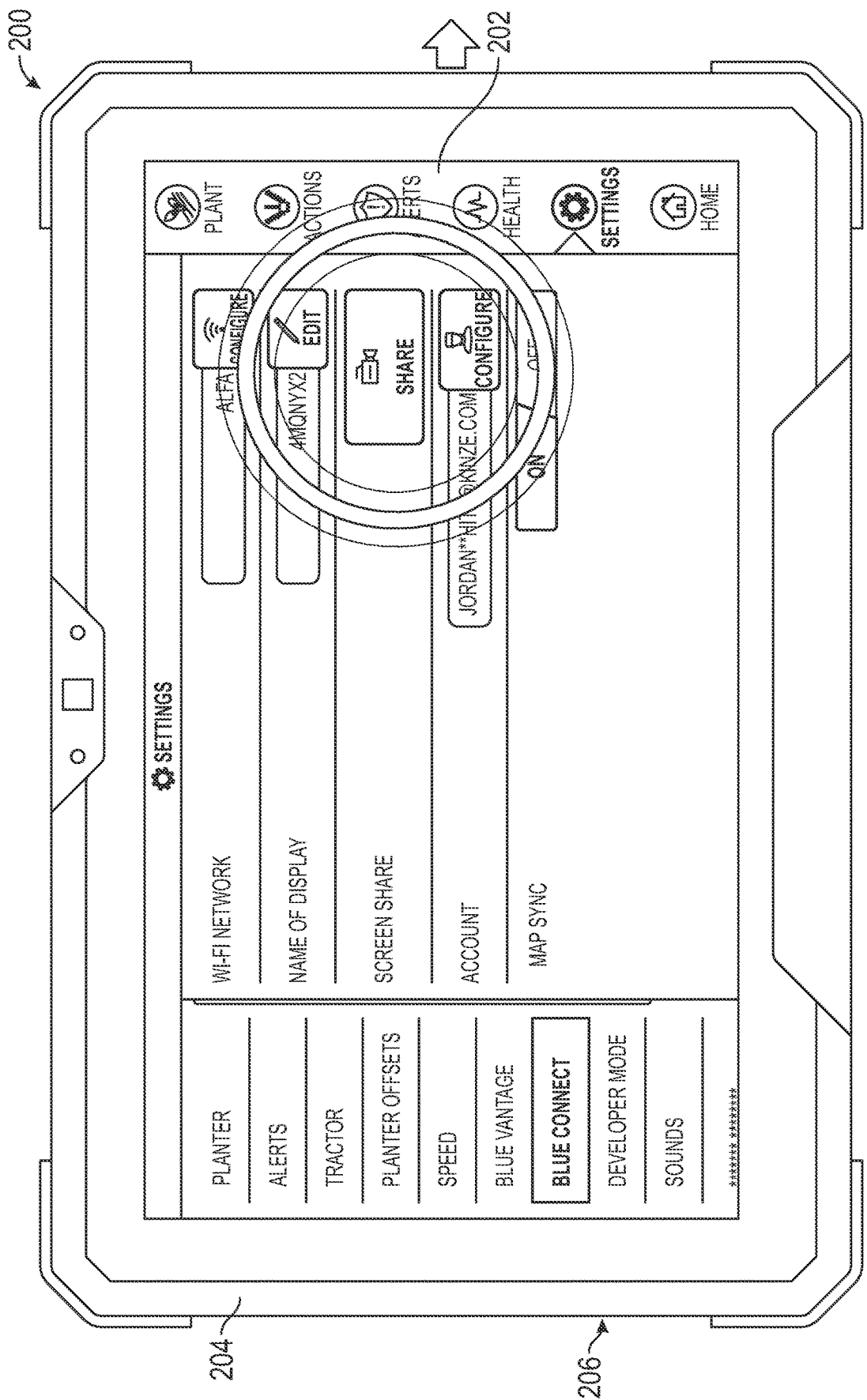
FIG. 42A, FIG. 42B, FIG. 42C, and FIG. 42D represent a pictorial flow diagram showing the ability to share the screen of a display unit for use with an agricultural planting implement.
Figure 42B:
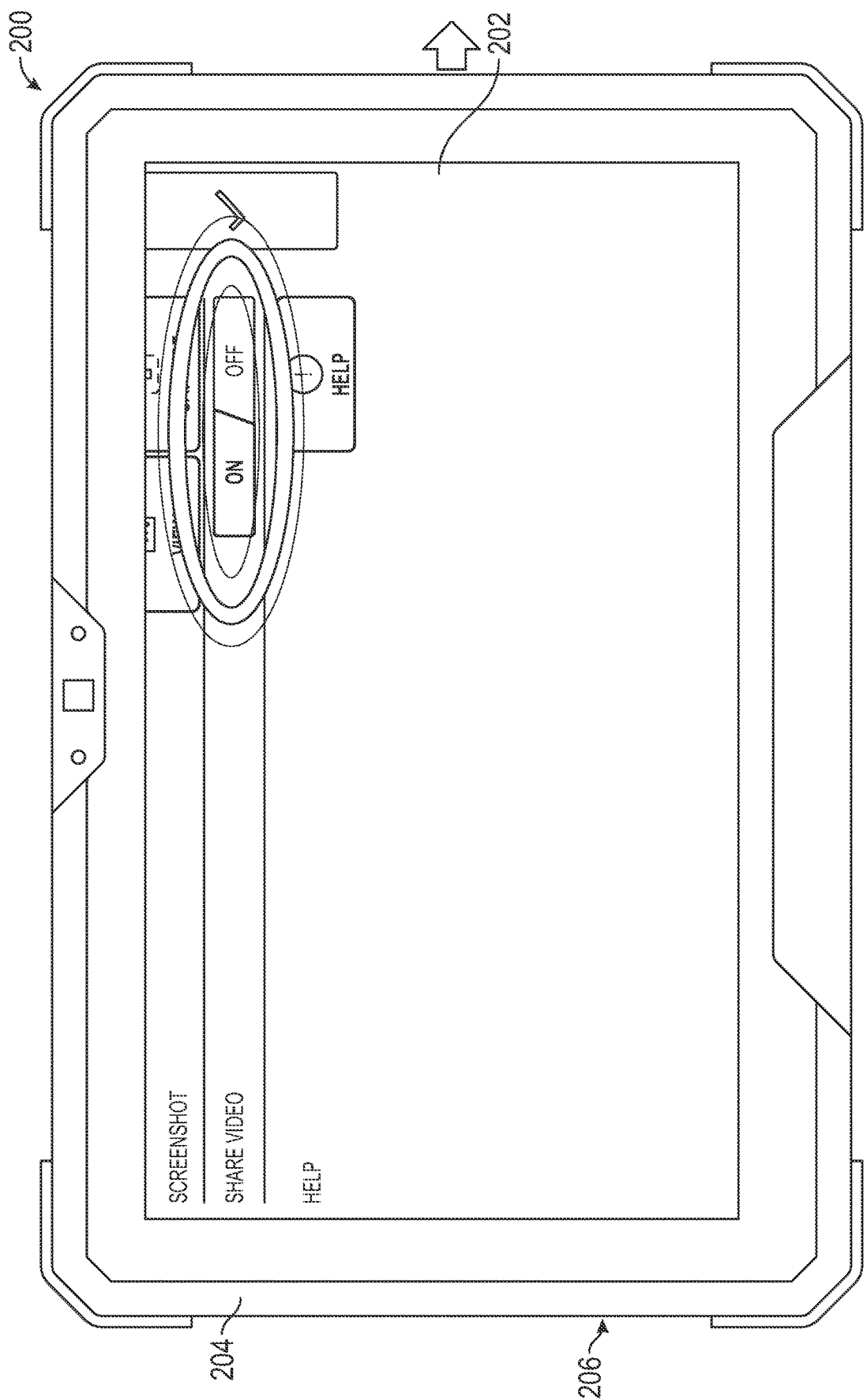
Figure 42C:
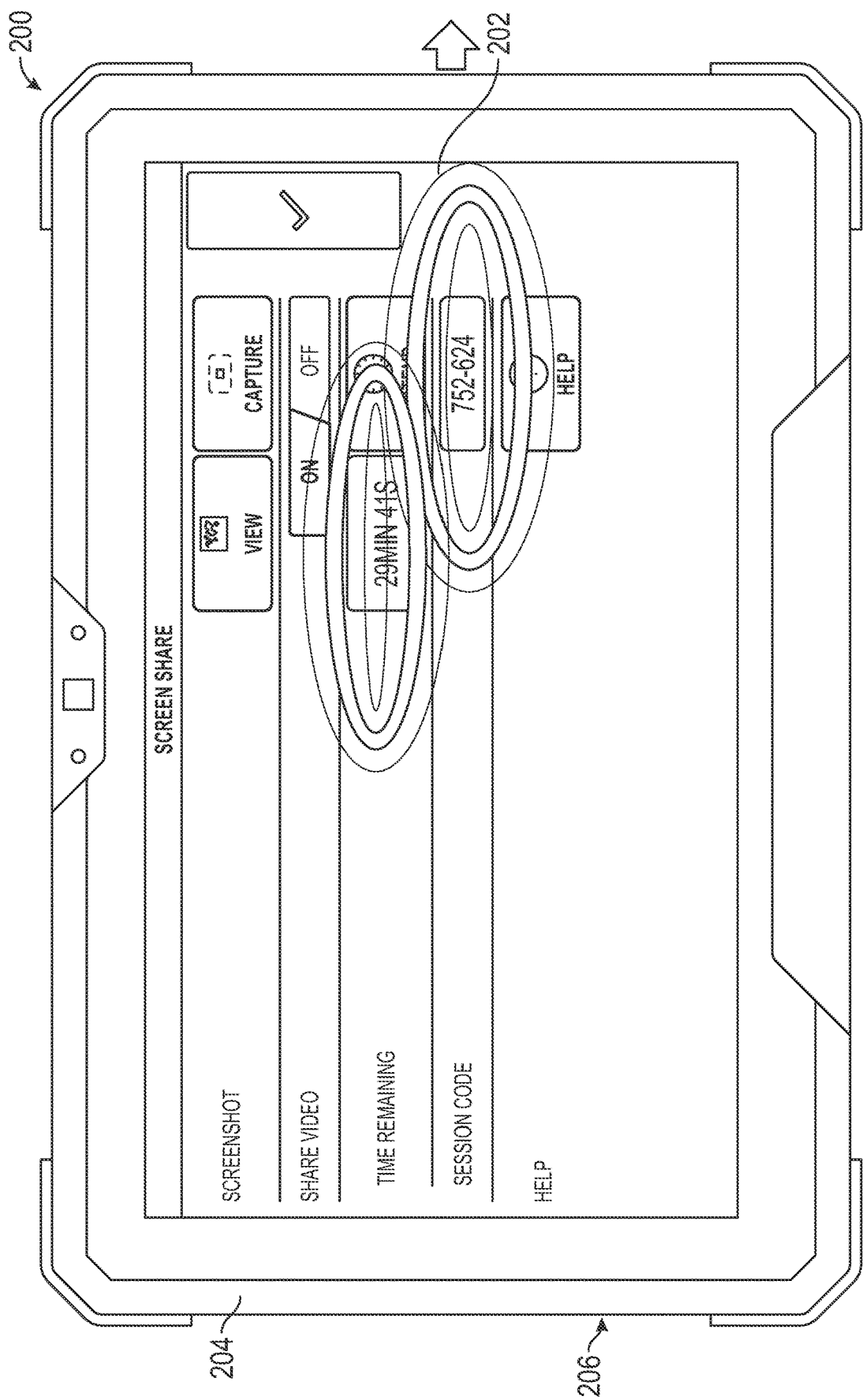
Figure 42D:
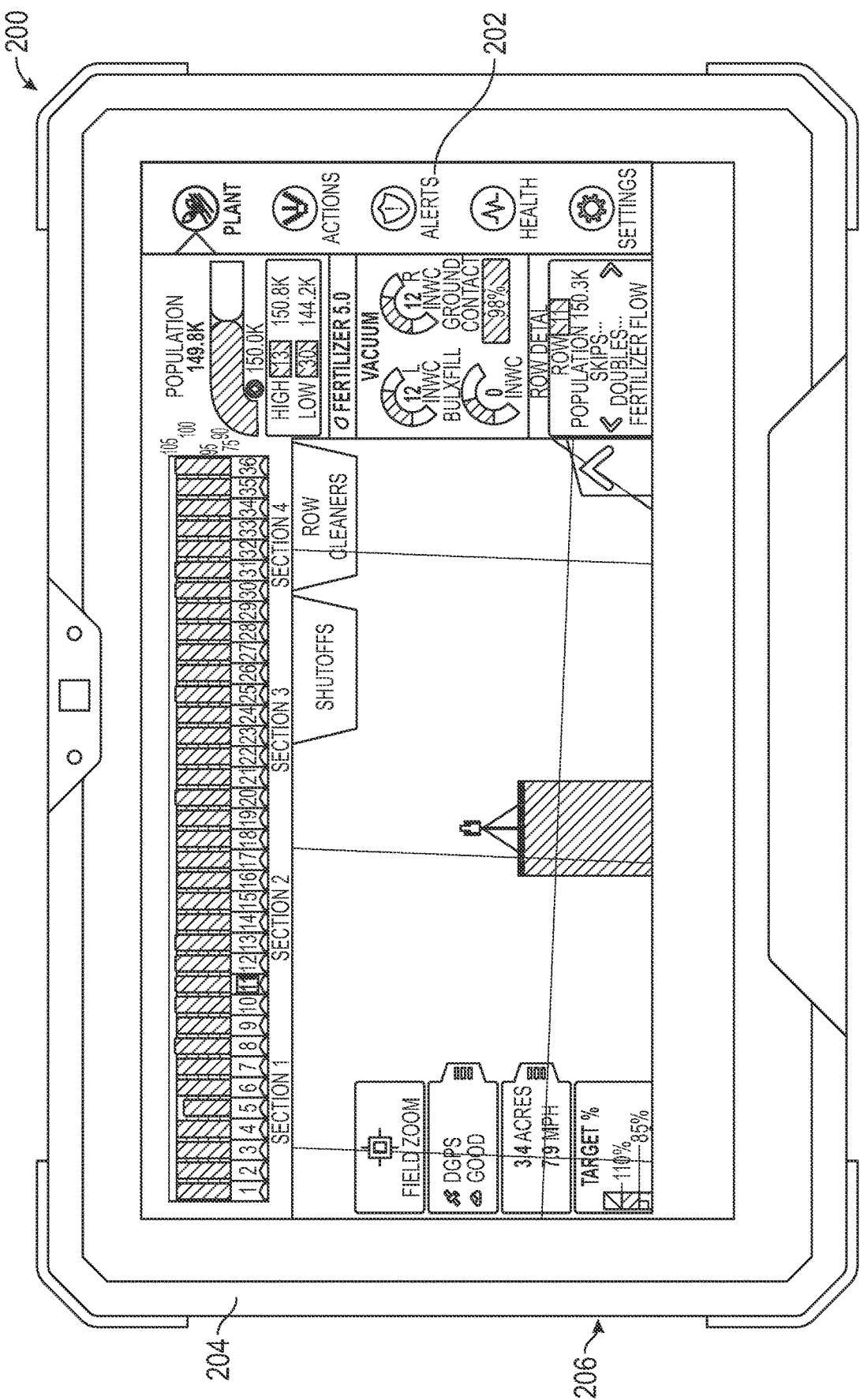

Another feature of the unit 200 is shown in FIG. 41. The figure shows the status of the diagnostic being created, along with the ability to cancel the same. However, while this is being created, the user can actively go back to any of the other screens, such as planting screens to continue operation of the implement during creation of the diagnostic report. Thus, the diagnostics can generate in the background and show the status during that generation without much upheaval to the user. The reports can be sent to OEMs, dealers, service providers, or anyone else associated with the implement 10 and/or display unit 200, who can access the uploaded files for download and analysis.

FIGS. 42A-D shows yet additional aspects display unit 200. As has been disclosed, the unit 200 includes the ability to generate and send diagnostic reports for review and analysis. However, there are times when contemporaneous review of operations may need to be reviewed in order to provide service, suggestions, or otherwise aid a user (i.e., farmer) using the implement 10 and display unit 200.

Therefore, as shown in FIGS. 42A-D, the display unit 200 includes the ability to allow screen sharing with a third party, such as an OEM, technician, dealer, or other interested party. As shown in the figure, along the navigation bar on the right hand side of the display are a number of icons. One of the icons is labeled "SETTINGS". Accessing this icon will provide a number of options, such as shown along the left hand side of the display unit 200 in the upper left hand image of FIG. 41. One of the options is listed as "BLUE CONNECT". Accessing the "BLUE CONNECT" selection will bring up a number of options, which are shown in the upper left hand image. One of these is labeled "SCREEN SHARE" and includes an icon with a camera and "SHARE". Pressing that icon will open a new visual, which is shown at the upper right hand image of FIG. 41. There are additional options, including a toggle switch next to "SHARE VIDEO". The default is OFF, but a user can toggle this to ON to start the sharing process. Once this has been turned ON, the screen 202 will move to the image shown in the bottom left image of FIG. 41, moving in the direction of the arrow. New options will be shown, including "TIME REMAINING" and "SESSION CODE". The sharing session can be limited in duration, such as shown in the figure by the timer. According to at least some aspects of some embodiments, the duration is limited to 30-minutes. However, this can be varied and is not to be limiting. In addition, to preserve the security of sharing and to make sure that the user controls the sharing, a "SESSION CODE" in the form of a six-digit pin code is provided. This number is randomly generated each time a new sharing session is started. While not shown in the figure, the code will need to be shared via other manners with the third party (e.g., OEM, technician, dealer, etc.). The third party will have their own portal and cannot see any display screen without access to a particular six-digit code. However, once the third party enters a matching code, they will be able to see what is shown on the display unit 200 being shared. There may be a slight delay of time between the sharing screen and the portal, but otherwise the sharing will be considered contemporaneous.

Referring back to FIG. 41, in the bottom right image, following the arrows yet again, it should be noted that this shows an example of a display screen that is being shared with a third party. The screen 202 will have an indication to remind and/or let the user know that the screen is being shared. For example, according to at least some aspects, the toolbar along the right side of the screen 202 will change colors when the screen 202 is being shared, such as by turning orange or another color that is not the normal color of the screen 202. This will provide notification of the sharing with the user and will default back to the original color once the sharing is complete.

The sharing will provide numerous advantages. Often, when issues occur or when output is less than desired, the only way to convey the issue is orally or after use of the implement. This is less than ideal, as the issue may affect planting operations or limit the same. Providing real time sharing of the screen 202 will allow the third party to provide suggestions, fixes, changes, or at least see the issue to determine if more intensive review or changes are required, as well as if the problem can be corrected remotely.

However, a few things to note with the screen sharing. The screen share must be initiated by the user of the display and the service or other third party must enter the session code to view the session/sharing. The duration is set at 30-minutes, but this can be extended by the user. The sharing can be ended via the display at any time by the user. The screen share will continue across crashes and reboots in the timer has not expired. In addition, the third party is able to view only and cannot remotely control the display, and the sharing will only work if the display has wireless connectivity via a network to be able to reach the third party.

Additionally, any of the aspects, apparatuses, methods, and/or systems disclosed may be adapted to be used with an intelligent implement control system that comprises any combination of an intelligent planter router/intelligent implement router (IPR/IIR), an intelligent planter node/ intelligent implement node (IPN/IIN), and an intelligent planter positioning/intelligent implement positioning (IPP/ IIP). The implement control system including any combination of IPRs, IPNs, and/or IPPs may be that which is disclosed in U.S. Pat. No. 10,952,365 which is hereby incorporated in its entirety. All child US Patent Applications and US Patents resulting from U.S. Pat. No. 10,952,365 are also hereby incorporated in their entirety.

According to some aspects, the apparatuses, methods, and/or systems disclosed herein may utilize the implement control system of U.S. Pat. No. 10,952,365 and its children, which may include zero or more IPRs, zero or more IPNs, and zero or more IPPs. Pertinent to the disclosed apparatuses, methods, and/or systems, the implement control system of U.S. Pat. No. 10,952,365 and its children may be adapted to detect, sense, monitor, and/or perform functionality related to determining whether a planter has enough seed to finish planting and alerting a user and/or calling for more seed if the planter does not have enough seed to finish planting, communication between multiple planters planting the same field so that they can coordinate, strategize, and/or optimize a plan to finish planting, ignoring disparate data outside of a specified area, and/or setting up and configuring cameras to be used with an agricultural implement wherein camera data captured by the cameras can be displayed to a user via a display unit. For example, the features and capabilities of the disclosed aspects, apparatuses, methods, and/or systems may be performed and carried out by the implement control system including zero or more IPRs, IPNs, and IPPs. As described herein, this includes but is not limited to the ability to accurately measure and monitor the amount of seed remaining in a planter and the number of acres remaining to plant, the ability for multiple planters to communicate with one another, the ability to use geofencing or another technique to specify a particular geographic area, and the ability to configure cameras by naming them and determining in what manner their captured camera data appears on a display unit. One or more IPPs may act as sensors to collect data related to these functions, and the one or more IPNs and IPRs may be used to control and perform certain functions. Further, control and performance of certain functions may depend on user input offered via a display unit.

For example, one or more IPPs can be used when measuring and monitoring how much seed is remaining in the planter. One or more IPNs can analyze, process, and determine if a planter can finish planting and/or can coordinate, strategize, and/or optimize a plan for multiple planters working together. One or more IPPs can work in conjunction with a display unit to display particular content, data, and/or information.

While much of the description was focused on planting and planters, the disclosed aspects, apparatuses, methods, and/or systems can be adapted and applied to any agricultural function and any agricultural implement including but not limited to spraying, fertilizing, tilling, plowing, and the like.

Therefore, as understood from the disclosure, the disclosed aspects, apparatuses, methods, and/or systems include the ability to continuously measure and monitor the amount of seed remaining in a planter and the amount of acres remaining to plant so that it can be determined whether the planter has enough seed to finish planting. By outputting an alert and/or warning to a user as well as providing the ability to call for the precise amount of seed in order to finish planting to be brought to the planter, the system increases efficiency and cost-effectiveness by only refilling with precisely the amount of seed needed. This leads to less time filling the planter and the use of less seed which decreases the chance of seed being wasted.

The aspects, apparatuses, methods, and/or systems disclosed also include the ability for display units to communicate with other display units when multiple planters are planting the same field in order to coordinate, strategize, and/or optimize the best plan to finish planting the field. This leads to more efficient planting in terms of the amount of users needed to finish planting, the number of planters needed to finish planting, the amount of seed needed to finish planting, and the amount of fuel and/or gas consumed by the planters that are finishing planting.

The aspects, apparatuses, methods, and/or systems disclosed also include the ability to specify a particular area that may extend beyond the perimeter of an agricultural field and to ignore disparate data outside of that particular area. By ignoring disparate data and only showing relevant data related to aspects inside a particular area, ease of use of the system is increased as the display unit is decluttered, and a user can focus simply on relevant data. Additionally, by specifying an area that extends beyond the perimeter of an agricultural field, the display system can provide more effective zooming capabilities and reports.

The aspects, apparatuses, methods, and/or systems disclosed also include the ability to set up and configure cameras near, on, or at the agricultural implement and/or agricultural tow vehicle. By being able to name and view camera data captured by each of the cameras in real time during planting, a user can view and is more aware of what is happening during planting. Further, by being able to toggle through cameras and adjust how the camera data is shown on the display unit, a user can work efficiently by being able to see multiple different kinds of data and/or content on the display unit at the same time.

From the foregoing, it can be seen that the invention accomplishes at least all of the stated objectives.

It should be appreciated that one or more alternatives, variations, additions, subtractions, or other changes, which may be obvious to those skilled in the art, to be considered a part of the present disclosure.

The invention claimed is:

1. A display unit for use with an agricultural implement, the display unit comprising:
   a user interface adapted to allow a user to enter inputs and to display outputs; and
   an intelligent control adapted to communicate with the agricultural implement;
   wherein the display unit is adapted to determine an amount of seed remaining in the agricultural implement and a number of acres remaining to plant;
   wherein the display unit is adapted to calculate whether the agricultural implement has enough seed remaining to finish planting the number of acres remaining to plant.

2. The display unit of claim 1, wherein, if the agricultural implement does not have enough seed remaining to finish planting the number of acres remaining to plant, the display unit outputs an alert via the user interface.

3. The display unit of claim 1, wherein, if the agricultural implement does not have enough seed remaining to finish planting the number of acres remaining to plant, the display unit is further adapted to allow a user to enter input to the display unit to call for the precise amount of seed required to finish planting the number of acres remaining to plant.

4. The display unit of claim 1, wherein the display unit is adapted to calculate an amount of seed required to finish planting the number of acres left for the agricultural implement to plant and to present that amount to a user via the display unit.

5. The display unit of claim 1, wherein the display unit is portable and wireless.

6. The display unit of claim 1, wherein the display unit is colorized and comprises a touchscreen.

7. An agricultural system for use with an agricultural implement, the agricultural system comprising:
   a display operationally connected to the agricultural implement and further adapted to allow a user to enter inputs to the system via the display and to present outputs to a user via the display;
   wherein the display is further adapted to determine an amount of seed currently present in the agricultural implement and a number of acres remaining for the agricultural implement to plant.

8. The system of claim 7, wherein the display is adapted to calculate an amount of seed required to finish planting the number of acres remaining for the agricultural implement to plant and to present that amount to a user via the display.

9. The system of claim 7, wherein if the amount of seed currently present in the agricultural implement is not enough to plant the number of acres remaining for the agricultural implement to plant, the display is adapted to present an alert and/or warning that the agricultural implement does not currently have enough seed to plant the number of acres remaining for the agricultural implement to plant.

10. The system of claim 7, wherein if the amount of seed currently present in the agricultural implement is not enough to plant the number of acres remaining for the agricultural implement to plant, the display is adapted to allow a user to enter input to the display to call for the precise amount of seed required to finish planting the number of acres remaining for the agricultural implement to plant.

11. The system of claim 7, wherein the display is adapted to allow a user to enter a total number of acres to be planted, and the display is further adapted to count and/or monitor a number of acres already planted and to calculate the number of acres remaining for the agricultural implement to plant based on the total number of acres to be planted and the number of acres already planted.

12. A method for planting an agricultural field, the method comprising:
    determining an amount of seed currently present in an agricultural implement;
    determining a remaining number of acres to be planted; and
    calculating an amount of seed required to finish planting the remaining number of acres to be planted;
    wherein if the amount of seed currently present in the agricultural implement is not enough to plant the remaining number of acres to be planted, the method further comprises allowing a user to enter input to a display unit to call for the precise amount of seed required to finish planting the remaining number of acres to be planted.

13. The method of claim 12, further comprising determining a total number of acres to be planted and measuring a number of acres already planted.

14. The method of claim 12, wherein if the amount of seed currently present in the agricultural implement is not enough to plant the remaining number of acres to be planted, the method further comprises showing an alert and/or warning that the agricultural implement does not currently have enough seed to plant the remaining number of acres to be planted.

15. An agricultural system for use with a plurality of agricultural implements, the agricultural system comprising:
    a plurality of displays, wherein each display is operationally connected to one of the plurality of agricultural implements;
    wherein each display is in communication with the other displays;
    wherein each display is adapted to develop a strategy with one another regarding how to finish planting the number of acres remaining to plant.

16. The system of claim 15, wherein each display is adapted to monitor and determine an amount of seed remaining in the agricultural implement in which each display is operationally connected and to monitor and determine a number of acres remaining for the one or more agricultural implements to plant.

17. The system of claim 16, wherein the strategy is based on the amount of seed remaining in each agricultural implement, the number of acres remaining to plant, a location of each agricultural implement, a model, size, and/or nature of each agricultural implement, terrain of the field to be planted, weather and/or environmental conditions, or any combination thereof.

18. The system of claim 16, wherein the system is adapted to optimize path planning of the one or more agricultural implements to ensure that planting is completed in an efficient manner.

19. The system of claim 16, wherein the strategy may include some of the one or more agricultural implements continue planting while others of the one or more agricultural implements cease planting.

20. The system of claim 16, wherein the displays can communicate with one another regarding a total number of acres already planted and a number of acres already planted by each agricultural implement.

* * * * *